United States Patent
Kobayashi et al.

(10) Patent No.: US 7,190,844 B2
(45) Date of Patent: Mar. 13, 2007

(54) IMAGE PROCESSING METHOD, STORAGE MEDIUM, IMAGE PROCESSOR AND IMAGE RECORDER

(75) Inventors: Hideyuki Kobayashi, Hino (JP); Tsukasa Ito, Musashino (JP); Hiroaki Takano, Hachioji (JP)

(73) Assignee: Konica Corporation, Tokyo (JP)

( * ) Notice: Subject to any disclaimer, the term of this patent is extended or adjusted under 35 U.S.C. 154(b) by 781 days.

(21) Appl. No.: 10/365,180

(22) Filed: Feb. 11, 2003

(65) Prior Publication Data

US 2003/0161006 A1 Aug. 28, 2003

(30) Foreign Application Priority Data

Feb. 22, 2002 (JP) .............................. 2002-046810

(51) Int. Cl.
*G06K 9/40* (2006.01)
(52) U.S. Cl. ...................... 382/274; 382/103; 382/275; 358/3.26; 358/3.27
(58) Field of Classification Search ................ 382/103, 382/167, 274, 275, 282; 358/3.26, 3.27, 358/463
See application file for complete search history.

(56) References Cited

U.S. PATENT DOCUMENTS

| | | | |
|---|---|---|---|
| 5,459,794 A * | 10/1995 | Ninomiya et al. ........... | 382/145 |
| 5,537,485 A * | 7/1996 | Nishikawa et al. .......... | 382/130 |
| 5,828,774 A * | 10/1998 | Wang .......................... | 382/128 |
| 6,275,294 B1 * | 8/2001 | Folestad ..................... | 356/432 |
| 6,345,235 B1 * | 2/2002 | Edgecombe et al. .......... | 702/27 |
| 6,434,262 B2 * | 8/2002 | Wang .......................... | 382/132 |
| 6,628,815 B2 * | 9/2003 | Wang .......................... | 382/132 |
| 6,640,145 B2 * | 10/2003 | Hoffberg et al. ............... | 700/83 |
| 6,995,361 B2 * | 2/2006 | Kim et al. ................... | 250/288 |

FOREIGN PATENT DOCUMENTS

| | | |
|---|---|---|
| JP | 09-233423 | 9/1997 |
| JP | 11-191871 | 7/1999 |
| JP | 11-317863 | 11/1999 |
| JP | 11-339035 | 12/1999 |
| JP | 2000-016874 | 1/2000 |
| JP | 2001-005960 | 1/2001 |

\* cited by examiner

*Primary Examiner*—Matthew C. Bella
*Assistant Examiner*—Yosef Kassa
(74) *Attorney, Agent, or Firm*—Frishauf, Holtz, Goodman & Chick, P.C.

(57) ABSTRACT

A method of applying an image processing to two dimensionally-arranged original image data corresponding to an entire image region of a photographed image including a main photographed-subject; comprising steps of determining a main photographed-subject region of the main photographed-subject or a selected region by at least one on the two dimensionally-arranged original image data; setting the entire image region and one of the main photographed-subject region and the selected region as target regions for an image processing; obtaining image characteristics from each of the target regions; calculating a granularity value and a sharpness value for each of the target regions from the respective image characteristics of the target regions, wherein each of the granularity value and the sharpness value is an evaluation criterion standardized with a functional value; and conducting an image processing for the two dimensionally-arranged original image data with reference to the granularity value and the sharpness value.

72 Claims, 8 Drawing Sheets

IMAGE PROCESSING METHOD, STORAGE MEDIUM, IMAGE PROCESSOR AND IMAGE RECORDER

BACKGROUND OF THE INVENTION

The present invention relates to an image processing method, a storage medium, an image processor and-an image recorder. More particularly, this invention relates to an image processing method and an image processor for providing predetermined processing to photographed image data and for generating an image signal for producing preferred output, and an image recorder for providing predetermined processing to photographed image data and for generating an image signal for producing preferred output.

When the photographed image data is printed on a medium, the photographed image data is provided with predetermined image processing in order to ensure that favorable impression is given to the person viewing the image printed on the medium.

With recent advances in input media, there has been a growing demand for more improved image quality while favorable impression of the photographed image is kept unimpaired.

In the processing of photographed image printed on the film, the Japanese Application Patent Laid-Open Publication No. Hei 11-317863 discloses a method for faithful reproduction of the image having an impression close to an actual scene captured human eyes by dodging treatment plus blur masking through the use of color reproducing parameters of the major region and background region included in the image. The Japanese Application Patent Laid-Open Publication No. Hei 11-191871 proposes a similar art regarding the processing of photographed image to be printed on the film, i.e. a technique for compression processing of the image dynamic range calculated on the basis of photographic information and subject region.

The Japanese Application Patent Laid-Open Publication No. Hei 09-233423 proposes a technique of image processing by extracting the image region of the human face from the image obtained film, and by changing edge enhancement or contrast based on the size of the extracted human face image region. Further, the Japanese Application Patent Laid-Open Publication No. 2000-16874 proposes a technique of ensuring a high-quality picture quality on the same level as that of the picture in printing the image captured by a digital camera, by customized image processing according to the image processing conditions for each model in conformance with the characteristics of a particular camera model, and by reflecting the gray scale for a specific subject and color taste, thereby setting color gradation without dependence on camera model.

The Japanese Application Patent Laid-Open Publication No. 2001-5960 discloses a technique wherein, based on the edge-enhanced data obtained by edge detection of a digital image, sharpness is enhanced in the target region, and unsharpness mask coefficient is changed from the subject region in other regions so that a composite image is formed. This step prevents enhancement of subject sharpness and accompanying unwanted edge enhancement on the background are avoided, with the result that a photograph-like image is ensured. Similarly, the Japanese Application Patent Laid-Open Publication No. Hei 11-339035 proposes a mask image processing technique where the degree of reducing the enhancement of high frequency component or middle frequency component is adjusted according to the size of the human face in the processing of an image including human face image.

In recent years, however, generating means for generating the photographed image data have been diversified, and include a wide range of types such as a less costly digital camera for toy, lens shutter digital camera, high-quality single lens reflex digital camera, film scanner, flood bed scanner and many others. The media for issuing image signals have also been diversified to include a silver halide digital printer, ink jet printer, thermal printer, sublimation printer and electrophotographic printer. The size of the image produced therewith has also been diversified to cover from a several-inch square seal image to a poster-sized image. Further, as the photographed image data is sent and received from the Internet or the like, there have been an increasing number of problems where image signals with the medium size beyond the expectation of the camera user are issued. Under such complicated circumstances, it has become difficult for the prior art technique to send an image of favorable impression to media.

For example, the technique disclosed in the Japanese Application Patent Laid-Open Publication No. Hei 11-317863 is insufficient due to inadequate image because the contrast of the image portion of the under-subject in reverse-lighted scene is unduly increased, and excessive granular incompatibility is felt in the background. Further, the techniques disclosed in the Japanese Application Patent Laid-Open Publication Nos. Hei 11-191871 and 09-233423 is difficult to put into practical use, because deterioration of granularity is caused by inadvertent contrast processing, and natural continuity of intermediate colors cannot be reproduced, with the result that incompatibility is felt in the background.

In the technique introduced in the Japanese Application Patent Laid-Open Publication No. 2000-16874, the image processing is greatly affected by the operator decision. When image processing is performed in an automatic mode, it is unrealistic and impracticable to update the data in conformity to diversifying input media models and output methods. If put into practical use, it is not always possible to ensure high quality image processing with the feeling of the original scene kept intact. For this reason, this technique is still insufficient at practical level.

According to the technique introduced in the Japanese Application Patent Laid-Open Publication No. 2001-5960, inadvertent edge enhancement is performed although a human and still object are included in the subject, with the result that details of the dress is subjected to edge enhancement despite satisfactory face of the subject. In this respect, this technique is still insufficient at practical level. Further, the texture of a still subject is impaired, for example, by the presence of a metal and a natural object. This gives rise to unnatural continuity with the background and damages the feel of the original scene.

In the technique disclosed in the Japanese Application Patent Laid-Open Publication No. Hei 11-339035, the image processing parameter is changed by the size of the human face alone. This signifies a heavy dependence on the scene, and image qualities are different despite continuous photographing in the same environment. In this respect, this technique fails to provide a stable and high fidelity representation of the atmosphere of the original scene.

SUMMARY OF THE INVENTION

In view of the prior art described above, it is an object of the present invention to provide an image processing method, storage medium and image processor, which permits the photographed image data to be provided with a predetermined image processing to ensure a preferred output based on general-purpose decision means, when image signals are issued in a great variety of medium sizes in the presence of photographed image data based on a great variety of photographing means, and which allows an high-quality image signal to be generated in such a way that there is a continuity between a main photographed subject region and background region without a sense of incompatibility in-between, where the atmosphere of the original scene is kept unimpaired. Another object of the present invention to provide an image recorder that permits the photographed image data to be provided with a predetermined image processing to ensure a preferred output.

The above object can be attained by the following method.

In an image processing method of applying an image processing to two dimensionally-arranged original image data corresponding to an entire image region of a photographed image including a main photographed-subject and producing output image data; the method comprises steps of:

a region determining step of determining a main photographed-subject region of the main photographed-subject or a selected region by at least one on the two dimensionally-arranged original image data;

a target region setting step of setting the entire image region and one of the main photographed-subject region and the selected region as target regions for an image processing;

an image characteristic obtaining step of obtaining image characteristics from each of the target regions;

an evaluation criterion calculating step of calculating a granularity value and a sharpness value for each of the target regions from the respective image characteristics of the target regions, wherein each of the granularity value and the sharpness value is an evaluation criterion standardized with a functional value; and an image processing step of conducting an image processing for the two dimensionally-arranged original image data with reference to the granularity value and the sharpness value.

Further, the above object may be attained by items stated below.

Item 1.

In an image processing method of producing output image data by applying an image processing onto original image data of a photographed image, the image processing method is characterized by:

setting an entire image region of the original image data, at least one or more main photographed-subject region or selected region as a target region to be applied with the image processing;

calculating a granularity value and a sharpness value which are evaluation criterions standardized with a functional value of an image characteristic obtained from the set target region; and applying the image processing with reference to the calculated granularity and sharpness values.

Item 54.

In a memory medium for storing a program code which is readable by a computer and produces output image data by applying an image processing onto original image data of a photographed image, the memory media is characterized by storing the program comprising storing the program comprising:

a program code of setting an entire image region of the original image data, at least one or more main photographed-subject region or selected region as a target region to be applied with the image processing;

a program code of calculating a granularity value and a sharpness value which are evaluation criterions standardized with a functional value of an image characteristic obtained from the set target region; and a program code of applying the image processing with reference to the calculated granularity and sharpness values.

Item 107.

In an image processing apparatus of producing output image data by applying an image processing onto original image data of a photographed image, the image processing apparatus is characterized by comprising:

a setting means for setting an entire image region of the original image data, at least one or more main photographed-subject region or selected region as a target region to be applied with the image processing;

a calculating means for calculating a granularity value and a sharpness value which are evaluation criterions standardized with a functional value of an image characteristic obtained from the set target region; and the applying means applies the image processing with reference to the calculated granularity and sharpness values.

Item 160.

In an image recording apparatus of producing output image data by applying an image processing onto original image data of a photographed image, the image recording apparatus is characterized by comprising:

a setting means for setting an entire image region of the original image data, at least one or more main photographed-subject region or selected region as a target region to be applied with the image processing;

a calculating means for calculating a granularity value and a sharpness value which are evaluation criterions standardized with a functional value of an image characteristic obtained from the set target region; and an applying means for applying the image processing with reference to the calculated granularity and sharpness values.

According to the invention described in Items 1, 54, 107, 160, the granularity value and sharpness value standardized in functional values are calculated, and image processing is performed by reference to these calculated values. This provides image processing with consideration given to granularity and sharpness and allows a high-quality output image to be generated with the original atmosphere kept unchanged.

Item 2.

In an image processing method of producing output image data by applying an image processing onto original image data of a photographed image, the image processing method is characterized by:

setting an entire image region of the original image data, at least one or more main photographed-subject region or selected region as a target region to be applied with the image processing;

calculating a granularity value and a sharpness value which are evaluation criterions standardized with a functional value of an image characteristic obtained from the set target region;

calculating a total image quality value interrelated by two dimensions of the calculated granularity and sharpness values; and applying the image processing with reference to the calculated total image quality value.

Item 55.

In a memory medium for storing a program code which is readable by a computer and produces output image data by applying an image processing onto original image data of a photographed image, the memory media is characterized by storing the program comprising:

a program code of setting an entire image region of the original image data, at least one or more main photographed-subject region or selected region as a target region to be applied with the image processing;

a program code of calculating a granularity value and a sharpness value which are evaluation criterions standardized with a functional value of an image characteristic obtained from the set target region;

a program code of calculating a total image quality value interrelated by two dimensions of the calculated granularity and sharpness values; and a program code of applying the image processing with reference to the calculated total image quality value.

Item 108.

In an image processing apparatus of producing output image data by applying an image processing onto original image data of a photographed image, the image processing apparatus is characterized by comprising:

a setting means for setting an entire image region of the original image data, at least one or more main photographed-subject region or selected region as a target region to be applied with the image processing;

a calculating means for calculating a granularity value and a sharpness value which are evaluation criterions standardized with a functional value of an image characteristic obtained from the set target region;

a calculating means for calculating a total image quality value interrelated by two dimensions of the calculated granularity and sharpness values; and the applying means applies the image processing with reference to the calculated total image quality value.

Item 161.

In an image recording apparatus of producing output image data by applying an image processing onto original image data of a photographed image, the image recording apparatus is characterized by comprising:

a setting means for setting an entire image region of the original image data, at least one or more main photographed-subject region or selected region as a target region to be applied with the image processing;

a calculating means for calculating a granularity value and a sharpness value which are evaluation criterions standardized with a functional value of an image characteristic obtained from the set target region;

a calculating means for calculating a total image quality value interrelated by two dimensions of the calculated granularity and sharpness values; and an applying means for applying the image processing with reference to the calculated total image quality value.

According to the invention described in Items 2, 55, 108, 161, the granularity value and sharpness value standardized in functional values are calculated, and the overall picture quality value correlated in two dimensions by the granularity value and sharpness value is further calculated. Image processing is performed by reference to the calculated overall picture quality value. This provides image processing with consideration given to granularity and sharpness and allows a high-quality output image to be generated with the original atmosphere kept unchanged.

Item 3.

In an image processing method of producing output image data by applying an image processing onto original image data of a photographed image, the image processing method is characterized by:

setting an entire image region of the original image data, at least one or more main photographed-subject region or selected region as a target region to be applied with the image processing;

calculating a granularity value, a sharpness value and a color performance value which are evaluation criterions standardized with a functional value of an image characteristic obtained from the set target region; and applying the image processing with reference to the calculated granularity and sharpness values, or either one of the calculated granularity and sharpness values, and the calculated color performance value.

Item 56.

In a memory medium for storing a program code which is readable by a computer and produces output image data by applying an image processing onto original image data of a photographed image, the memory media is characterized by storing the program comprising:

a program code of setting an entire image region of the original image data, at least one or more main photographed-subject region or selected region as a target region to be applied with the image processing;

a program code of calculating a granularity value, a sharpness value and a color performance value which are evaluation criterions standardized with a functional value of an image characteristic obtained from the set target region; and a program code of applying the image processing with reference to the calculated granularity and sharpness values, or either one of the calculated granularity and sharpness values, and the calculated color performance value.

Item 109.

In an image processing apparatus of producing output image data by applying an image processing onto original image data of a photographed image, the image processing apparatus is characterized by comprising:

a setting means for setting an entire image region of the original image data, at least one or more main photographed-subject region or selected region as a target region to be applied with the image processing;

a calculating means for calculating a granularity value, a sharpness value and a color performance value which are evaluation criterions standardized with a functional value of an image characteristic obtained from the set target region; and an applying means for applying the image processing with reference to the calculated granularity and sharpness values, or either one of the calculated granularity and sharpness values, and the calculated color performance value.

Item 162.

In an image recording apparatus of producing output image data by applying an image processing onto original image data of a photographed image, the image recording apparatus is characterized by comprising:

a setting means for setting an entire image region of the original image data, at least one or more main photographed-subject region or selected region as a target region to be applied with the image processing;

a calculating means for calculating a granularity value, a sharpness value and a color performance value which are evaluation criterions standardized with a functional value of an image characteristic obtained from the set target region; and an applying means for applying the image processing with reference to the calculated granularity and sharpness values, or either one of the calculated granularity and sharpness values, and the calculated color performance value.

According to the invention described in Items 3, 56, 109, 162, the granularity value, sharpness value and color performance value standardized in functional values are calculated, and image processing is performed by reference to the calculated values. This provides image processing with consideration given to granularity, sharpness and color performance value, and allows a high-quality output image to be generated with the original atmosphere kept unchanged.

Item 4.

In an image processing method of producing output image data by applying an image processing onto original image data of a photographed image, the image processing method is characterized by:

setting an entire image region of the original image data, at least one or more main photographed-subject region or selected region as a target region to be applied with the image processing;

calculating a granularity value, a sharpness value and a color performance value which are evaluation criterions standardized with a functional value of an image characteristic obtained from the set target region;

calculating a three-dimensional total image quality value interrelated by three dimensions of the calculated granularity, sharpness and color performance values; and applying the image processing with reference to the calculated third dimensional total image quality values.

Item 57.

In a memory medium for storing a program code which is readable by a computer and produces output image data by applying an image processing onto original image data of a photographed image, the memory media is characterized by storing the program comprising:

a program code of setting an entire image region of the original image data, at least one or more main photographed-subject region or selected region as a target region to be applied with the image processing;

a program code of calculating a granularity value, a sharpness value and a color performance value which are evaluation criterions standardized with a functional value of an image characteristic obtained from the set target region;

a program code of calculating a three-dimensional total image quality value interrelated by three dimensions of the calculated granularity, sharpness and color performance values; and a program code of applying the image processing with reference to the calculated third dimensional total image quality values.

Item 110.

In an image processing apparatus of producing output image data by applying an image processing onto original image data of a photographed image, the image processing apparatus is characterized by comprising:

a setting means for setting an entire image region of the original image data, at least one or more main photographed-subject region or selected region as a target region to be applied with the image processing;

a calculating means for calculating a granularity value, a sharpness value and a color performance value which are evaluation criterions standardized with a functional value of an image characteristic obtained from the set target region;

a calculating means for calculating a three-dimensional total image quality value interrelated by three dimensions of the calculated granularity, sharpness and color performance values; and an applying means for applying the image processing with reference to the calculated third dimensional total image quality values.

Item 163.

In an image recording apparatus of producing output image data by applying an image processing onto original image data of a photographed image, the image recording apparatus is characterized by comprising:

a setting means for setting an entire image region of the original image data, at least one or more main photographed-subject region or selected region as a target region to be applied with the image processing;

a calculating means for calculating a granularity value, a sharpness value and a color performance value which are evaluation criterions standardized with a functional value of an image characteristic obtained from the set target region;

a calculating means for calculating a three-dimensional total image quality value interrelated by three dimensions of the calculated granularity, sharpness and color performance values; and an applying means for applying the image processing with reference to the calculated third dimensional total image quality values.

According to the invention described in Items 4, 57, 110, 163, the granularity value, sharpness value and color performance value standardized in functional values are calculated, and the three-dimensional picture quality value correlated in three dimensions by granularity value, sharpness value and color performance value is calculated. Image processing is performed by reference to the calculated three-dimensional picture quality value. This provides image processing with consideration given to granularity, sharpness and color performance value, and allows a high-quality output image to be generated with the original atmosphere kept unchanged.

Item 5.

The image processing method in either one of the Items 1 to 4 is characterized by:

setting at least one or more than main photographed-subject region, or the selected region as the target region of the imaging process;

representing the granularity value and the sharpness value of the original image data calculated from the set main photographed-subject region or the selected region by N0, and M0 respectively;

representing the granularity value and the sharpness value of the outputted image data calculated from the set main photographed-subject region or the selected region as N1 and M1 respectively; and calculating a difference between N1/N0 and M1/M0 so as to be equal to or less than 100%.

Item 6.

The image processing method in either one of the Items 1 to 4 is characterized by:

setting at least the main photographed-subject region as the target region of the image processing;

representing the granularity value and the sharpness value of the original image data calculated from the set entire image region as BN0 and BM0 respectively;

representing the granularity value and the sharpness value of the outputted image data calculated from the set entire image region as BN1 and BM1 respectively; and calculating the difference between BN1/BN0 and BM1/BM0 so as to be equal to or less than 100%.

Item 58.

The memory medium in either one of the Items 54 to 57 is characterized by storing the program comprising:

a program code of setting at least one or more than main photographed-subject region, or the selected region as the target region of the imaging process;

a program code of representing the granularity value and the sharpness value of the original image data calculated from the set main photographed-subject region or the selected region by N0, and M0 respectively;

a program code of representing the granularity value and the sharpness value of the outputted image data calculated from the set main photographed-subject region or the selected region as N1 and M1 respectively; and a program code of calculating a difference between N1/N0 and M1/M0 so as to be equal to or less than 100%.

Item 59.

The memory medium in either one of the Items 54 to 457 is characterized by storing the program comprising:

a program code of setting at least the main photographed-subject region as the target region of the image processing;

a program code of representing the granularity value and the sharpness value of the original image data calculated from the set entire image region as BN0 and BM0 respectively;

a program code of representing the granularity value and the sharpness value of the outputted image data calculated from the set entire image region as BN1 and BM1 respectively; and a program code of calculating the difference between BN1/BN0 and BM1/BM0 so as to be equal to or less than 100%.

Item 111.

The image processing apparatus in either one of the Items 107 to 110 is characterized in that:

the setting means sets at least one or more than main photographed-subject region, or the selected region as the target region of the imaging process;

the representing means represents the granularity value and the sharpness value of the original image data calculated from the set main photographed-subject region or the selected region by N0, and M0 respectively;

the representing means represents the granularity value and the sharpness value of the outputted image data calculated from the set main photographed-subject region or the selected region as N1 and M1 respectively; and the calculating means calculates a difference between N1/N0 and M1/M0 so as to be equal to or less than 100%.

Item 112.

The image processing apparatus in either one of the Items 107 to 110 is characterized in that:

the setting means sets at least the main photographed-subject region as the target region of the image processing;

the representing means represents the granularity value and the sharpness value of the original image data calculated from the set entire image region as BN0 and BM0 respectively;

the representing means represents the granularity value and the sharpness value of the outputted image data calculated from the set entire image region as BN1 and BM1 respectively; and the calculating means calculates the difference between BN1/BN0 and BM1/BM0 so as to be equal to or less than 100%.

Item 164.

The image recording apparatus in either one of the Items 160 to 163 is characterized in that:

the setting means sets at least one or more than main photographed-subject region, or the selected region as the target region of the imaging process;

the representing means represents the granularity value and the sharpness value of the original image data calculated from the set main photographed-subject region or the selected region by N0, and M0 respectively;

the representing means represents the granularity value and the sharpness value of the outputted image data calculated from the set main photographed-subject region or the selected region as N1 and M1 respectively; and the calculating means calculates a difference between N1/N0 and M1/M0 so as to be equal to or less than 100%.

Item 165.

The image recording apparatus in either one of the Items 160 to 163 is characterized in that:

the setting means sets at least the main photographed-subject region as the target region of the image processing;

the representing means represents the granularity value and the sharpness value of the original image data calculated from the set entire image region as BN0 and BM0 respectively;

the representing means represents the granularity value and the sharpness value of the outputted image data calculated from the set entire image region as BN1 and BM1 respectively; and the calculating means calculates the difference between BN1/BN0 and BM1/BM0 so as to be equal to or less than 100%.

According to the invention described in Items 5, 6, 58, 59, 111, 112, 164, 165, calculation is made so that the difference between the ratio of granularity values in the original image and output image and the ratio of sharpness values does not to exceed 100%. This allows the setting to be made so that granularity value and sharpness value comes closer to the same value, thereby improving the effect of keeping the atmosphere unchanged.

Item 7.

The image processing method in either one of the Items 1 to 4 is characterized by:

setting at least one or more main photographed-subject region or the selected region as the target region of the image processing;

representing the total image quality value of the original image data calculated from the set main photographed-subject region or the selected region as BQ0;

representing the total image quality value of the outputted image data calculated from the set main photographed-subject region or the selected region as Q1; and calculating $\Delta N$ and $\Delta M$ by $\Delta N=(Q1-N1)-(Q0-N0)$ and $\Delta M=(Q1-M1)-(Q0-M0)$, respectively, wherein N and M are normalized values, the total image quality value Q is a functional value given by $Q=f(N, M)$, and $Q0 \leq Q1$; and calculating each of the absolute value of $\Delta N$ and the absolute value of $\Delta M$ so as to be 1.0 or less than 1.0.

Item 8.

The image processing method in either one of the Items 1 to 4 is characterized by:

setting at least the entire image region as the target region of the image processing;

representing the total image quality value of the original image data calculated from the set entire image region as BQ0;

representing the total image quality value of the outputted image data calculated from the set entire image region as BQ1;

calculating $\Delta BN$ and $\Delta BM$ by
$\Delta BN=(BQ1-BN1)-(BQ0-BN0)$ and
$\Delta BM=(BQ1-BM1)-(BQ0-BM0)$, respectively, wherein N and M are the normalized values,
the total image quality value BQ is the functional value given by $BQ=f(N, M)$, and
$BQ0 \leq BQ1$; and calculating each of the absolute value of $\Delta BN$ and the absolute value $\Delta BM$ so as to be 1.0 or less than 1.0.

Item 60.

The memory medium in either one of the Items 54 to 57 is characterized by storing the program comprising:

a program code of setting at least one or more main photographed-subject region or the selected region as the target region of the image processing;

a program code of representing the total image quality value of the original image data calculated from the set main photographed-subject region or the selected region as Q0;

a program code of representing the total image quality value of the outputted image data calculated from the set main photographed-subject region or the selected region as Q1; and a program code of calculating $\Delta N$ and $\Delta M$ by
$\Delta N=(Q1-N1)-(Q0-N0)$ and
$\Delta M=(Q1-M1)-(Q0-M0)$, respectively, wherein N and M are normalized values,
the total image quality value Q is a functional value given by $Q=f(N, M)$, and
$Q0 \leq Q1$; and a program code of calculating each of the absolute value of $\Delta N$ and the absolute value of $\Delta M$ so as to be 1.0 or less than 1.0.

Item 61.

The memory medium in either one of the Items 54 to 57 is characterized by storing the program comprising:

a program code of setting at least the entire image region as the target region of the image processing;

a program code of representing the total image quality value of the original image data calculated from the set entire image region as BQ0;

a program code of representing the total image quality value of the outputted image data calculated from the set entire image region as BQ1;

a program code of calculating $\Delta BN$ and $\Delta BM$ by
$\Delta BN=(BQ1-BN1)-(BQ0-BN0)$ and
$\Delta BM=(BQ1-BM1)-(BQ0-BM0)$, respectively, wherein N and M are the normalized values,
the total image quality value BQ is the functional value given by $BQ=f(N, M)$, and
$BQ0 \leq BQ1$; and a program code of calculating each of the absolute value of $\Delta BN$ and the absolute value $\Delta BM$ so as to be 1.0 or less than 1.0.

Item 113.

The image processing apparatus in either one of the Items 107 to 110 is characterized in that:

the setting means sets at least one or more main photographed-subject region or the selected region as the target region of the image processing;

the representing means represents the total image quality value of the original image data calculated from the set main photographed-subject region or the selected region as Q0;

the representing means represents the total image quality value of the outputted image data calculated from the set main photographed-subject region or the selected region as Q1; and the calculating means calculates $\Delta N$ and $\Delta M$ by
$\Delta N=(Q1-N1)-(Q0-N0)$ and
$\Delta M=(Q1-M1)-(Q0-M0)$, respectively, wherein N and M are normalized values,
the total image quality value Q is a functional value given by $Q=f(N, M)$, and
$Q0 \leq Q1$; and the calculating means calculates each of the absolute value of $\Delta N$ and the absolute value of $\Delta M$ so as to be 1.0 or less than 1.0.

Item 114.

The image processing apparatus in either one of the Items 107 to 110 is characterized in that:

the setting means sets at least the entire image region as the target region of the image processing;

the representing means represents the total image quality value of the original image data calculated from the set entire image region as BQ0;

the representing means represents the total image quality value of the outputted image data calculated from the set entire image region as BQ1;

the calculating means calculates $\Delta BN$ and $\Delta BM$ by
$\Delta BN=(BQ1-BN1)-(BQ0-BN0)$ and
$\Delta BM=(BQ1-BM1)-(BQ0-BM0)$, respectively, wherein N and M are the normalized values,
the total image quality value BQ is the functional value given by $BQ=f(N, M)$, and
$BQ0 \leq BQ1$; and the calculating means calculates each of the absolute value of $\Delta BN$ and the absolute value $\Delta BM$ so as to be 1.0 or less than 1.0.

Item 166.

The image recording apparatus in either one of the Items 160 to 163 is characterized in that:

the setting means sets at least one or more main photographed-subject region or the selected region as the target region of the image processing;

the representing means represents the total image quality value of the original image data calculated from the set main photographed-subject region or the selected region as Q0;

the representing means represents the total image quality value of the outputted image data calculated from the set main photographed-subject region or the selected region as Q1; and the calculating means calculates $\Delta N$ and $\Delta M$ by
$\Delta N=(Q1-N1)-(Q0-N0)$ and
$\Delta M=(Q1-M1)-(Q0-M0)$, respectively, wherein N and M are normalized values,
the total image quality value Q is a functional value given by $Q=f(N, M)$, and
$Q0 \leq Q1$; and the calculating means calculates each of the absolute value of $\Delta N$ and the absolute value of $\Delta M$ so as to be 1.0 or less than 1.0.

Item 167.
The image recording apparatus in either one of the Items 160 to 163 is characterized in that:
the setting means sets at least the entire image region as the target region of the image processing;
the representing means represents the total image quality value of the original image data calculated from the set entire image region as BQ0;
the representing means represents the total image quality value of the outputted image data calculated from the set entire image region as BQ1;
the calculating means calculates $\Delta BN$ and $\Delta BM$ by
$\Delta BN=(BQ1-BN1)-(BQ0-BN0)$ and
$\Delta BM=(BQ1-BM1)-(BQ0-BM0)$, respectively,
wherein N and M are the normalized values,
the total image quality value BQ is the functional value given by $BQ=f(N, M)$, and
$BQ0 \leqq BQ1$; and
the calculating means calculates each of the absolute value of $\Delta BN$ and the absolute value $\Delta BM$ so as to be 1.0 or less than 1.0.

According to the invention described in Items 7, 8, 60, 61, 113, 114, 166, 167, when the main image region or selected region is to be processed, calculation is made so that the absolute values of $\Delta N$ and $\Delta M$ do not exceed 1.0. When the entire image region is to be processed, calculation is made so that the absolute values of $\Delta BN$ and $\Delta BM$ do not exceed 1.0. This ensures image processing of higher accuracy without sacrificing the intention of the photographer.

Item 9.
The image processing method in either one of the Items 1 to 5, and 7 is characterized by:
setting Ata=N0,
when N0 and M0 satisfy $N0 \geqq M0$, and
Ata=M0,
when N0 and M0 do not satisfy $N0 \geqq M0$;
calculating Qta by
Qta=f (Ata, Ata); and
applying the image processing so that the Q1 is getting closer to the calculated Qta.

Item 10.
The image processing method in either one of the Items 1 to 4, 6 and 8 is characterized by:
setting Bta=BN0,
when BN0 and BM0 satisfy $BN0 \geqq BM0$, and
Bta=BM0,
when BN0 and BM0 do not satisfy $BN0 \geqq BM0$;
calculating BQta by
BQta=f (Bta, Bta); and
applying the image processing so that the BQ1 is getting closer to the calculated BQta.

Item 62.
The memory medium in either one of the Items 54 to 58, and 61 is characterized by storing the program comprising:
a program code of setting Ata=N0,
when N0 and M0 satisfy $N0 \geqq M0$, and
Ata=M0,
when N0 and M0 do not satisfy $N0 \geqq M0$;
a program code of calculating Qta by
Qta=f (Ata, Ata); and
a program code of applying the image processing so that the Q1 is getting closer to the calculated Qta.

Item 63.
The memory medium in either one of the Items 54 to 57, 59 and 61 is characterized by storing the program comprising:
a program code of setting Bta=BN0,
when BN0 and BM0 satisfy $BN0 \geqq BM0$, and
Bta=BM0,
when BN0 and BM0 do not satisfy $BN0 \geqq BM0$;
a program code of calculating BQta by
BQta=f (Bta, Bta); and
a program code of applying the image processing so that the BQ1 is getting closer to the calculated BQta.

Item 115.
The image processing apparatus in either one of the Items 107 to 111, and 113 is characterized in that:
the setting means sets Ata=N0,
when N0 and M0 satisfy $N0 \geqq M0$, and
Ata=M0,
when N0 and M0 do not satisfy $N0 \geqq M0$;
the calculating means calculates Qta by
Qta=f (Ata, Ata); and
the applying means applies the image processing so that the Q1 is getting closer to the calculated Qta.

Item 116.
The image processing apparatus in either one of the Items 107 to 110, 112 and 114 is characterized in that:
the setting means sets Bta=BN0,
when BN0 and BM0 satisfy $BN0 \geqq BM0$, and
Bta=BM0,
when BN0 and BM0 do not satisfy $BN0 \geqq BM0$;
the calculating means calculates BQta by
BQta=f (Bta, Bta); and
the applying means applies the image processing so that the BQ1 is getting closer to the calculated BQta.

Item 168.
The image recording apparatus in either one of the Items 160 to 164, and 166 is characterized in that:
the setting means sets Ata=N0,
when N0 and M0 satisfy $N0 \geqq M0$, and
Ata=M0,
when N0 and M0 do not satisfy $N0 \geqq M0$;
the calculating means calculates Qta by
Qta=f (Ata, Ata); and
the applying means applies the image processing so that the Q1 is getting closer to the calculated Qta.

Item 169.
The image recording apparatus in either one of the Items 160 to 163, 165 and 167 is characterized in that:
the setting means sets Bta=BN0,
when BN0 and BM0 satisfy $BN0 \geqq BM0$, and
Bta=BM0,
when BN0 and BM0 do not satisfy $BN0 \geqq BM0$;
the calculating means calculates BQta by
BQta=f (Bta, Bta); and
the applying means applies the image processing so that the BQ1 is getting closer to the calculated BQta.

According to the invention described in Items 9, 10, 62, 63, 115, 116, 168, 169, value Qta and value BQta are calculated in conformity to sharpness value when the granularity value is greater than sharpness value, and in conformity to sharpness value when the granularity value is smaller than sharpness value. Image processing is carried out so that the values Q1 and BQ1 will be closer to values Qta and BQta calculated respectively. This image processing ensures a high-quality image, with the atmosphere of the original image kept intact.

Item 11.

The image processing method in either one of the Items 1 to 4, 5, 7 and 9 is characterized by:

representing a value which satisfies Q0=f (A0, A0) as A0, when the total image quality value Q is a functional value given by Q=f (N, M);

applying the image processing by correcting the sharpness value, when the N0 and A0 satisfy N0≧A0; and applying the image processing by correcting the granularity value, when the N0 and A0 do not satisfy N0≧A0.

Item 12.

The image processing method in either one of the Items 1 to 4, 6, 8 and 10 is characterized by:

representing a value which satisfies BQ0=f (B0, B0) by B0, when the total image quality value BQ is a functional value given by BQ=f (N, M);

applying the image processing by correcting the sharpness value, when the BN0 and B0 satisfy BN0≧B0; and applying the image processing by correcting the granularity value, when the BN0 and B0 do not satisfy BN0≧B0.

Item 64.

The memory medium in either one of the Items 54 to 57, 58, 60 and 53 is characterized by storing the program comprising:

a program code of representing a value which satisfies Q0=f (A0, A0) as A0, when the total image quality value Q is a functional value given by Q=f (N, M);

a program code of applying the image processing by correcting the sharpness value, when the N0 and A0 satisfy N0≧A0; and a program code of applying the image processing by correcting the granularity value, when the N0 and A0 do not satisfy N0≧A0.

Item 65.

The memory medium in either one of the Items 54 to 57, 59, 61 and 63 is characterized by storing the program comprising:

a program code of representing a value which satisfies BQ0=f (B0, B0) by B0, when the total image quality value BQ is a functional value given by BQ=f (N, M);

a program code of applying the image processing by correcting the sharpness value, when the BN0 and B0 satisfy BN0≧B0; and a program code of applying the image processing by correcting the granularity value, when the BN0 and B0 do not satisfy BN0≧B0.

Item 117.

The image processing apparatus in either one of the Items 107 to 110, 111, 113 and 115 is characterized in that:

the representing means represents a value which satisfies Q0=f (A0, A0) as A0, when the total image quality value Q is a functional value given by Q=f (N, M);

the applying means applies the image processing by correcting the sharpness value, when the N0 and A0 satisfy N0≧A0; and the applying means applies the image processing by correcting the granularity value, when the N0 and A0 do not satisfy N0≧A0.

Item 118.

The image processing apparatus in either one of the Items 107 to 110, 112, 114 and 116 is characterized in that:

the representing means represents a value which satisfies BQ0=f (B0, B0) by B0, when the total image quality value BQ is a functional value given by BQ=f (N, M);

the applying means applies the image processing by correcting the sharpness value, when the BN0 and B0 satisfy BN0≧B0; and the applying means applies the image processing by correcting the granularity value, when the BN0 and B0 do not satisfy BN0≧B0.

Item 170.

The image recording apparatus in either one of the Items 160 to 163, 164, 166 and 168 is characterized in that:

the representing means represents a value which satisfies Q0=f (A0, A0) as A0, when the total image quality value Q is a functional value given by Q=f (N, M);

the applying means applies the image processing by correcting the sharpness value, when the N0 and A0 satisfy N0≧A0; and the applying means applies the image processing by correcting the granularity value, when the N0 and A0 do not satisfy N0≧A0.

Item 171.

The image recording apparatus in either one of the Items 160 to 163, 165, 167 and 169 is characterized in that:

the representing means represents a value which satisfies BQ0=f (B0, B0) by B0, when the total image quality value BQ is a functional value given by BQ=f (N, M);

the applying means applies the image processing by correcting the sharpness value, when the BN0 and B0 satisfy BN0≧B0; and the applying means applies the image processing by correcting the granularity value, when the BN0 and B0 do not satisfy BN0≧B0.

According to the invention described in Items 11, 12, 64, 65, 117, 118, 170, 171, when the main image region or selected region is to be processed, image processing is performed by correcting sharpness value if N0≧A0 is met, and by correcting granularity value if it is not met. When the entire image region is to be processed, image processing is performed by correcting the sharpness value if BN0≧B0 is met, and by correcting the granularity value if it is not met. This image processing method improves granularity value and sharpness value and ensures a high-quality image, with the atmosphere of the original image kept intact.

Item 13.

The image processing method in either one of the Items 1 to 5 is characterized by:

setting at least one or more than main photographed-subject region, or the selected region as the target region of the image processing;

representing the color performance value of the original image data calculated from the set main photographed-subject region or the selected region as C0;

representing the color performance value of the outputted image data calculated from the set main photographed-subject region or the selected region as C1; and calculating the difference between N1/N0 and C1/C0 so as to be equal to or less than 100%.

Item 14.

The image processing method in either one of the Items 1 to 5 is characterized by:

setting at least one or more than main photographed-subject region or the selected region as the target region of the image processing;

representing the color performance value of the original image data calculated from the set main photographed-subject region or the selected region as C0;

representing the color performance value of the outputted image data calculated from the set main photographed-subject region or the selected region as C1; and calculating the difference between M1/M0 and C1/C0 so as to be equal to or less than 100%.

Item 66.

The memory medium in either one of the Items 54 to 58 is characterized by storing the program comprising:

a program code of setting at least one or more than main photographed-subject region, or the selected region as the target region of the image processing;

a program code of representing the color performance value of the original image data calculated from the set main photographed-subject region or the selected region as C0;

a program code of representing the color performance value of the outputted image data calculated from the set main photographed-subject region or the selected region as C1; and a program code of calculating the difference between N1/N0 and C1/C0 so as to be equal to or less than 100%.

Item 67.

The memory medium in either one of the Items 54 to 58 is characterized by storing the program comprising:

a program code of setting at least one or more than main photographed-subject region or the selected region as the target region of the image processing;

a program code of representing the color performance value of the original image data calculated from the set main photographed-subject region or the selected region as C0;

a program code of representing the color performance value of the outputted image data calculated from the set main photographed-subject region or the selected region as C1; and a program code of calculating the difference between M1/M0 and C1/C0 so as to be equal to or less than 100%.

Item 119.

The image processing apparatus in either one of the Items 107 to 111 is characterized in that:

the setting means sets at least one or more than main photographed-subject region, or the selected region as the target region of the image processing;

the representing means represents the color performance value of the original image data calculated from the set main photographed-subject region or the selected region as C0;

the representing means represents the color performance value of the outputted image data calculated from the set main photographed-subject region or the selected region as C1; and the calculating means calculates the difference between N1/N0 and C1/C0 so as to be equal to or less than 100%.

Item 120.

The image processing apparatus in either one of the Items 107 to 111 is characterized in that:

the setting means sets at least one or more than main photographed-subject region or the selected region as the target region of the image processing;

the representing means represents the color performance value of the original image data calculated from the set main photographed-subject region or the selected region as C0;

the representing means represents the color performance value of the outputted image data calculated from the set main photographed-subject region or the selected region as C1; and the calculating means calculates the difference between M1/M0 and C1/C0 so as to be equal to or less than 100%.

Item 172.

The image recording apparatus in either one of the Items 160 to 164 is characterized in that:

the setting means sets at least one or more than main photographed-subject region, or the selected region as the target region of the image processing;

the representing means represents the color performance value of the original image data calculated from the set main photographed-subject region or the selected region as C0;

the representing means represents the color performance value of the outputted image data calculated from the set main photographed-subject region or the selected region as C1; and the calculating means calculates the difference between N1/N0 and C1/C0 so as to be equal to or less than 100%.

Item 173.

The image recording apparatus in either one of the Items 160 to 164 is characterized in that:

the setting means sets at least one or more than main photographed-subject region or the selected region as the target region of the image processing;

the representing means represents the color performance value of the original image data calculated from the set main photographed-subject region or the selected region as C0;

the representing means represents the color performance value of the outputted image data calculated from the set main photographed-subject region or the selected region as C1; and the calculating means calculates the difference between M1/M0 and C1/C0 so as to be equal to or less than 100%.

According to the invention described in Items 13, 14, 66, 67, 119, 120, 172, 173, calculation is made so that the difference between the ratio of color performance values in the original image and output image and the ratio of granularity values or the difference between the ratio of color performance values in the original image and output image and the ratio of sharpness values does not to exceed 100%. This allows the setting to be made so that color performance value and granularity value or color performance value and sharpness value come closer to the same value, thereby improving the effect of keeping the atmosphere unchanged.

Item 15.

In an image processing method of producing output image data by applying an image processing onto original image data of a photographed image, the image processing method is characterized by:

setting an entire image region of the original image data, at least one or more main photographed-subject region or selected region as a target region to be applied with the image processing;

comparing red information and green information in the set target region;

applying the image processing by weighting red color, when the compared target region is reddish; and applying the image processing by weighting green color, when the compared target region is greenish.

Item 16.

The image processing method in either one of the Items 1 to 14 is characterized by:

comparing red information and green information in the set target region;

applying the image processing by weighting red color, when the compared target region is reddish; and applying the image processing by weighting green color, when the compared target region is greenish.

Item 68.

In a memory medium for storing a program code which is readable by a computer and produces output image data by applying an image processing onto original image data of a photographed image, the memory media is characterized by storing the program comprising:

a program code of setting an entire image region of the original image data, at least one or more main photographed-subject region or selected region as a target region to be applied with the image processing;

a program code of comparing red information and green information in the set target region;

a program code of applying the image processing by weighting red color, when the compared target region is reddish; and a program code of applying the image processing by weighting green color, when the compared target region is greenish.

Item 69.

The memory medium in either one of the Items 54 to 67 is characterized by storing the program comprising:

a program code of comparing red information and green information in the set target region;

a program code of applying the image processing by weighting red color, when the compared target region is reddish; and a program code of applying the image processing by weighting green color, when the compared target region is greenish.

Item 121.

In an image processing apparatus of producing output image data by applying an image processing onto original image data of a photographed image, the image processing apparatus is characterized by comprising:

a setting means for setting an entire image region of the original image data, at least one or more main photographed-subject region or selected region as a target region to be applied with the image processing;

a comparing means for comparing red information and green information in the set target region;

an applying means for applying the image processing by weighting red color, when the compared target region is reddish; and an applying means for applying the image processing by weighting green color, when the compared target region is greenish.

Item 122.

The image processing apparatus in either one of the Items 107 to 120 is characterized in that:

the comparing means compares red information and green information in the set target region;

the applying means applies the image processing by weighting red color, when the compared target region is reddish; and the applying means applies the image processing by weighting green color, when the compared target region is greenish.

Item 174.

In an image recording apparatus of producing output image data by applying an image processing onto original image data of a photographed image, the image recording apparatus is characterized by comprising:

a setting means for setting an entire image region of the original image data, at least one or more main photographed-subject region or selected region as a target region to be applied with the image processing;

a comparing means for comparing red information and green information in the set target region;

an applying means for applying the image processing by weighting red color, when the compared target region is reddish; and an applying means for applying the image processing by weighting green color, when the compared target region is greenish.

Item 175.

The image recording apparatus in either one of the Items 160 to 173 is characterized in that:

the comparing means compares red information and green information in the set target region;

the applying means applies the image processing by weighting red color, when the compared target region is reddish; and the applying means applies the image processing by weighting green color, when the compared target region is greenish.

According to the invention described in Items 15, 16, 68, 69, 121, 122, 174, 175, in the region to be processed, comparison is made between color information of red and that of green. If the color is red, weight is assigned to red to perform image processing. If the color is green, weight is assigned to green. Then image is processed to provide a high-quality output image intended by the photographer in conformity to the scene of the photographed image.

Item 17.

In an image processing method of producing output image data by applying an image processing onto original image data of a photographed image, the image processing method is characterized by:

setting an entire image region of the original image data, at least one or more main photographed-subject region or selected region as a target region to be applied with the image processing;

calculating a flesh color region and a background region in the set target region; and applying the image processing in accordance with each of the calculated flesh color region, background region, and border region of the flesh color region and the background region.

Item 18.

The image processing method in either one of the Items 1 to 14 is characterized by:

applying the image processing in accordance with each of the calculated flesh color region, the background region, and the border region of the flesh color region and the background region.

Item 70.

In a memory medium for storing a program code which is readable by a computer and produces output image data by applying an image processing onto original image data of a photographed image, the memory media is characterized by storing the program comprising:

a program code of setting an entire image region of the original image data, at least one or more main photographed-subject region or selected region as a target region to be applied with the image processing;

a program code of calculating a flesh color region and a background region in the set target region; and a program code of applying the image processing in accordance with each of the calculated flesh color region, background region, and border region of the flesh color region and the background region.

Item 71.

The memory medium in either one of the Items 54 to 67 is characterized by storing the program comprising:

a program code of applying the image processing in accordance with each of the calculated flesh color region, the background region, and the border region of the flesh color region and the background region.

Item 123.

In an image processing apparatus of producing output image data by applying an image processing onto original image data of a photographed image, the image processing apparatus is characterized by comprising:

a setting means for setting an entire image region of the original image data, at least one or more main photographed-subject region or selected region as a target region to be applied with the image processing;

a calculating means for calculating a flesh color region and a background region in the set target region; and an applying means for applying the image processing in accordance with each of the calculated flesh color region, background region, and border region of the flesh color region and the background region.

Item 124.

The image processing apparatus in either one of the Items 107 to 120 is characterized in that:

the applying means applies the image processing in accordance with each of the calculated flesh color region, the background region, and the border region of the flesh color region and the background region.

Item 176.

In an image recording apparatus of producing output image data by applying an image processing onto original image data of a photographed image, the image recording apparatus is characterized by comprising:

a setting means for setting an entire image region of the original image data, at least one or more main photographed-subject region or selected region as a target region to be applied with the image processing;

a calculating means for calculating a fresh color region and a background region in the set target region; and an applying means for applying the image processing in accordance with each of the calculated flesh color region, background region, and border region of the flesh color region and the background region.

Item 177.

The image recording apparatus in either one of the Items 160 to 173 is characterized in that:

the applying means applies the image processing in accordance with each of the calculated flesh color region, the background region, and the border region of the flesh color region and the background region.

According to the invention described in Items 17, 18, 70, 71, 123, 124, 176, 177, in the region to be processed, skin color and background regions are calculated, and image processing is performed in conformity to each of the skin color region, background region and boundary region between the skin color and background regions. This ensures the connection between the subject of the photographed image and background to be reproduced without a sense of incompatibility, thereby more flexible image processing is provided.

Item 19.

In an image processing method of producing output image data by applying an image processing onto original image data of a photographed image, the image processing method is characterized by:

setting an entire image region of the original image data, at least one or more main photographed-subject region or selected region as a target region to be applied with the image processing;

generating an intermediate process image data from an image characteristic obtained from the set target region, so that difference of granularity noise components between the intermediate process image data and the original image data is equal to or less than 100%; and generating the output image data, by carrying out operations of an addition and a subtraction, or either one of the addition and subtraction, of the generated intermediate process image data and the original image data.

Item 20.

The image processing method in either one of the Items 1 to 14 is characterized by:

generating the intermediate process image data from the image characteristic obtained from the set target region, so that difference of granularity noise components between the intermediate process image data and the original image data is equal to or less than 100%; and generating the output image data, by carrying out operations of an addition and a subtraction, or either one of the addition and subtraction, of the generated intermediate process image data and the original image data.

Item 21.

In an image processing method of producing output image data by applying an image processing onto original image data of a photographed image, the image processing method is characterized by:

setting an entire image region of the original image data, at least one or more main photographed-subject region or selected region as a target region to be applied with the image processing;

generating the intermediate process image data from the image characteristic obtained from the set target region, so that difference of a middle frequency component between the intermediate process image data and the original image data is equal to or less than 100%; and generating the output image data, by carrying out operations of an addition and a subtraction, or either one of the addition and subtraction, of the generated intermediate process image data and the original image data.

Item 22.

The image processing method in either one of the Items 1 to 14 is characterized by:

generating the intermediate process image data from the image characteristic obtained from the set target region, so that difference of a middle frequency component between the intermediate process image data and the original image data is equal to or less than 100%; and generating the output image data, by carrying out operations of an addition and a subtraction, or either one of the addition and subtraction, of the generated intermediate process image data and the original image data.

Item 23.

In an image processing method of producing output image data by applying an image processing onto original image data of a photographed image, the image processing method is characterized by:

setting an entire image region of the original image data, at least one or more main photographed-subject region or selected region as a target region to be applied with the image processing;

generating the intermediate process image data from an image characteristic obtained from the set target region, so that difference of chroma between the intermediate process image data and the original image data is equal to or less than 100%; and generating the output image data, by carrying out operations of an addition and a subtraction, or either one of the addition and subtraction, of the generated intermediate process image data and the original image data.

Item 24.

The image processing method in either one of the Items 1 to 14 is characterized by:

generating the intermediate process image data from the image characteristic obtained from the set target region, so that difference of chroma between the intermediate process image data and the original image data is equal to or less than 100%; and generating the output image data, by carrying out operations of an addition and a subtraction, or either one of the addition and subtraction, of the generated intermediate process image data and the original image data.

Item 25.

In an image processing method of producing output image data by applying an image processing onto original image data of a photographed image, the image processing method is characterized by:

setting an entire image region of the original image data, at least one or more main photographed-subject region or selected region as a target region to be applied with the image processing;

generating the intermediate process image data from the image characteristic obtained from the set target region, so that difference of color contamination between the intermediate process image data and the original image data is equal to or less than 100%; and generating the output image data, by carrying out operations of an addition and a subtraction, or either one of the addition and subtraction, of the generated intermediate process image data and the original image data.

Item 26.

The image processing method in either one of the Items 1 to 14 is characterized by:

generating the intermediate process image data from the image characteristic obtained from the set target region, so that difference of color contamination between the intermediate process image data and the original image data is equal to or less than 100%; and generating the output image data, by carrying out operations of an addition and a subtraction, or either one of the addition and subtraction, of the generated intermediate process image data and the original image data.

Item 27.

In an image processing method of producing output image data by applying an image processing onto original image data of a photographed image, the image processing method is characterized by:

setting an entire image region of the original image data, at least one or more main photographed-subject region or selected region as a target region to be applied with the image processing;

generating the intermediate process image data from the image characteristic obtained from the set target region, so that difference of white balance between the intermediate process image data and the original image data is equal to or less than 100%; and generating the output image data, by carrying out operations of an addition and a subtraction, or either one of the addition and subtraction, of the generated intermediate process image data and the original image data.

Item 28.

The image processing method in either one of the Items 1 to 14 is characterized by:

generating the intermediate process image data from the image characteristic obtained from the set target region, so that difference of white balance between the intermediate process image data and the original image data is equal to or less than 100%; and generating the output image data, by carrying out operations of an addition and a subtraction, or either one of the addition and subtraction, of the generated intermediate process image data and the original image data.

Item 29.

In an image processing method of producing output image data by applying an image processing onto original image data of a photographed image, the image processing method is characterized by:

setting an entire image region of the original image data, at least one or more main photographed-subject region or selected region as a target region to be applied with the image processing;

generating the intermediate process image data from the image characteristic obtained from the set target region, so that the difference of contrast between the intermediate process image data and the original image data is equal to or less than 100%; and generating the output image data, by carrying out operations of an addition and a subtraction, or either one of the addition and subtraction, of the generated intermediate process image data and the original image data.

Item 30.

The image processing method in either one of the Items 1 to 14 is characterized by:

generating the intermediate process image data from the image characteristic obtained from the set target region, so that difference of contrast between the intermediate process image data and the original image data is equal to or less than 100%; and generating the output image data, by carrying out operations of an addition and a subtraction, or either one of the addition and subtraction, of the generated intermediate process image data and the original image data.

Item 31.

In an image processing method of producing output image data by applying an image processing onto original image data of a photographed image, the image processing method is characterized by:

setting an entire image region of the original image data, at least one or more main photographed-subject region or selected region as a target region to be applied with the image processing;

generating the intermediate process image data from the image characteristic obtained from the set target region, so that difference of a high-frequency component between the intermediate process image data and the original image data is equal to or less than 100%; and generating the output image data, by carrying out operations of an addition and a subtraction, or either one of the addition and subtraction, of the generated intermediate process image data and the original image data.

Item 72.

In a memory medium for storing a program code which is readable by a computer and produces output image data by applying an image processing onto original image data of a photographed image, the memory media is characterized by storing the program comprising:

a program code of setting an entire image region of the original image data, at least one or more main photographed-subject region or selected region as a target region to be applied with the image processing;

a program code of generating an intermediate process image data from an image characteristic obtained from the set target region, so that difference of granularity noise components between the intermediate process image data and the original image data is equal to or less than 100%; and a program code of generating the output image data, by carrying out operations of an addition and a subtraction, or either one of the addition and subtraction, of the generated intermediate process image data and the original image data.

Item 73.

The memory medium in either one of the Items 54 to 67 is characterized by storing the program comprising:

a program code of generating the intermediate process image data from the image characteristic obtained from the set target region, so that difference of granularity noise components between the intermediate process image data and the original image data is equal to or less than 100%; and a program code of generating the output image data, by carrying out operations of an addition and a subtraction, or either one of the addition and subtraction, of the generated intermediate process image data and the original image data.

Item 74.

In a memory medium for storing a program code which is readable by a computer and produces output image data by applying an image processing onto original image data of a photographed image, the memory media is characterized by storing the program comprising:

a program code of setting an entire image region of the original image data, at least one or more main photographed-subject region or selected region as a target region to be applied with the image processing;

a program code of generating the intermediate process image data from the image characteristic obtained from the set target region, so that difference of a middle frequency component between the intermediate process image data and the original image data is equal to or less than 100%; and a program code of generating the output image data, by carrying out operations of an addition and a subtraction, or either one of the addition and subtraction, of the generated intermediate process image data and the original image data.

Item 75.

The memory medium in either one of the Items 54 to 67 is characterized by storing the program comprising:

a program code of generating the intermediate process image data from the image characteristic obtained from the set target region, so that difference of a middle frequency component between the intermediate process image data and the original image data is equal to or less than 100%; and a program code of generating the output image data, by carrying out operations of an addition and a subtraction, or either one of the addition and subtraction, of the generated intermediate process image data and the original image data.

Item 76.

In a memory medium for storing a program code which is readable by a computer and produces output image data by applying an image processing onto original image data of a photographed image, the memory media is characterized by storing the program comprising:

a program code of setting an entire image region of the original image data, at least one or more main photographed-subject region or selected region as a target region to be applied with the image processing;

a program code of generating the intermediate process image data from an image characteristic obtained from the set target region, so that difference of chroma between the intermediate process image data and the original image data is equal to or less than 100%; and a program code of generating the output image data, by carrying out operations of an addition and a subtraction, or either one of the addition and subtraction, of the generated intermediate process image data and the original image data.

Item 77.

The memory medium in either one of the Items 54 to 67 is characterized by storing the program comprising:

a program code of generating the intermediate process image data from the image characteristic obtained from the set target region, so that difference of chroma between the intermediate process image data and the original image data is equal to or less than 100%; and a program code of generating the output image data, by carrying out operations of an addition and a subtraction, or either one of the addition and subtraction, of the generated intermediate process image data and the original image data.

Item 78.

In a memory medium for storing a program code which is readable by a computer and produces output image data by applying an image processing onto original image data of a photographed image, the memory media is characterized by storing the program comprising:

a program code of setting an entire image region of the original image data, at least one or more main photographed-subject region or selected region as a target region to be applied with the image processing;

a program code of generating the intermediate process image data from the image characteristic obtained from the set target region, so that difference of color contamination between the intermediate process image data and the original image data is equal to or less than 100%; and a program code of generating the output image data, by carrying out operations of an addition and a subtraction, or either one of the addition and subtraction, of the generated intermediate process image data and the original image data.

Item 79.

The memory medium in either one of the Items 54 to 67 is characterized by storing the program comprising:

a program code of generating the intermediate process image data from the image characteristic obtained from the set target region, so that difference of color contamination between the intermediate process image data and the original image data is equal to or less than 100%; and a program code of generating the output image data, by carrying out operations of an addition and a subtraction, or either one of the addition and subtraction, of the generated intermediate process image data and the original image data.

Item 80.

In a memory medium for storing a program code which is readable by a computer and produces output image data by applying an image processing onto original image data of a photographed image, the memory media is characterized by storing the program comprising:

a program code of setting an entire image region of the original image data, at least one or more main photographed-subject region or selected region as a target region to be applied with the image processing;

a program code of generating the intermediate process image data from the image characteristic obtained from the set target region, so that difference of white balance between the intermediate process image data and the original image data is equal to or less than 100%; and a program code of generating the output image data, by carrying out operations of an addition and a subtraction, or either one of the addition and subtraction, of the generated intermediate process image data and the original image data.

Item 81.

The memory medium in either one of the Items 54 to 67 is characterized by storing the program comprising:

a program code of generating the intermediate process image data from the image characteristic obtained from the set target region, so that difference of white balance between the intermediate process image data and the original image data is equal to or less than 100%; and a program code of generating the output image data, by carrying out operations of an addition and a subtraction, or either one of the addition and subtraction, of the generated intermediate process image data and the original image data.

Item 82.

In a memory medium for storing a program code which is readable by a computer and produces output image data by applying an image processing onto original image data of a photographed image, the memory media is characterized by storing the program comprising:

a program code of setting an entire image region of the original image data, at least one or more main photographed-subject region or selected region as a target region to be applied with the image processing;

a program code of generating the intermediate process image data from the image characteristic obtained from the set target region, so that the difference of contrast between the intermediate process image data and the original image data is equal to or less than 100%; and a program code of generating the output image data, by carrying out operations of an addition and a subtraction, or either one of the addition and subtraction, of the generated intermediate process image data and the original image data.

Item 83.

The memory medium in either one of the Items 54 to 67 is characterized by storing the program comprising:

a program code of generating the intermediate process image data from the image characteristic obtained from the set target region, so that difference of contrast between the intermediate process image data and the original image data is equal to or less than 100%; and a program code of generating the output image data, by carrying out operations of an addition and a subtraction, or either one of the addition and subtraction, of the generated intermediate process image data and the original image data.

Item 84.

In a memory medium for storing a program code which is readable by a computer and produces output image data by applying an image processing onto original image data of a photographed image, the memory media is characterized by storing the program comprising:

a program code of setting an entire image region of the original image data, at least one or more main photographed-subject region or selected region as a target region to be applied with the image processing;

a program code of generating the intermediate process image data from the image characteristic obtained from the set target region, so that difference of a high-frequency component between the intermediate process image data and the original image data is equal to or less than 100%; and a program code of generating the output image data, by carrying out operations of an addition and a subtraction, or either one of the addition and subtraction, of the generated intermediate process image data and the original image data.

Item 125.

In an image processing apparatus of producing output image data by applying an image processing onto original image data of a photographed image, the image processing apparatus is characterized by comprising:

a setting means for setting an entire image region of the original image data, at least one or more main photographed-subject region or selected region as a target region to be applied with the image processing;

a generating means for generating an intermediate process image data from an image characteristic obtained from the set target region, so that difference of granularity noise components between the intermediate process image data and the original image data is equal to or less than 100%; and a generating means for generating the output image data, by carrying out operations of an addition and a subtraction, or either one of the addition and subtraction, of the generated intermediate process image data and the original image data.

Item 126.

The image processing apparatus in either one of the Items 107 to 120 is characterized in that:

the generating means generates the intermediate process image data from the image characteristic obtained from the set target region, so that difference of granularity noise components between the intermediate process image data and the original image data is equal to or less than 100%; and the generating means generates the output image data, by carrying out operations of an addition and a subtraction, or either one of the addition and subtraction, of the generated intermediate process image data and the original image data.

Item 127.

In an image processing apparatus of producing output image data by applying an image processing onto original image data of a photographed image, the image processing apparatus is characterized by comprising:

a setting means for setting an entire image region of the original image data, at least one or more main photographed-subject region or selected region as a target region to be applied with the image processing;

a generating means for generating the intermediate process image data from the image characteristic obtained from the set target region, so that difference of a middle frequency component between the intermediate process image data and the original image data is equal to or less than 100%; and a generating means for generating the output image data, by carrying out operations of an addition and a subtraction, or either one of the addition and subtraction, of the generated intermediate process image data and the original image data.

Item 128.

The image processing apparatus in either one of the Items 107 to 120 is characterized in that:

the generating means generates the intermediate process image data from the image characteristic obtained from the set target region, so that difference of a middle frequency component between the intermediate process image data and the original image data is equal to or less than 100%; and the generating means generates the output image data, by carrying out operations of an addition and a subtraction, or either one of the addition and subtraction, of the generated intermediate process image data and the original image data.

Item 129.

In an image processing apparatus of producing output image data by applying an image processing onto original image data of a photographed image, the image processing apparatus is characterized by comprising:

a setting means for setting an entire image region of the original image data, at least one or more main photographed-subject region or selected region as a target region to be applied with the image processing;

a generating means for generating the intermediate process image data from an image characteristic obtained from the set target region, so that difference of chroma between the intermediate process image data and the original image data is equal to or less than 100%; and a generating means for generating the output image data, by carrying out operations of an addition and a subtraction, or either one of the addition and subtraction, of the generated intermediate process image data and the original image data.

Item 130.

The image processing apparatus in either one of the Items 107 to 120 is characterized in that:

the generating means generates the intermediate process image data from the image characteristic obtained from the set target region, so that difference of chroma between the intermediate process image data and the original image data is equal to or less than 100%; and the generating means generates the output image data, by carrying out operations of an addition and a subtraction, or either one of the addition and subtraction, of the generated intermediate process image data and the original image data.

Item 131.

In an image processing apparatus of producing output image data by applying an image processing onto original image data of a photographed image, the image processing apparatus is characterized by comprising:

a setting means for setting an entire image region of the original image data, at least one or more main photographed-subject region or selected region as a target region to be applied with the image processing;

a generating means for generating the intermediate process image data from the image characteristic obtained from the set target region, so that difference of color contamination between the intermediate process image data and the original image data is equal to or less than 100%; and a generating means for generating the output image data, by carrying out operations of an addition and a subtraction, or either one of the addition and subtraction, of the generated intermediate process image data and the original image data.

Item 132.

The image processing apparatus in either one of the Items 107 to 120 is characterized in that:

the generating means generates the intermediate process image data from the image characteristic obtained from the set target region, so that difference of color contamination between the intermediate process image data and the original image data is equal to or less than 100%; and the generating means generates the output image data, by carrying out operations of an addition and a subtraction, or either one of the addition and subtraction, of the generated intermediate process image data and the original image data.

Item 133.

In an image processing apparatus of producing output image data by applying an image processing onto original image data of a photographed image, the image processing apparatus is characterized by comprising:

a setting means for setting an entire image region of the original image data, at least one or more main photographed-subject region or selected region as a target region to be applied with the image processing;

a generating means for generating the intermediate process image data from the image characteristic obtained from the set target region, so that difference of white balance between the intermediate process image data and the original image data is equal to or less than 100%; and a generating means for generating the output image data, by carrying out operations of an addition and a subtraction, or either one of the addition and subtraction, of the generated intermediate process image data and the original image data.

Item 134.

The image processing apparatus in either one of the Items 107 to 120 is characterized in that:

the generating means generates the intermediate process image data from the image characteristic obtained from the set target region, so that difference of white balance between the intermediate process image data and the original image data is equal to or less than 100%; and the generating means generates the output image data, by carrying out operations of an addition and a subtraction, or either one of the addition and subtraction, of the generated intermediate process image data and the original image data.

Item 135.

In an image processing apparatus of producing output image data by applying an image processing onto original image data of a photographed image, the image processing apparatus is characterized by comprising:

a setting means for setting an entire image region of the original image data, at least one or more main photographed-subject region or selected region as a target region to be applied with the image processing;

a generating means for generating the intermediate process image data from the image characteristic obtained from the set target region, so that the difference of contrast between the intermediate process image data and the original image data is equal to or less than 100%; and a generating means for generating the output image data, by carrying out operations of an addition and a subtraction, or either one of the addition and subtraction, of the generated intermediate process image data and the original image data.

Item 136.

The image processing apparatus in either one of the Items 107 to 120 is characterized in that:

the generating means generates the intermediate process image data from the image characteristic obtained from the set target region, so that difference of contrast between the intermediate process image data and the original image data is equal to or less than 100%; and the generating means generates the output image data, by carrying out operations of an addition and a subtraction, or either one of the addition and subtraction, of the generated intermediate process image data and the original image data.

Item 137.

In an image processing apparatus of producing output image data by applying an image processing onto original image data of a photographed image, the image processing apparatus is characterized by comprising:

a setting means for setting an entire image region of the original image data, at least one or more main photographed-subject region or selected region as a target region to be applied with the image processing;

a generating means for generating the intermediate process image data from the image characteristic obtained from the set target region, so that difference of a high-frequency component between the intermediate process image data and the original image data is equal to or less than 100%; and a generating means for generating the output image data, by carrying out operations of an addition and a subtraction, or either one of the addition and subtraction, of the generated intermediate process image data and the original image data.

Item 178.

In an image recording apparatus of producing output image data by applying an image processing onto original image data of a photographed image, the image recording apparatus is characterized by comprising:

a setting means for setting an entire image region of the original image data, at least one or more main photographed-subject region or selected region as a target region to be applied with the image processing;

a generating means for generating an intermediate process image data from an image characteristic obtained from the set target region, so that difference of granularity noise components between the intermediate process image data and the original image data is equal to or less than 100%; and a generating means for generating the output image data, by carrying out operations of an addition and a subtraction, or either one of the addition and subtraction, of the generated intermediate process image data and the original image data.

Item 179.

The image recording apparatus in either one of the Items 160 to 173 is characterized in that:

the generating means generates the intermediate process image data from the image characteristic obtained from the set target region, so that difference of granularity noise components between the intermediate process image data and the original image data is equal to or less than 100%; and the generating means generates the output image data, by carrying out operations of an addition and a subtraction, or either one of the addition and subtraction, of the generated intermediate process image data and the original image data.

Item 180.

In an image recording apparatus of producing output image data by applying an image processing onto original image data of a photographed image, the image recording apparatus is characterized by comprising:

a setting means for setting an entire image region of the original image data, at least one or more main photographed-subject region or selected region as a target region to be applied with the image processing;

a generating means for generating the intermediate process image data from the image characteristic obtained from the set target region, so that difference of a middle frequency component between the intermediate process image data and the original image data is equal to or less than 100%; and a generating means for generating the output image data, by carrying out operations of an addition and a subtraction, or either one of the addition and subtraction, of the generated intermediate process image data and the original image data.

Item 181.

The image recording apparatus in either one of the Items 160 to 173 is characterized in that:

the generating means generates the intermediate process image data from the image characteristic obtained from the set target region, so that difference of a middle frequency component between the intermediate process image data and the original image data is equal to or less than 100%; and the generating means generates the output image data, by carrying out operations of an addition and a subtraction, or either one of the addition and subtraction, of the generated intermediate process image data and the original image data.

Item 182.

In an image recording apparatus of producing output image data by applying an image processing onto original image data of a photographed image, the image recording apparatus is characterized by comprising:

a setting means for setting an entire image region of the original image data, at least one or more main photographed-subject region or selected region as a target region to be applied with the image processing;

a generating means for generating the intermediate process image data from an image characteristic obtained from the set target region, so that difference of chroma between the intermediate process image data and the original image data is equal to or less than 100%; and a generating means for generating the output image data, by carrying out operations of an addition and a subtraction, or either one of the addition and subtraction, of the generated intermediate process image data and the original image data.

Item 183.

The image recording apparatus in either one of the Items 160 to 173 is characterized in that:

the generating means generates the intermediate process image data from the image characteristic obtained from the set target region, so that difference of chroma between the intermediate process image data and the original image data is equal to or less than 100%; and the generating means generates the output image data, by carrying out operations of an addition and a subtraction, or either one of the addition and subtraction, of the generated intermediate process image data and the original image data.

Item 184.

In an image recording apparatus of producing output image data by applying an image processing onto original image data of a photographed image, the image recording apparatus is characterized by comprising:

a setting means for setting an entire image region of the original image data, at least one or more main photographed-subject region or selected region as a target region to be applied with the image processing;

a generating means for generating the intermediate process image data from the image characteristic obtained from the set target region, so that difference of color contamination between the intermediate process image data and the original image data is equal to or less than 100%; and a generating means for generating the output image data, by carrying out operations of an addition and a subtraction, or either one of the addition and subtraction, of the generated intermediate process image data and the original image data.

Item 185.

The image recording apparatus in either one of the Items 160 to 173 is characterized in that:

the generating means generates the intermediate process image data from the image characteristic obtained from the set target region, so that difference of color contamination between the intermediate process image data and the original image data is equal to or less than 100%; and the generating means generates the output image data, by carrying out operations of an addition and a subtraction, or either one of the addition and subtraction, of the generated intermediate process image data and the original image data.

Item 186.

In an image recording apparatus of producing output image data by applying an image processing onto original image data of a photographed image, the image recording apparatus is characterized by comprising:

a setting means for setting an entire image region of the original image data, at least one or more main photographed-subject region or selected region as a target region to be applied with the image processing;

a generating means for generating the intermediate process image data from the image characteristic obtained from the set target region, so that difference of white balance between the intermediate process image data and the original image data is equal to or less than 100%; and a generating means for generating the output image data, by carrying out operations of an addition and a subtraction, or either one of the addition and subtraction, of the generated intermediate process image data and the original image data.

Item 187.

The image recording apparatus in either one of the Items 160 to 173 is characterized in that:

the generating means generates the intermediate process image data from the image characteristic obtained from the set target region, so that difference of white balance between the intermediate process image data and the original image data is equal to or less than 100%; and the generating means generates the output image data, by carrying out operations of an addition and a subtraction, or either one of the addition and subtraction, of the generated intermediate process image data and the original image data.

Item 188.

In an image recording apparatus of producing output image data by applying an image processing onto original image data of a photographed image, the image recording apparatus is characterized by comprising:

a setting means for setting an entire image region of the original image data, at least one or more main photographed-subject region or selected region as a target region to be applied with the image processing;

a generating means for generating the intermediate process image data from the image characteristic obtained from the set target region, so that the difference of contrast between the intermediate process image data and the original image data is equal to or less than 100%; and a generating means for generating the output image data, by carrying out operations of an addition and a subtraction, or either one of the addition and subtraction, of the generated intermediate process image data and the original image data.

Item 189.

The image recording apparatus in either one of the Items 160 to 173 is characterized in that:

the generating means generates the intermediate process image data from the image characteristic obtained from the set target region, so that difference of contrast between the intermediate process image data and the original image data is equal to or less than 100%; and the generating means generates the output image data, by carrying out operations of an addition and a subtraction, or either one of the addition and subtraction, of the generated intermediate process image data and the original image data.

Item 190.

In an image recording apparatus of producing output image data by applying an image processing onto original image data of a photographed image, the image recording apparatus is characterized by comprising:

a setting means for setting an entire image region of the original image data, at least one or more main photographed-subject region or selected region as a target region to be applied with the image processing;

a generating means for generating the intermediate process image data from the image characteristic obtained from the set target region, so that difference of a high-frequency component between the intermediate process image data and the original image data is equal to or less than 100%; and a generating means for generating the output image data, by carrying out operations of an addition and a subtraction, or either one of the addition and subtraction, of the generated intermediate process image data and the original image data.

According to the invention described in Items 19 to 31, 72 to 84, 125 to 137, 178 to 190, in the region to be processed, intermediate processed image data is generated. Output image data is generated by calculation of the original image data and this intermediate processed image data. The intermediate processed image data is generated so that the difference of characteristic values in the intermediate processed image data and original image data will not exceed 100% in any one of the values of characteristics including granular noise component, intermediate frequency component, chroma, color turbidity, white balance, contrast and high frequency component. This provides an image processing method that ensures a high-quality output image wherein the connection between the subject of the photographed image and background is free of a sense of incompatibility, and the atmosphere is kept unchanged.

Item 32.

The image processing method in either one of the Items 1 to 31 is characterized by:

obtaining information about either one of photographing conditions which are a photographed region, a type of photographing scene, a photographing distance, and a reflected light detection of an electronic flash, about the photographed image;

presuming a size of the main photographed-subject region in the original image data from information about the obtained photographing condition; and applying the image processing in accordance with the presumed size of the main photographed-subject region.

Item 85.

The memory medium in either one of the Items 54 to 31 is characterized by storing the program comprising:

a program code of obtaining information about either one of photographing conditions which are a photographed region, a type of photographing scene, a photographing distance, and a reflected light detection of an electronic flash, about the photographed image;

a program code of presuming a size of the main photographed-subject region in the original image data from information about the obtained photographing condition; and a program code of applying the image processing in accordance with the presumed size of the main photographed-subject region.

Item 138.

The image processing apparatus in either one of the Items 107 to 31 is characterized in that:

the obtaining means obtains information about either one of photographing conditions which are a photographed region, a type of photographing scene, a photographing distance, and a reflected light detection of an electronic flash, about the photographed image;

the presuming means presumes a size of the main photographed-subject region in the original image data from information about the obtained photographing condition; and the applying means applies the image processing in accordance with the presumed size of the main photographed-subject region.

Item 191.

The image recording apparatus in either one of the Items 160 to 190 is characterized in that:

the obtaining means obtains information about either one of photographing conditions which are a photographed region, a type of photographing scene, a photographing distance, and a reflected light detection of an electronic flash, about the photographed image;

the presuming means presumes a size of the main photographed-subject region in the original image data from information about the obtained photographing condition; and the applying means applies the image processing in accordance with the presumed size of the main photographed-subject region.

According to the invention described in Items 32, 85, 138, 191, the present invention obtains information on one of the photographing conditions of subject region, photographed scene type, distance of a subject and detection of light reflected from a stroboscopic lamp, specifies the size of the main photographed subject in the original image data based on that information, and performs image processing based on the size of the estimated main photographed subject. This method allows more flexible and high precision image processing in conformity to the photographed image scene.

Item 34.

The image processing method in Item 32 is characterized by:

obtaining information about the size of the output image data of the photographed image, and the size of the main photographed-subject region in the output image data;

presuming information about the size of the output image data of the photographed image, and the size of the main photographed-subject region in the output image data; and changing contents of the image processing in accordance with the obtained or presumed sizes of the output image data, and the main photographed-subject region in the output image data.

Item 87.

The memory medium in Item 85 is characterized by storing the program comprising:

a program code of obtaining information about the size of the output image data of the photographed image, and the size of the main photographed-subject region in the output image data;

a program code of presuming information about the size of the output image data of the photographed image, and the size of the main photographed-subject region in the output image data; and a program code of changing contents of the image processing in accordance with the obtained or presumed sizes of the output image data, and the main photographed-subject region in the output image data.

Item 140.

The image processing apparatus in Item 136 is characterized in that:

the obtaining means obtains information about the size of the output image data of the photographed image, and the size of the main photographed-subject region in the output image data;

the presuming means presumes information about the size of the output image data of the photographed image, and the size of the main photographed-subject region in the output image data; and the changing means changes contents of the image processing in accordance with the obtained or presumed sizes of the output image data, and the main photographed-subject region in the output image data.

Item 193.

The image recording apparatus in Item 191 is characterized in that:

the obtaining means obtains information about the size of the output image data of the photographed image, and the size of the main photographed-subject region in the output image data;

the presuming means presumes information about the size of the output image data of the photographed image, and the size of the main photographed-subject region in the output image data; and the changing means changes contents of the image processing in accordance with the obtained or presumed sizes of the output image data, and the main photographed-subject region in the output image data.

According to the invention described in Items 34, 87, 140, 193, the present invention obtains or estimates information on the size of the main photographed subject in the output image data of the photographed image, and changes the contents of image processing in conformity to the size of the main photographed subject in the output image data. This method ensures more flexible and high-precision image processing in conformity to the photographed image scene.

Item 35.

The image processing method in Item 32 is characterized by:

obtaining information about the photographing condition of the photographed image, and information about the size of the output image data, and the size of the main photographed-subject region in the output image data;

presuming information about the size of the main photographed-subject region in the original image data, the size of the output image data, and the size of the main photographed-subject region in the output image data; and changing contents of the image processing in accordance with the obtained or presumed size of the main photographed-subject region in the output image data.

Item 88.

The memory medium in Item 85 is characterized by storing the program comprising:

a program code of obtaining information about the photographing condition of the photographed image, and information about the size of the output image data, and the size of the main photographed-subject region in the output image data;

a program code of presuming information about the size of the main photographed-subject region in the original image data, the size of the output image data, and the size of the main photographed-subject region in the output image data; and a program code of changing contents of the image processing in accordance with the obtained or presumed size of the main photographed-subject region in the output image data.

Item 141.

The image processing apparatus in Item 138 is characterized in that:

the obtaining means obtains information about the photographing condition of the photographed image, and information about the size of the output image data, and the size of the main photographed-subject region in the output image data;

the presuming means presumes information about the size of the main photographed-subject region in the original image data, the size of the output image data, and the size of the main photographed-subject region in the output image data; and the changing means changes contents of the image processing in accordance with the obtained or presumed size of the main photographed-subject region in the output image data.

Item 194.

The image recording apparatus in Item 191 is characterized in that:

the obtaining means obtains information about the photographing condition of the photographed image, and information about the size of the output image data, and the size of the main photographed-subject region in the output image data;

the presuming means presumes information about the size of the main photographed-subject region in the original image data, the size of the output image data, and the size of the main photographed-subject region in the output image data; and the changing means changes contents of the image processing in accordance with the obtained or presumed size of the main photographed-subject region in the output image data.

According to the invention described in Items 35, 88, 141, 194, the present invention obtains the information on the size of the output image data and the size of the main photographed subject in the output image data, or estimates the size of the main photographed subject in the original image data and size of the output image data based on the photographing conditions, and changes the contents of image processing in conformity to the size. This method ensures more flexible and high-precision image processing in conformity to the photographed image scene.

Item 33.

The image processing method in Item 32 is characterized by obtaining information about the photographing condition from additional information added to the original image data.

Item 39.

The image processing method in Item 36 or 37 is characterized by:

obtaining information about the image processing tendency from the additional information added to the original image data.

Item 45.

The image processing method in Items 40 to 44 is characterized by:

obtaining information about the tendency of the user, and information used for the presumption of the tendency of the user, from the additional information added to the original image data.

Item 86.

The memory medium in Item 85 is characterized by storing the program comprising a program code of obtaining information about the photographing condition from additional information added to the original image data.

Item 92.

The memory medium in Item 89 or 90 is characterized by storing the program comprising:

a program code of obtaining information about the image processing tendency from the additional information added to the original image data.

Item 98.

The memory medium in Items 93 to 97 is characterized by storing the program comprising:

a program code of obtaining information about the tendency of the user, and information used for the presumption of the tendency of the user, from the additional information added to the original image data.

Item 139.

The image processing apparatus in Item 138 is characterized in that:

the obtaining means obtains information about the photographing condition from additional information added to the original image data.

Item 145.

The image processing apparatus in Item 142 or 143 is characterized in that:

the obtaining means obtains information about the image processing tendency from the additional information added to the original image data.

Item 151.

The image processing apparatus in Items 146 to 150 is characterized in that:

the obtaining means obtains information about the tendency of the user, and information used for the presumption of the tendency of the user, from the additional information added to the original image data.

Item 192.

The image recording apparatus in Item 191 is characterized by the obtaining means obtains information about the photographing condition from additional information added to the original image data.

Item 198.

The image recording apparatus in Item 195 or 196 is characterized in that:

the obtaining means obtains information about the image processing tendency from the additional information added to the original image data.

Item 204.

The image recording apparatus in Items 199 to 203 is characterized in that:

the obtaining means obtains information about the tendency of the user, and information used for the presumption of the tendency of the user, from the additional information added to the original image data.

According to the invention described in Items 33, 39, 45, 86, 92, 98, 139, 145, 151, 192, 198, 204, various types of information are obtained from the tag information on the original image data, with the result that convenience is improved.

Item 36.

The image processing method in either one of Items 32 to 35 is characterized by:

obtaining information about image processing tendency applied to the photographed image in the course of photographing; and correcting degree of the image processing, based on the obtained image processing tendency.

Item 37.

The image processing method in either one of Items 32 to 35 is characterized by:

obtaining information about either one of the image processing tendencies which are a contrast processing, a sharpness processing, a granularity processing and a chroma processing, applied to the photographed image in the course of the photographing; and correcting the degree of the image processing, based on the obtained image processing tendency.

Item 38.

The image processing method in Item 36 or 37 is characterized by:

correcting the degree of the image processing, after consideration of repetition and reciprocity concerning the image processing in the course of the photographing, and information about the obtained image processing tendency.

Item 89.

The memory medium in either one of Items 85 to 88 is characterized by storing the program comprising:

a program code of obtaining information about image processing tendency applied to the photographed image in the course of photographing; and a program code of correcting degree of the image processing, based on the obtained image processing tendency.

Item 90.

The memory medium in either one of Items 85 to 88 is characterized by storing the program comprising:

a program code of obtaining information about either one of the image processing tendencies which are a contrast processing, a sharpness processing, a granularity processing and a chroma processing, applied to the photographed image in the course of the photographing; and a program code of correcting the degree of the image processing, based on the obtained image processing tendency.

Item 91.

The memory medium in Item 89 or 90 is characterized by storing the program comprising:

a program code of correcting the degree of the image processing, after consideration of repetition and reciprocity concerning the image processing in the course of the photographing, and information about the obtained image processing tendency.

Item 142.

The image processing apparatus in either one of Items 138 to 141 is characterized in that:

the obtaining means obtains information about image processing tendency applied to the photographed image in the course of photographing; and the correcting means corrects degree of the image processing, based on the obtained image processing tendency.

Item 143.

The image processing apparatus in either one of Items 138 to 141 is characterized in that:

the obtaining means obtains information about either one of the image processing tendencies which are a contrast processing, a sharpness processing, a granularity processing and a chroma processing, applied to the photographed image in the course of the photographing; and the correcting means corrects the degree of the image processing, based on the obtained image processing tendency.

Item 144.

The image processing apparatus in Item 142 or 143 is characterized in that:

the correcting means corrects the degree of the image processing, after consideration of repetition and reciprocity concerning the image processing in the course of the photographing, and information about the obtained image processing tendency.

Item 195.

The image recording apparatus in either one of Items 191 to 194 is characterized in that:

the obtaining means obtains information about image processing tendency applied to the photographed image in the course of photographing; and the correcting means corrects degree of the image processing, based on the obtained image processing tendency.

Item 196.

The image recording apparatus in either one of Items 191 to 194 is characterized in that:

the obtaining means obtains information about either one of the image processing tendencies which are a contrast processing, a sharpness processing, a granularity processing and a chroma processing, applied to the photographed image in the course of the photographing; and the correcting means corrects the degree of the image processing, based on the obtained image processing tendency.

Item 197.

The image recording apparatus in Item 195 or 196 is characterized in that:

the correcting means corrects the degree of the image processing, after consideration of repetition and reciprocity concerning the image processing in the course of the photographing, and information about the obtained image processing tendency.

According to the invention described in Items 36 to 38, 89 to 91, 142 to 144, 195 to 197, the present invention obtains the information on the trend of image processing regarding at least one of contrast processing, sharpness processing, granularity processing and chroma processing provided at the time of photographing. The level of image processing is corrected with consideration given to the duplication and reciprocity with the trend of image processing. This method ensures more flexible and high-precision image processing.

Item 40.

The image processing method in Items 32 to 39 is characterized by:

obtaining information about taste tendency of a user who photographs the image; and establishing the degree of the image processing, based on information about the obtained taste tendency of the user.

Item 41.

The image processing method in Items 32 to 39 is characterized by:

presuming the taste tendency of the user who photographs the image; and establishing the degree of the image processing, based on the presumed taste tendency of the user.

Item 42.

The image processing method in Items 32 to 39 is characterized by:

obtaining information about taste tendency of the user who photographs the image; and correcting the degree of the image processing, based on information about the obtained taste tendency of the user.

Item 43.

The image processing method in Items 32 to 39 is characterized by:

presuming the taste tendency of the user who photographs the image; and correcting the degree of the image processing, based on the presumed taste tendency of the user.

Item 44.

The image processing method in Item 41 or 43 is characterized by:

obtaining either one of information which are the settings of a type of photographing machine, number of the photographing image, exposure mode, and a white balance; and resuming the tendency of the user from the obtained information.

Item 93.

The memory medium in Items 85 to 92 is characterized by storing the program comprising:

a program code of obtaining information about taste tendency of a user who photographs the image; and a program code of establishing the degree of the image processing, based on information about the obtained taste tendency of the user.

Item 94.

The memory medium in Items 85 to 92 is characterized by storing the program comprising:

a program code of presuming the taste tendency of the user who photographs the image; and a program code of establishing the degree of the image processing, based on the presumed taste tendency of the user.

Item 95.

The memory medium in Items 85 to 92 is characterized by storing the program comprising:

a program code of obtaining information about taste tendency of the user who photographs the image; and a program code of correcting the degree of the image processing, based on information about the obtained taste tendency of the user.

Item 96.

The memory medium in Items 85 to 92 is characterized by storing the program comprising:

a program code of presuming the taste tendency of the user who photographs the image; and a program code of correcting the degree of the image processing, based on the presumed taste tendency of the user.

Item 97.

The memory medium in Item 94 or 96 is characterized by storing the program comprising:

a program code of obtaining either one of information which are the settings of a type of photographing machine, number of the photographing image, exposure mode, and a white balance; and resuming the tendency of the user from the obtained information.

Item 146.

The image processing apparatus in Items 138 to 39 is characterized in that:

the obtaining means obtains information about taste tendency of a user who photographs the image; and an establishing means for establishing the degree of the image processing, based on information about the obtained taste tendency of the user.

Item 147.

The image processing apparatus in Items 138 to 39 is characterized in that:

the presuming means presumes the taste tendency of the user who photographs the image; and an establishing means for establishing the degree of the image processing, based on the presumed taste tendency of the user.

Item 148.

The image processing apparatus in Items 138 to 39 is characterized in that:

the obtaining means obtains information about taste tendency of the user who photographs the image; and the correcting means corrects the degree of the image processing, based on information about the obtained taste tendency of the user.

Item 149.

The image processing apparatus in Items 138 to 39 is characterized in that:

the presuming means presumes the taste tendency of the user who photographs the image; and the correcting means corrects the degree of the image processing, based on the presumed taste tendency of the user.

Item 150.

The image processing apparatus in Item 147 or 149 is characterized in that:

the obtaining means obtains either one of information which are the settings of a type of photographing machine, number of the photographing image, exposure mode, and a white balance; and resuming the tendency of the user from the obtained information.

Item 199.

The image recording apparatus in Items 191 to 197 is characterized in that:

the obtaining means obtains information about taste tendency of a user who photographs the image; and an establishing means for establishing the degree of the image processing, based on information about the obtained taste tendency of the user.

Item 200.

The image recording apparatus in Items 191 to 197 is characterized in that:

the presuming means presumes the taste tendency of the user who photographs the image; and an establishing means for establishing the degree of the image processing, based on the presumed taste tendency of the user.

Item 201.

The image recording apparatus in Items 191 to 197 is characterized in that:

the obtaining means obtains information about taste tendency of the user who photographs the image; and the correcting means corrects the degree of the image processing, based on information about the obtained taste tendency of the user.

Item 202.

The image recording apparatus in Items 191 to 197 is characterized in that:

the presuming means presumes the taste tendency of the user who photographs the image; and the correcting means corrects the degree of the image processing, based on the presumed taste tendency of the user.

Item 203.

The image recording apparatus in Item 200 or 202 is characterized in that:

the obtaining means obtains either one of information which are the settings of a type of photographing machine, number of the photographing image, exposure mode, and a white balance; and resuming the tendency of the user from the obtained information.

According to the invention described in Items 40 to 44, 93 to 97, 146 to 150, 199 to 203, the present invention obtains information on the user, or acquire one of the pieces of information on camera model, the number of photographing pixels, exposure mode and white balance setting, thereby estimating the trend of the user and setting or correcting the level of image processing in response to this user trend. This method ensures more flexible and high-precision image processing.

Item 46.

The image processing method in Items 32 to 45 is characterized by:

presuming an angle of a visual field in which a main subject goes, when the photographed image is observed; and changing the contents of the image processing in accordance with the presumed angle of the visual field.

Item 99.

The memory medium in Items 88 to 98 is characterized by storing the program comprising:

a program code of presuming an angle of a visual field in which a main subject goes, when the photographed image is observed; and a program code of changing the contents of the image processing in accordance with the presumed angle of the visual field.

Item 152.

The image processing apparatus in Items 138 to 151 is characterized in that:

the presuming means presumes an angle of a visual field in which a main subject goes, when the photographed image is observed; and the changing means changes the contents of the image processing in accordance with the presumed angle of the visual field.

Item 205.

The image recording apparatus in Items 191 to 204 is characterized in that:

the presuming means presumes an angle of a visual field in which a main subject goes, when the photographed image is observed; and a changing means for changing the contents of the image processing in accordance with the presumed angle of the visual field.

According to the invention described in Items 46, 99, 152, 205, the present invention estimates the angle of field where the main photographed subject is accommodated. This method ensures more flexible and high-precision image processing.

Item 47.

The image processing method in Items 5, 6, 13, 14, and 19 to 31 is characterized by that the difference is equal to or less than 50%.

Item 48.

The image processing method in Items 5, 6, 13, 14, and 19 to 31 is characterized by that the difference is 5% to 20%.

Item 49.

The image processing method in Items 5, 6, 13, 14, and 19 to 31 is characterized by that the difference is 5% to 10%.

Item 100.

The memory medium in Items 58, 59, 66, 67, and 72 to 84 is characterized by that the difference is equal to or less than 50%.

Item 101.

The memory medium in Items 58, 59, 66, 67, and 72 to 84 is characterized by that the difference is 5% to 20%.

Item 102.

The memory medium in Items 58, 59, 66, 67, and 72 to 84 is characterized by that the difference is 5% to 10%.

Item 153.

The image processing apparatus in Items 111, 112, 119, 120, and 125 to 137 is characterized in that the difference is equal to or less than 50%.

Item 154.

The image processing apparatus in Items 111, 112, 119, 120, and 125 to 137 is characterized in that the difference is 5% to 20%.

Item 155.

The image processing apparatus in Items 111, 112, 119, 120, and 125 to 137 is characterized in that the difference is 5% to 10%.

Item 206.

The image recording apparatus in Items 164, 165, 172, 173, and 178 to 190 is characterized in that the difference is equal to or less than 50%.

Item 207.

The image recording apparatus in Items 164, 165, 172, 173, and 178 to 190 is characterized in that the difference is 5% to 20%.

Item 208.

The image recording apparatus in Items 164, 165, 172, 173, and 178 to 190 is characterized in that the difference is 5% to 10%.

According to the invention described in Items 47 to 49, 100 to 102, 153 to 155, 206 to 208, the aforementioned difference is set not to exceed 50%, the range from 5 to 20% or the range from 5 to 10%, thereby ensuring more high-precision image processing.

Item 50.

The image processing method in Item 7 is characterized by:

calculating the absolute value of the ΔN and the absolute value of the ΔM so that they are equal to or less than 0.7.

Item 51.

The image processing method in Item 7 is characterized by:

calculating the absolute value of the ΔN and the absolute value of the ΔM so that they are equal to or less than 0.4.

Item 52.

The image processing method in Item 8 is characterized by:

calculating the absolute value of the ΔBN and the absolute value of the ΔBM so that they are equal to or less than 0.7.

Item 53.

The image processing method in Item 8 is characterized by:

calculating the absolute value of the ΔBN and the absolute value of the ΔBM so that they are equal to or less than 0.4.

Item 103.

The memory medium in Item 60 is characterized by storing the program comprising:

a program code of calculating the absolute value of the ΔN and the absolute value of the ΔM so that they are equal to or less than 0.7.

Item 104.

The memory medium in Item 60 is characterized by storing the program comprising:

a program code of calculating the absolute value of the ΔN and the absolute value of the ΔM so that they are equal to or less than 0.4.

Item 105.

The memory medium in Item 61 is characterized by storing the program comprising:

a program code of calculating the absolute value of the ΔBN and the absolute value of the ΔBM so that they are equal to or less than 0.7.

Item 106.

The memory medium in Item 8 is characterized by storing the program comprising:

a program code of calculating the absolute value of the ΔBN and the absolute value of the ΔBM so that they are equal to or less than 0.4.

Item 209.

The image recording apparatus in Item 166 is characterized in that:

the calculating means calculates the absolute value of the ΔN and the absolute value of the ΔM so that they are equal to or less than 0.7.

Item 210.

The image recording apparatus in Item 166 is characterized in that:

the calculating means calculates the absolute value of the ΔN and the absolute value of the ΔM so that they are equal to or less than 0.4.

Item 211.

The image recording apparatus in Item 167 is characterized in that:

the calculating means calculates the absolute value of the ΔBN and the absolute value of the ΔBM so that they are equal to or less than 0.7.

Item 212.

The image recording apparatus in Item 167 is characterized in that:

the calculating means calculates the absolute value of the ΔBN and the absolute value of the ΔBM so that they are equal to or less than 0.4.

According to the invention described in Items 50 to 53, 103 to 106, 156 to 159, 209 to 212, calculation is made so that the aforementioned absolute values of ΔN and ΔM do not exceed 0.7 or 0.4, or the aforementioned absolute values of ΔBN and ΔBM do not exceed 0.7 or 0.4, with the result that more high-precision image processing is provided.

Item 213.

The image recording apparatus in either one of the Items 160 to 212 is characterized in that there is further provided with a recording means to record the produced output image data.

Item 214.

The image recording apparatus in Items 213 is characterized in that the recording means printing outputs the output image data.

Item 215.

The image recording apparatus in Items 213 is characterized in that the recording means printing outputs the output image data on a silver halide photographic paper.

Item 216.

The image recording apparatus in Items 213 is characterized in that the recording means printing outputs the output image data with a ink jet method.

Item 217.

The image recording apparatus in Items 213 is characterized in that the recording means printing outputs the output image data with an electro-photographic method.

Item 218.

The image recording apparatus in Items 213 is characterized in that the recording means printing outputs the output image data with a sublimation method.

Item 219.

The image recording apparatus in Items 213 is characterized in that the recording means printing outputs the output image data with a thermal method.

According to the invention described in Items 213 to 219, printed output is produced according to any one of the ink jetting method, electrophotographic method, sublimation method and thermal method, wherein output image data is printed on silver halide printing paper. This allows the imaged processed output image data to be printed out, with the result that convenience is much improved.

Item 220.

The image recording apparatus in Items 213 is characterized in that the recording means printing outputs the output image data on a recording medium.

Item 221.

The image recording apparatus in Items 213 is characterized in that the recording medium is at least one of compact disk, mini-disk, floppy disk (registered trademark), memory card, IC card and magneto-optical disk.

According to the invention described in Items 220 to 221, The output image data is recorded in at least one of a compact disk, mini-disk, floppy disk (registered trademark), memory card, IC card and magneto-optical disk. This allows image processed output image data to be stored, with the result that convenience is much improved.

DETAILED DESCRIPTION OF THE PREFERRED EMBODIMENTS

The following describes the details of the preferred embodiments in the present invention with reference to drawings. However, it is to be understood that the present invention is limited only to these embodiments.

Figure 1:
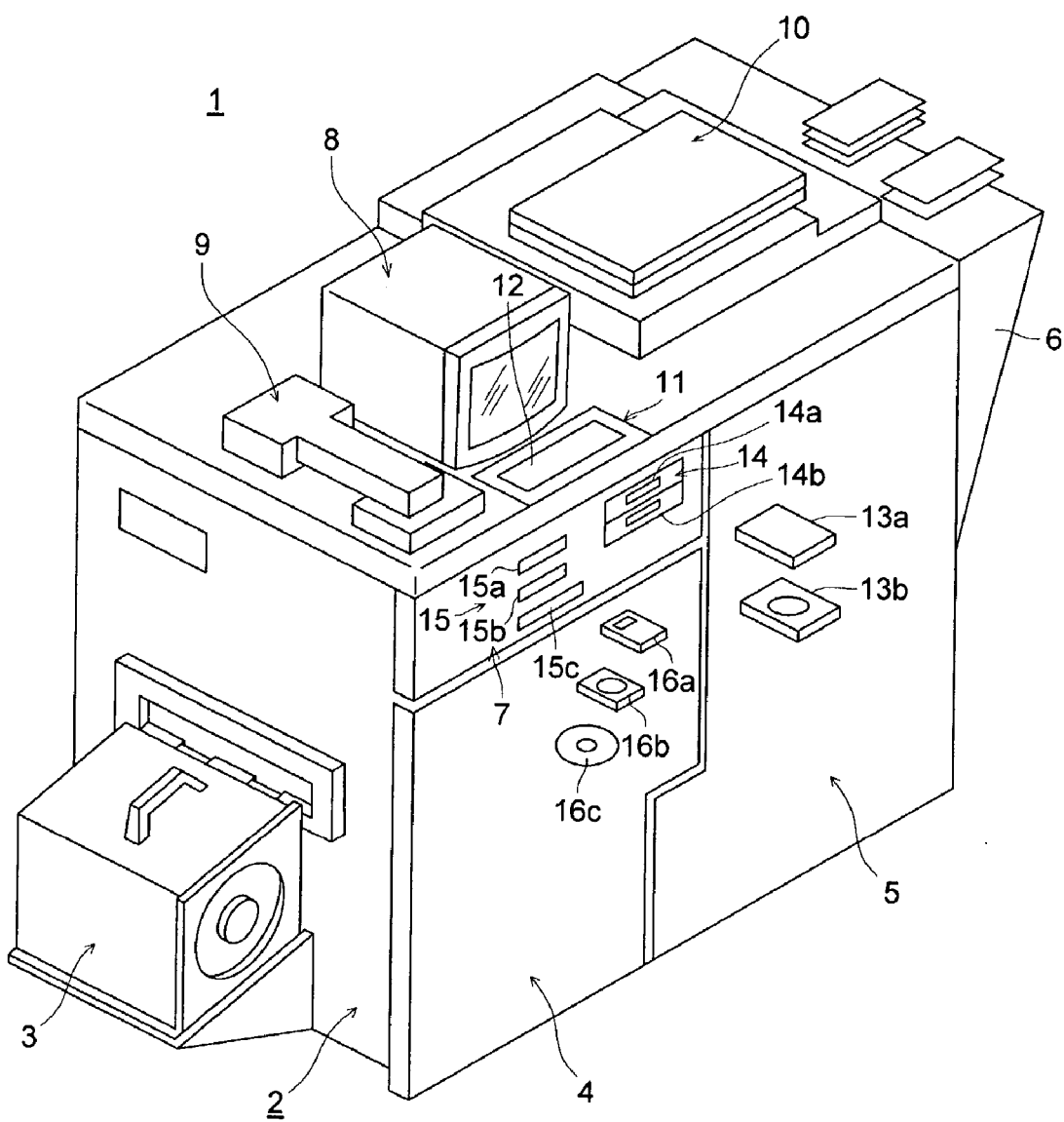
FIG. 1 is an external view representing an image output apparatus 1 as an embodiment of the present invention.

The configuration will be described first:

FIG. 1 is an external view representing the overall configuration of the image output apparatus 1 of the present invention. The image output apparatus 1 in FIG. 1 is exemplified by the one that photosensitive material is exposed and developed to produce a print. Without being limited thereto, it can be an ink jet printer, electrophotographic printer, thermal printer and sublimation printer, for example.

The following describes the image output apparatus 1 with reference to FIG. 1.

The image output apparatus 1 consists of a magazine loader 3 arranged on the left side of main unit 2, an exposure processor 4 for expose the photosensitive material as a recording medium inside the main unit 2, and a print producing section 5 for developing and drying the exposed photosensitive material and producing a print. The produced print is discharged into the tray 6 arranged on the right side of the main unit 3. Further, inside the main unit 2, a control section 7 is located over the exposure processor 4.

A monitor 8 is provided over the main unit 2. This monitor constitutes a display means for displaying on the screen the image of the image data intended to produce a print. A film scanner 9 as a transparent document reader is arranged on the left of the monitor 8, and a reflection input device 10 is arranged on the right.

An image reader 14 is provided close to the control section 7 of the main unit 7. A PC card adaptor 14a and a flexible disk adaptor 14b are located on the image reader 14. PC card 13 and flexible disk 13b are removably arranged there. The PC card 13a has a memory storing multiple pieces of frame image data. The flexible disk 13b stores multiple pieces of frame image data, for example. Further, a recording medium such as a memory card, MD card and CD-ROM can be arranged removably in the main unit 2 so that the frame image data stored therein can be obtained.

An operation section 11 is arranged on the front of the monitor 8. This operation section 11 is provided with information input means 12. The information input means 12 is composed of a touch panel and others.

The operation section 11, monitor 8, film scanner 9, reflective document input device 10 and image reader 14 are arranged integrally with the main unit 2. One or more of them can be provided as separate unit(s).

Further, an image write section 15 is arranged close to the control section 7. The image write section 15 is provided with a flexible disk adaptor 15a, a magneto-optical disk adaptor 15b and an optical disk adaptor 15c. A flexible disk 16a, a magneto-optical disk 16b and optical disk 16c as image recording media are removably mounted so that image processed data can be written into the image recording medium.

Figure 2:
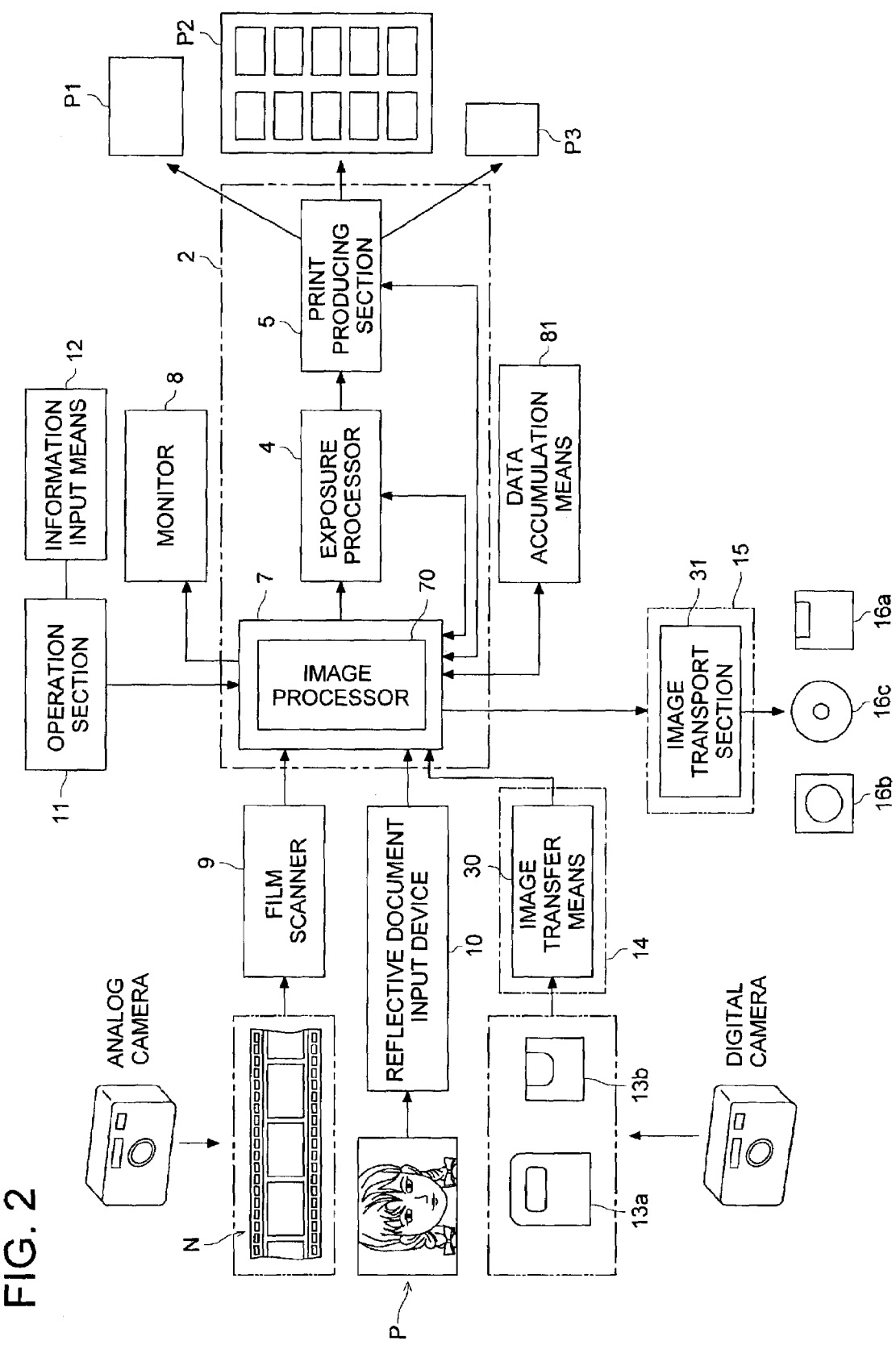
FIG. 2 is a block diagram representing the functional configuration of the image output apparatus 1 given in FIG. 1.

FIG. 2 is a block diagram representing the functional configuration of the image output apparatus 1. The following describes the functional configuration of the image output apparatus 1 with reference to FIG. 2:

The control unit 7 comprises a CPU (central processing unit), storage section and others. The CPU reads out various forms of control programs loaded in the storage section and provides centralized control of the operations of various sections constituting the image output apparatus 1 according to this control program. The CPU performs various forms of processing such as image processing (discussed later), main photographed subject size estimation processing and image processing content decision processing according to the control program called up.

The control section 7 contains an image processor 70. It provides image processing of (1) the image data obtained by causing a document image to be read by the film scanner 9 and reflective document input device 10 based on the input signal from information input means 12, (2) the image data read from the image reader 14, and (3) the image entered from an external device through the communications means 17A (illustrated in FIG. 3). In the image processor 70, the image data subjected to image processing undergoes conversion processing in conformity to the form of output, and is output by means of the monitor 8, exposure processor 4, image write section 15, flexible disk adaptor 15a, communications means 17 or an external printer. In other words, the control section 7 has the functions of setting means, calculation means, and image processing means, intermediate processed image generating means, output image generating means, acquisition means, estimation means and comparison means.

The operation section 11 has information input means 12. Information input means 12 comprises a touch panel and others, and issues the depress signal for information input means 12 as an input signal. The operation section 11 may be provided with a keyboard or mouse.

The film scanner 9 reads image information from the developed negative film N obtained by developing the negative film photographed from the analog camera. It converts this analog frame image information into digital image data, and sends it to the control section 7. The flat head scanner of the reflective document input device 10 reads the image information from print P obtained by printing a frame image on photographic paper and developing it. The image information is then converted into digital image data and is sent to the control section 7.

The image reader 14 reads image data from the PC card 13 and flexible disk 13b storing the image data photographed by a digital camera, and sends it to the control section 7. This image reader 14 is provided with a PC card adaptor 14a flexible disk adaptor 14b as image transfer means 30.

In response to the image data issued from the image processor 70 of the control section 7, the exposure processor 4 exposes the photosensitive material, records the latent image and prints it on the print producing section 5. The print producing section 5 develops and dries the photosensitive material exposed by the exposure processor 4, and produces prints P1, P2, P3, etc. Print P1 is available in various sizes such as service size, high vision size, panorama size, etc. Print P2 is an A4 sized print, and print P3 is a visiting card sized print. The print producing section 5 has a function of recording means.

The image write section 15 as an image transport section 31 comprises a flexible disk adaptor 15a, magneto-optical disk adaptor 15b and optical disk adaptor 15c. It writes the image data processed by the image processor 70 of the control section 7 to the image recording medium of a flexible disk 16a, magneto-optical disk 16b and optical disk 16c mounted on the image transport section 31.

Data storage means 81 stores the image data and its corresponding information (information on how many prints are to be produced from the image data of what frame, and print size information), and accumulates them in sequence.

Template storage means 19 stores a plurality of templates used for template processing, and sends a specified template to a template processor 79.

The monitor 8 comprises a CRT (cathode ray tube), LCD (liquid crystal display) and others, and displays the image information entered from the control section 7.

Figure 3:
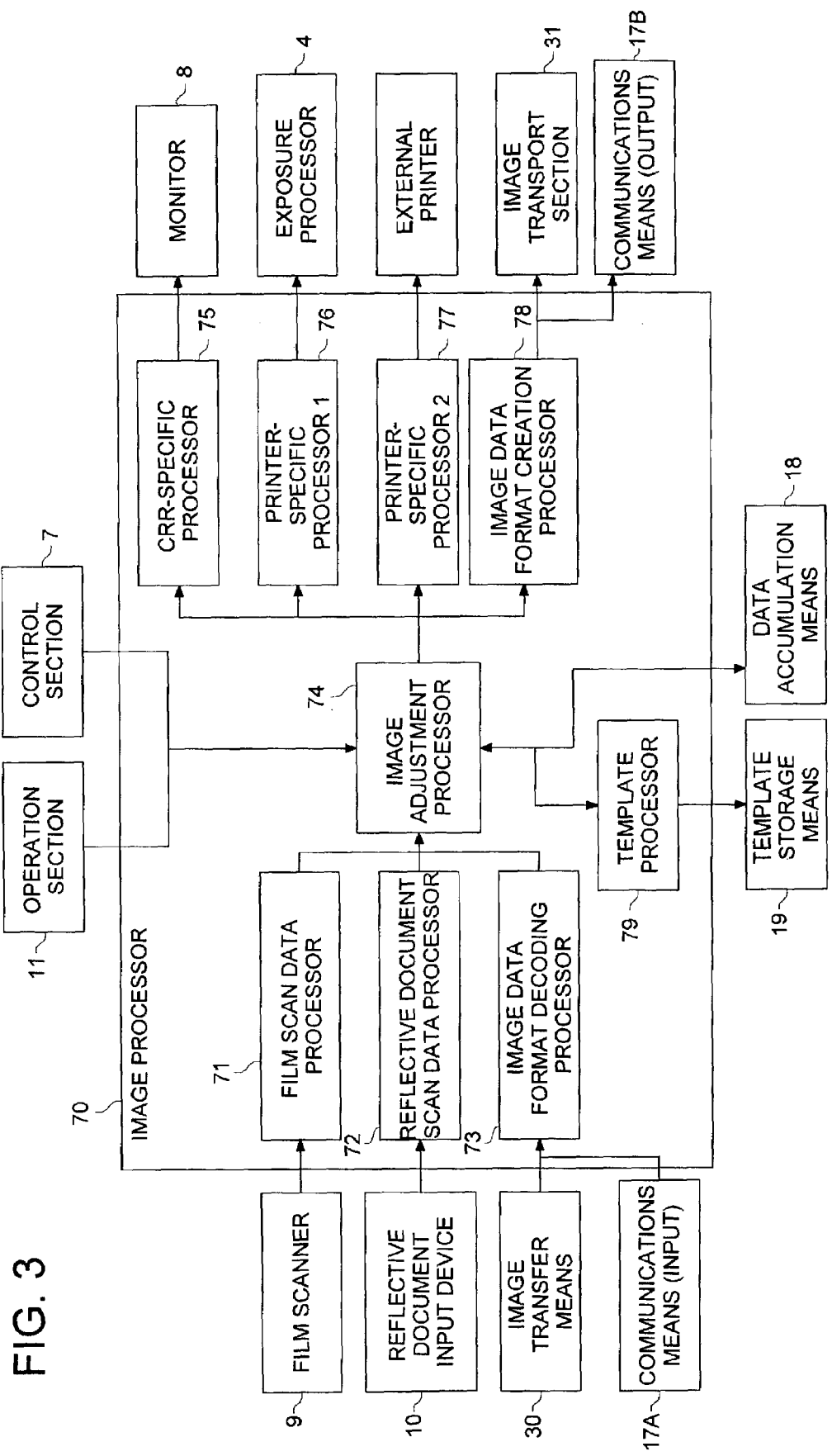
FIG. 3 is a diagram explaining the details of an image processor 70.

Further, the image output apparatus 1 has communications means 17 (illustrated in FIG. 3). It is capable of functioning as a so-called network printer that receives the image data representing the photographed image and print instruction from another computer inside facilities or a remote computer through the Internet, and prints it out after image processing. The image output apparatus 1 is capable of using the communications means 17B to send the image data representing the photographed image having been subjected to image processing and its accompanying order information to another computer in the facilities or to a remote computer via the Internet.

FIG. 3 is a block diagram representing the functional configuration of the image processor 70. The following describes the details of image processor 70 with reference to FIG. 3:

In the film scan data processor 71, the image data entered from the film scanner 9 is provided with calibration operation inherent to the film scanner 9, negative/position reversing in the case of a negative document, removal of dust and scratches, gray balance adjustment (white balance adjustment), contrast adjustment, granular noise elimination, sharpness enhancement, etc. The resulting image data is then sent to an image adjustment processor 74. Information related to an optically or magnetically recorded main photographed subject such as film size and negative/positive identification, information on white balance adjustment and information on photographing conditions (e.g. information described in APS) are also sent to the image adjustment processor 74.

In a reflective document scan data processor 72, the image data entered from the reflective document input device 10 is provided with calibration operation inherent to the reflective document input device 10, negative/position reversing in the case of a negative document, removal of dust and scratches, gray balance adjustment (white balance adjustment), contrast adjustment, granular noise elimination, sharpness enhancement, etc., and is sent to the image adjustment processor 74.

In an image data format decoding processor 73, the image data entered from the image transfer means 30 is subjected to decompression of compressed codes and conversion of color signal representation method, as required, according to the data format. It is converted into the data form suitable for arithmetic processing in the image processor 70, and is output to the image adjustment processor 74. The photographing information obtained from the header information and tag information for image data (information on the presence or absence of stroboscopic emission, stroboscope return information for showing whether or not there is detection of the return of stroboscopic light emitted in photographing, etc.) is also sent to the image adjustment processor 74.

Photographing information can be added or supplemented through the operation section 11 to be sent to the image adjustment processor 74.

The size of the output image is determined by the instruction entered from the operation section 11. It can also be determined by the designation of the size of the output image received from the communications means 17A, or by the designation of the size of the output image included in the header/tag information of the image data obtained by image transfer means 30.

In the image adjustment processor 74, the image data entered from the film scanner 9, reflective document input device 10, image transfer means 30 and communications means 17 in response to the designation of the operation section 11 and control section 7 is subjected to image processing through image conversion and image correction (to be discussed later) so that the image can be observed on the output media with satisfaction. Then processed image signals are sent to a CRR-specific procedure 75, printer-specific processors 76 and 77, image data format creation processor 78 and data accumulation means 81.

In the CRT-specific processor 75, the image signal issued from the image adjustment processor 74 undergoes such processing as change in the number of pixels and color matching, as required, and the processed signal is sent to the monitor 8.

In the printer-specific processor 76, the data issued from the image adjustment processor 74 is subjected to printer-specific calibration, color matching and change in the number of pixels, as required, and the image data is sent to the exposure processor 4. When an additional external printer is to be connected to the image output apparatus 1, the image data issued from the image adjustment processor 74 by the printer-specific processor 77 undergoes such processing as calculation color matching and change in the number of pixels. This image data is then printed on the external printer.

In the image data format creation processor 78, the image data issued from the image adjustment processor 74 is converted into various types of general-purpose image format represented by JPEG, TIFF and Exif, as required. This image data is sent to the image transport section 31 and communications means 17B.

The template processor 79 reads a specified template from template storage means 19. This template is used to provide template processing of the image data entered from the image adjustment processor 74. Then the resulting image data is sent to the image adjustment processor 74.

Classification of various processors inside the image processor 70 is intended to assist explanation of the function of the image processor 70. These processors need not always be implemented as independent physical devices. For example, they can be implemented as the classification of the forms of software processing in a single CPU.

The following describes the operation details:

The photographed image data refers to (1) the image data generated by such photographing means as a digital camera, (2) the image data obtained by digitization of photographed image or (3) the data generated by processing of the aforementioned data through various application programs and by conversion of its format. The data format is exemplified by the general-purpose format represented by JPEG, TIFF and Exif and the format specified to the model and application, and is provided by such recording media as a hard disk, CD-ROM, memory card, floppy disk (registered trademark) or by being transferred via the communications line.

The main photographed subject region or selected region refers to the subject with attention given to the central role for reproduction when a photographer designs the composition of a photographic image. In many cases, it refers to a person or his face in particular. For a scenic shot without any person in it, there are very few cases where a composition is vaguely set up. In such a case, the subject is a flower, animal and still life in the close view, or a mountain, sky or cloud in the background. So it is handled as synonymous with that is generally called "main photographed subject".

First, the following describes the granularity as an evaluation criterion standardized in terms of functional value. Due to the presence of inherent equipment characteristics depending on each input/output medium, the method for calculating the granularity as an evaluation criterion standardized in terms of functional value is not particularly restricted if the value is standardized in terms of functional value. For example, there is a method for calculation from the Noise Wiener Spectrum (hereinafter referred to as "NWS") derived from frequency analysis of image and the standard deviation for R, G and B signal values. When the NWS method is used, the aforementioned granularity can be obtained from the area up to the nyquist frequency range determined by the resolution of the image. It is also possible to calculate from the area of a certain frequency range or from area from which the value in the nyquist frequency range is subtracted as a noise component of equipment.

It is also possible to calculate from one or more frequency strength values or their average value. It is preferred to calculate from the value obtained by subtracting the noise component of the equipment from the area of 3 to 10 cycles/mm frequency range, or from the area from which the noise component of the equipment has been removed in advance. It is especially preferred to calculate from the standard deviation with consideration given to the noise component of the equipment. Then a subject person is requested to evaluate two or more images where quantitative value data of granularity is obtained, and the grade is evaluated. The correlation with the functional value is obtained and standardized, thereby getting the granularity standardized by functional value. There is no particular restriction to the method for finding correlation with the functional value. It is preferred that the logarithmic value of the quantitative value obtained by the aforementioned manner and the grade evaluated by the subject be correlated as linear to cubic approximate functions. It is particularly preferred that they be correlated as a linear function.

It is still more preferred to find the standard deviation of the ratio between the image resolution and the image size based on the angle of field, intended output size or observation size, or to find correlation as an approximate function between the logarithmic value of the value gained by assigning weights to the obtained quantitative value and evaluation of the grade by the subject. In this case, it is particularly preferred to find correlation in terms of a linear function. When the output medium output size, observation size and field angle size are approximately determined, it is also possible to perform calculation by correcting the obtained standard deviation using the system factor for each output medium that assigns a certain weight to the ratio between the size and image resolution.

The following method according to the present embodiment will be described as an example of calculating the granularity:

Assume that the average values of the standard deviations of G (Green) and R (Red) values derived for each small block of the image thereby obtained are SDg and SDr, respectively. Then granularity values ng and nr of G and R signal values are gained from the following equations:

$$ng = -7.0 \times \log_{10}(9.9 \times SDg - 11) + 15.5$$

$$nr = -7.0 \times \log_{10}(9.9 \times SDr - 11) + 15.5$$

Then granularity value N is obtained according to the following equation:

$$N = (7 \times ng + 4 \times nr)/11$$

When a digital print of the normal output size is used for output, use of the aforementioned equation is preferable for calculation. However, when there is a big difference in output size or the observation size on the monitor is required to assume a certain value, it is preferable to utilize the following equation to get the granularity N.

First, let us assume that the average values of the standard deviations of G and R values derived for each small block of the image thereby obtained are SDg and SDr, respectively.

Then granularity values ng and nr of G and R signal values are gained from the following equations:

$$S = 11.8 \times W/DP$$

Then the granularity values ng and nr of G and R values are derived from the following equation:

$$ng = -7.0 \times \log_{10}(9.9 \times SDg \times S - 11) + 15.5$$

$$nr = -7.0 \times \log_{10}(9.9 \times SDr \times S - 11) + 15.5$$

Then granularity value N is obtained according to the following equation:

$$N = (7 \times ng + 4 \times nr)/11$$

The value N of the image subsequent to preferred image processing should preferably be 6 or more. More preferably, the value should be 7 or more; still more preferably, it should be 8 and more.

The following describes the sharpness value as an evaluation criterion standardized in terms of functional value. Due to the presence of inherent equipment characteristics depending on each input/output medium, the method for calculating the sharpness value as an evaluation criterion standardized in terms of functional value is not particularly restricted if the sharpness value is standardized in terms of functional value. For example, there is a method for calculation from power spectrum derived from frequency analysis of image. For example, it is possible to perform calculation from the inclination of the straight line formed by connecting between 3 cycles per mm through frequency in the nyquist frequency range and another frequency value. It is preferred that calculation be performed from a tilt of the straight line formed by connecting between these two points by paying attention to the frequency range from 10 through 20 cycles per mm.

Two or more images where these quantitative data has been obtained are observed by the subject to evaluate the grade, and the correlation with the functional value is obtained to standardize the sharpness value. There is no restriction to correlation with functional value. However, it is preferred that the aforementioned quantitative value or its logarithmic value and the grade evaluated by the subject be correlated with each other as a linear to cubic approximate function. It is especially preferred that the calculated tilt value and evaluated grade be correlated. When the output size, observation size and field angle size are approximately determined, it is also possible to perform calculation by changing the scope of a particular frequency range and determining two points, based on the tilt of the straight line gained by connecting between these two points, using the system factor for each output medium that assigns a certain weight to the ratio between the size and image resolution.

The following shows an example of calculating the granularity according to the present embodiment:

The power spectrum gained by frequency analysis of the image therein obtained is plotted with reference to frequency for each of G and R signals. For example, the tilts of the linear function gained by connecting between two points of 10 cycles per mm and 20 cycles per mm are assumed as mg and mr, respectively, and the sharpness value M of brightness is obtained from the following equation:

$$M = 7.0 \times \log^{10}(mg \times 29.4 + mr \times 12.6 + 40) - 10$$

When a digital print of the normal output size is used for output, use of the aforementioned equation is preferable for calculation. However, when there is a big difference in output size or the observation size on the monitor is required to assume a certain value, it is preferable to utilize the following equation to get the sharpness value M.

Assume that the resolution of the image is DP (unit: dpi), and the short side of the image output size or observation size is w (unit: mm). In this case, high frequency hc is found from the following equation:

$$hc = 0.157 \times w,$$

Then the power spectrum gained by frequency analysis of the image is plotted with reference to frequency for each of G and R signals. The tilts of the linear function gained by connecting between two points of 10 cycles per mm and hc cycles per mm are assumed as mg and mr, respectively, and the sharpness value M of brightness is obtained from the following equation:

$$M = 7.0 \times \log_{10}(mg \times 29.4 + mr \times 12.6 + 40) - 10$$

The value M of the image having undergone preferred image processing should preferably be 4 or more. More preferably, the value should be 5 or more; still more preferably, it should be 6 and more. For the image where a low contrast is preferred as in the portrait, this value should be 5 to 6. For a scenic shot without a human subject, it is preferred that the value be 6 or more. As described above, the optimum point of the sharpness value must be selected depending on the scenic shot.

The following describes the details of the overall picture quality value correlated by two dimensions by the above calculated granularity value N and sharpness value M. Due to the presence of inherent equipment characteristics depending on each input/output medium, there is no restriction to the method for calculating the overall picture quality value correlated by two dimensions of the granularity value N and sharpness value M, if the function can be uniquely defined by granularity value N and sharpness value M. When represented by M and N in quadratic function type, correlation with functional value is very preferable.

In the present embodiment, the overall picture quality value Q is calculated according to the following approximate expression using the above calculated granularity N and sharpness value M.

$$Q = (0.413 M^{\wedge}(-3.4) + 0.422 N^{\wedge}(-3.4))^{\wedge}(-1/3.4) - 0.532$$

The value Q of the image subsequent to preferred image processing should preferably be 3 or more. More preferably, the value should be 4 or more. Still more preferably, it should be 6 and more.

This applies to the case where the overall picture quality value Q of the comparatively common area (e.g. dress, skin, wall) is defined. Weights are assigned when there is a big difference in the scenic shot among different images. In the present invention, it is important that the overall picture quality value Q is standardized by functional value. It is necessary to determine in particular which of granularity value N and sharpness value M is a rate determining factor making a greater contribution to the overall picture quality Q. It is necessary to determine which provides a more preferable value by comparison between different overall picture quality values Q.

When image is processed using the overall picture quality value Q according to the present invention, a higher-quality image can be ensured by increasing the granularity N alone for the image where a low contrast is preferred as in the portrait, while the sharpness value M is kept at 5 to 6. Furthermore, when there is no human subject in a scenic shot, a high-quality image on the similar level can be provided by raising only the sharpness value M to 6 or more with the granularity value N kept at the present level. Furthermore, when the sharpness value serves as a rate determining factor, the sharpness can be enhanced and contrast can be converted, without giving consideration to granularity, if granularity value meets the quality requirements even when image processing is provided. As described above, image processing procedure according to the present invention allows these scenes to be identified, and permits delicate adjustment of processing parameters and image processing.

The following describes the details of the color performance value as an evaluation criteria standardized in terms of functional value. Due to the presence of inherent equipment characteristics depending on each input/output medium, there is no restriction to the method for calculating the color performance value as an evaluation criteria standardized in terms of functional value if the color performance value is standardized in terms of functional value. In the calculation method, for example, while chroma is calculated from R, G and B signals or color difference signals according to the known conversion method, a reproduction ratio is calculated for the chroma as a fundamental value for a saturated color such as green, red or yellow in the natural world characterized by accumulation of scenic analyses.

In this case, precision is improved by calculating the histogram of the chroma using only the image having a hue angle within ±10 degrees with respect to the fundamental value. There is no need for colors to be restricted to all these colors. It is also possible to find the standard deviations and the average value thereof, and to calculate the value that is predicted as the maximum value of the chroma in the scene, using each value thereby obtained, as required. In this case, if there is a big standard deviation or if two or more distribution peaks are absent without histogram distribution being concentrated at the center, it is preferred that the chroma distributed one sigma in terms of standard deviation away from the average value be used as the maximum chroma.

A quantitative value can be obtained by averaging the reproduction ratios of the chroma with respect to fundamental values for blue (B), green (G), red (RED), yellow (Y), magenta (M) and cyan (C). If required, weights can be assigned by giving consideration to the distribution. Two or more images where these quantitative values have been obtained are observed by a subject to evaluate the grade, and the correlation with the functional value is standardized, whereby the color performance value is found. There is no restriction to correlation with functional value. However, it is preferred that the aforementioned quantitative value or its logarithmic value and the grade evaluated by the subject be correlated with each other as a linear through cubic approximate function. It is especially preferred that the logarithmic value gained from the reproduction ratio of the chroma and the evaluated grade be correlated in terms of a liner function. It is also possible to perform calculation with consideration given to the reproduction ratio of intermediate colors.

In the present embodiment, the image data thereby obtained is divided into 20×20 pixels. R, G and B signals, or color difference signals, for example, are converted into L*, a* and b* spaces according to the known conversion method described in "Basics of Color Reproduction Optics" by N. Ohta published from Corona Publishing Company in 1997, and the average value is calculated. Using the average value thereby obtained, the chroma is calculated. Then using only the image data with the hue angle of each color within ±10 degrees, the average chroma value in each of the aforementioned colors is obtained according to the B, G, R, Y, M and C color cards of the Macbeth Chart by Macbeth Co. Inc. The maximum chroma value in the scene and predicted value are calculated.

In the meantime, the chroma is calculated from the Macbeth color Macbeth color card in each of the aforementioned colors, and the ratio with respect to the Macbeth chroma is calculated. Then the chroma weighted average Cr0 is obtained from the number of pixels in which the image has been divided. Color reproduction value C is calculated according to following equation:

$$C = 20 \times \log_{10}(Cr0)$$

It is preferred that the value C of the imaged subsequent to preferred processing be 4 or more, and more preferred that value C be 5 or more. It is still more preferred that value C be 6 and more.

Color reproduction value C is 5 to 6 for the image where a low contrast is preferred as in the portrait, and a three-dimensional effect can be created so that the main photographed subject is highlighted. When there is no human subject in a scenic shot, trees and plants are reproduced in a well-defined form if the value C is set to 6 or more. The optimum value must be selected for such an image color reproduction value C depending on the scenic shot.

The following describes the details of the three-dimensional overall picture quality QT correlated in three dimensions by the above calculated granularity N, sharpness value M and color performance value C:

The aforementioned three-dimensional overall picture quality QT provides an evaluation criterion standardized by functional values based on the values N, M and C. Due to the presence of inherent equipment characteristics depending on each input/output medium, there is no restriction to the method for calculation if the function can be uniquely defined by granularity value N, sharpness value M and color performance value C. Especially for the aforementioned function, it is preferred to calculate the average between the color performance value C and the overall picture quality value Q represented by granularity value N and sharpness value M in quadratic function type. This is preferred because of a high degree of correlation with a well-defined high quality functional value.

In the present embodiment, the three-dimensional overall picture quality value QT is calculated according to the following equation:

$$QT = (Q + C)/2$$

The value QT of the image subsequent to preferred image processing should preferably be 3.5 or more. More preferably, the value should be 4.5 or more. Still more preferably, it should be 5.5 and more, which will provide a well-defined high quality image characterized by three-dimensional effect.

In the present embodiment, definition has been made as to the calculation of the three-dimensional overall picture quality value QT from granularity value N, sharpness value M and color performance value C using the aforementioned approximate equation. This definition also applies to the three-dimensional overall picture quality value QT of the comparatively common area (such as dress, skin and wall). When there is a big difference among the scenes of individual images, characteristics can be taken into account for each model by applying bias or assigning other weights. Alternatively, the logarithm of the above equation may be used to make an approximation for correction.

In the present invention, it is important that the three-dimensional overall picture quality value QT is standardized in terms of the functional value. Especially, it is important to determine whether or not any one or two of the granularity value N, sharpness value M and color performance value C makes a great contribution to the three-dimensional overall picture quality value QT to serve as a rate determining factor. Also it is important to make comparison among different overall picture quality values Q to determine which value is more preferable.

If image processing is performed using the three-dimensional overall picture quality value QT according to the present invention, it is possible to determined whether granularity value N alone should be raised, or color performance value C should be raised and color should be enhanced, for the image where a low contrast is preferred as in the portrait for example, by make reference to the Q and QT values, where the sharpness value M is kept at 5 to 6. This makes it possible to ensure well-defined and stable image processing with three-dimensional effects. Furthermore, when there are many buildings with few human subjects in a scenic shot, a high-quality image can be obtained by increasing the sharpness value M alone to 6 and more with granularity value N kept unchanged. Furthermore, when the value serving as a rate determining factor is sharpness value M and granularity value N meets quality requirements even if image processing is provided, a sense of incompatibility will occur if sharpness value M and color performance value C are increased and sharpness and color are enhanced at the same time. In this case, the sharpness enhancement is reduced. However, if it has been determined that the value QT is not improved very much despite further color enhancement by making reference to the three-dimensional overall picture quality value QT, sharpness can be enhanced and contrast can be converted by further increasing the sharpness value M. As described above, image processing method according to the present invention permits discrimination of these scenes, adjustment of delicate processing parameters and image processing.

The granularity value of the original image data in the main photographed subject and selected region is N0, sharpness value is M0, and overall picture quality value Q0. The granularity value of the processed image data is N1, sharpness value is M1, and overall picture quality value is Q1. The granularity value of the original image data in the entire image region is BN0, sharpness value is BM0, and overall picture quality value BQ0. The granularity value of the processed image data is BN1, sharpness value is BM1, and overall picture quality value is BQ1. Under this assumption, the atmosphere for granularity and sharpness before and after image processing is kept unchanged and the intention of the photographer is not changed very much. Accordingly, it is preferred that the differences between N1/N0 and M1/M0 do not exceed 100%. The atmosphere for granularity and sharpness before and after image processing is kept unchanged and the intention of the photographer is not changed very much in a natural atmosphere without a sense of incompatibility. Accordingly, it is preferred that the difference between BN1/N0 and BM1/BM0 do not exceed 100%. The difference here refers to the percentage of the difference (positive number) in the smaller values of N1/N0 and M1/M0, or BN1/N0 and BM1/BM0.

Furthermore, when the overall picture quality value Q is a functional value that can be represented as Q=F(N, M) (where granularity value N and sharpness value M are normalized values) and Q0 equals to or smaller than Q1, then ΔN and ΔM are calculated by the following equations:

$$\Delta N = (Q1-N1)-(Q0-N0)$$

$$\Delta M = (Q1-M1)-(Q0-M0)$$

Calculation is made so that absolute values of these ΔN and ΔM do not exceed 1.0. This makes it possible to get a high precision image conforming to the intention of the photographer with the original atmosphere of the subject kept intact. To ensure further precision, it is preferred that absolute values of these ΔN and ΔM do not exceed 0.7. It is more preferred that they do not exceed 0.4.

Furthermore, the overall picture quality value BQ of the entire image region is a functional value that can be represented as Q=f (N, M) (where granularity value N and sharpness value M are normalized values) and BQ0 is equal to or smaller than Q1, then ΔBN and ΔBM are calculated by the following equations:

$$\Delta BN = (BQ1-BN1)-(BQ0-BN0)$$

$$\Delta BM = (BQ1-BM1)-(BQ0-BM0)$$

Calculation is made so that absolute values of these ΔBN and ΔBM do not exceed 1.0. This makes it possible to get a high precision image conforming to the intention of the photographer with the original atmosphere of the subject kept intact. To ensure further precision, it is preferred that absolute values of these ΔBN and ΔBM do not exceed 0.7. It is more preferred that they do not exceed 0.4.

When $N0 \geq M0$ is met, Ata=N0; when $N0 \geq M0$ is not met, Ata=M0; when $BN0 \geq BM0$ is met, Bta=BN0; and when $BN0 \geq BM0$ is not met, Bta=BM0. Also assume that Qta=f (Ata, Ata)

BQta=f (Bta, Bta)

Then in order to get a stable and high-precision image in a large image region conforming to the intention of the photographer with the original atmosphere of the subject kept intact, it is preferred that the overall picture quality value Q1 subsequent to processing be closer to Qta from the overall picture quality value Q0 prior to processing. In order to get a stable and high-precision image in a large image region conforming to the intention of the photographer with the original atmosphere of the subject kept intact, it is also preferable to ensure that the overall picture quality value BQ1 subsequent to processing will be closer to BQta from the overall picture quality value BQ0 prior to processing.

The above description will be explained specifically with reference to FIGS. 4 and 5.

Figure 4:
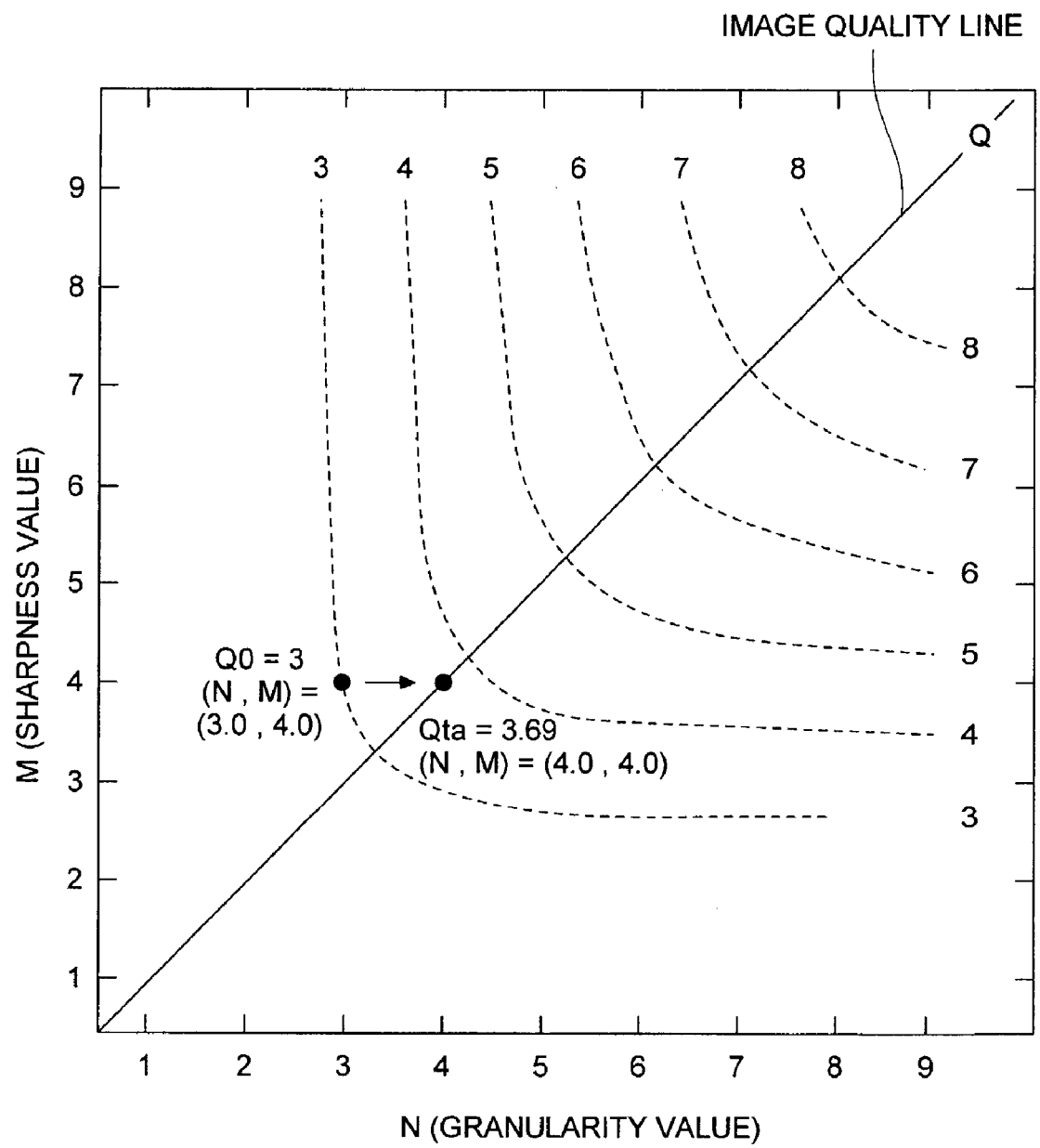
FIG. 4 is a diagram representing value Q correlated by granularity N and sharpness value M.
Figure 5:
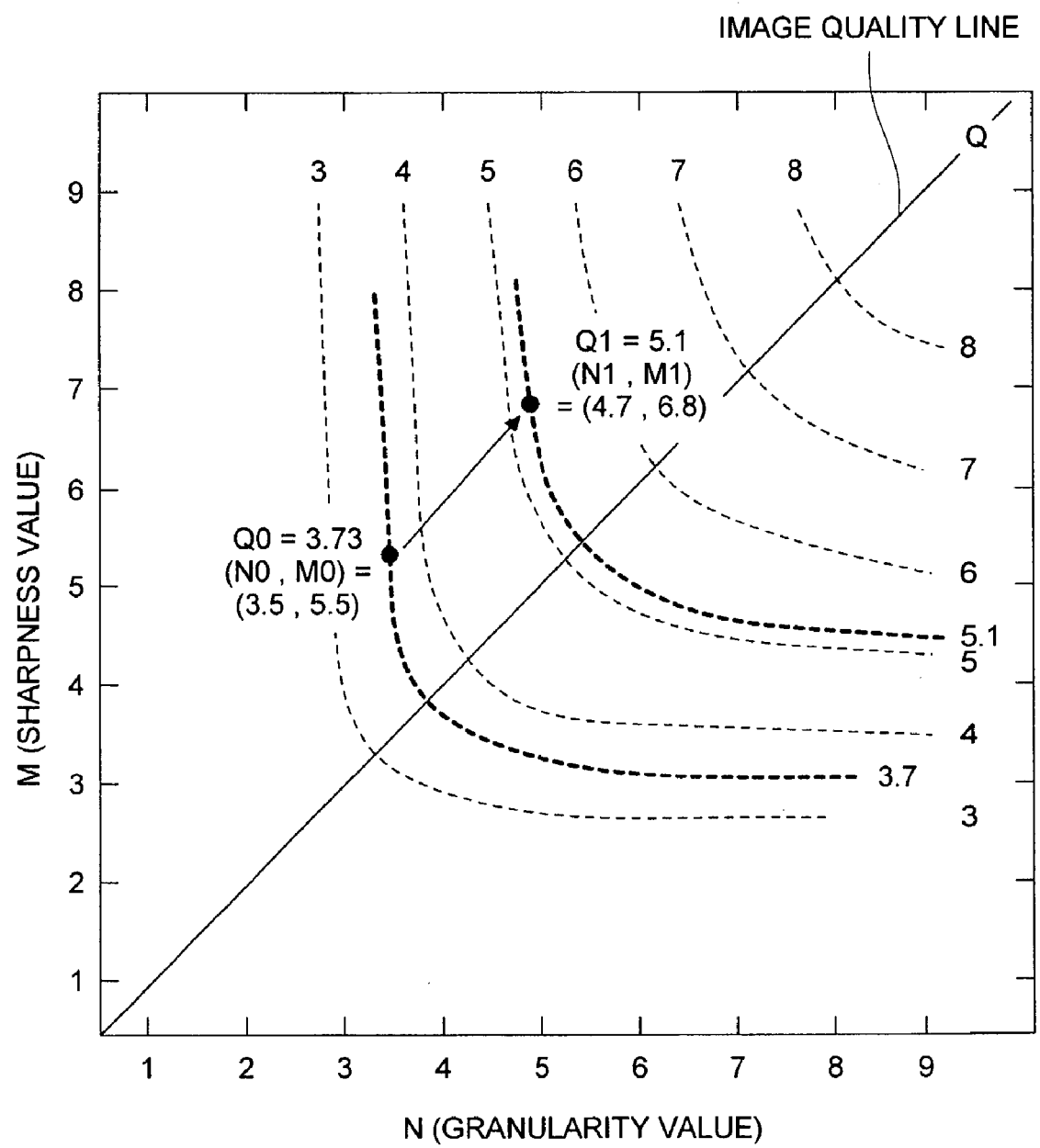
FIG. 5 is a diagram representing value Q correlated by granularity N and sharpness value M.

FIGS. 4 and 5 are the diagrams.

representing the quadratic function of the value Q calculated according to the aforementioned method, with sharpness value M plotted on the vertical axis and granularity value N plotted on the horizontal axis. The image quality line L1 is a linear function represented by Q=f (Ata, Ata) and or BQ=f (Bta, Bta). In this case, the main photographed subject region or selected region are set as a region to be processed, and are expressed as a linear function of Q=f (Ata, Ata). The value Q on the image quality line L1 is characterized in that the functional value as viewed by an observer remains substantially unchanged.

In FIG. 4, if Q0=3 is obtained when (N0, M0)=(3.0, 4.0), Ata=4 since N0<M0. Granularity value N and sharpness value M are corrected in such a way that Qta=3.69, a point on the picture quality line L1, can be approached at Qta=f (4.0, 4.0). The image corrected and processed subsequent to this step of correction is a high-quality image characterized by a higher degree of granularity, with the original atmosphere of the subject kept intact.

In FIG. 5, Q0=3.73 is obtained when (N0, M0)=(3.5, 5.5) for example. When the value Q1 subsequent to image processing is to be increased to 5.1, N1 and M1 on the same inclination as that of the picture image line L1 at Q1=5.1 are calculated. In this case, $(N_1, M_1)=(4.7, 6.8)$. So granularity value N and sharpness value M are corrected to get these values. The atmosphere of the original image can be maintained by obtaining the $N_1$ and $M_1$ in the $Q_1$ on the same inclination as that of the picture quality line $L_1$ as described above, and the granularity value and sharpness value can be further improved.

To perform only the required image processing at high precision with the original atmosphere of the subject kept intact, it is preferred that sharpness in the subject region be mainly improved for $N_0 \geq A_0$ in the aforementioned 0, 0 and A0, while granularity in the subject region be mainly improved when $N_0 \geq A_0$ is not satisfied. To perform only the required image processing at high precision with the atmosphere of the entire image kept intact, it is preferred that the sharpness in the entire image region be mainly improved in the aforementioned BN0, BM0 and BA0 when $BN_0 \geq BA_0$. When $BN_0 \geq BA_0$ is not met, the granularity of the entire image region be mainly improved.

Assume that the color reproduction value of the original image data in the main photographed subject region or selected region is C0, the color reproduction value of the processed image data is C1, the color reproduction value of the original image data in the total image region is BC0, and the color reproduction value of the processed image data is BC1. Then in order to keep the well-defined color of the subject and granular atmosphere unchanged before and after image processing, and to avoid much deviation from the intention of the photographer, differences in N1/N0 and C1/C0 correlated in three dimensions by the granularity value, sharpness value and color performance value as evaluation criteria standardized in terms of functional values are preferred not to exceed 100%. Further, to keep the well-defined color of the subject and sharpness value atmosphere unchanged before and after image processing, and to avoid much deviation from the intention of the photographer, differences in M1/M0 and C1/C0 correlated in three dimensions by the granularity value, sharpness value and color performance value as evaluation criteria standardized in terms of functional values are preferred not to exceed 100%. The difference here refers to the percentage of the difference (positive number) with respect to the smaller value in N1/N0 and C1/C0, or M1/M0 and C1/C0.

When the screen contains a subject, granularity of the skin color plays an important role in order to perform high-quality image processing while maintaining the atmosphere unchanged. Further, in a snap shot, the sharpness of individual green of the background and well-defined colors are required in many cases, and gives a great impact to the image processing step, similarly. Accordingly, in the image processing step of such a snap shot, the entire image region and one or more main photographed subject regions or selected region are the objects for processing. If the image region to be processed is related to red, weight is assigned to the red by comparison between red and green. If the image region to be processed is not related to red, weight is assigned to the green by comparison between red and green in the similar manner. This step allows image processing in conformity to the intention of the photographer. In this case, it is preferred that reference be made to the green, red and light skin of the Macbeth color card although the hue of the color is not specified.

One may wish to get a high quality image while maintaining the feeling of the skin of the child when there is a big region of the subject occupying the entire image as in the case of the portrait of a child. In this case, the entire image region and one or more main photographed subject region or selected region are made the objects to be processed. In the image region to be processed, the region occupied by skin color region and background region are estimated, and different image processing should preferably be applied to each of the estimated skin color region and background region as well as the boundary region between the skin color and background regions.

Various known image processing approaches can be applied as individual image processing procedures constituting the image processing method according to the present invention. Examples are given by the image processing methods disclosed in "Fine Imaging and Digital Photographing" edited by Corona Publishing Company and Publication Committee of the Society of Electrophotography in 2001 and "New Wavelet Image Analysis" by K. Niijima issued from Kagaku Gijutsu Publishing Company in 2000. Use is not restricted to any particular one of these image processing methods. A desired combination of them can be utilized. Combination with wavelet transformation processing is preferred in particular. Image processing may be performed several times, but if it is performed too frequently, the S/N ratio may be reduced. To avoid this, image processing should be done three times or less.

In the image processing method used when an output image data is to be generated from the photographed image data, the entire image region and one or more main photographed subject regions or selected region are the objects for processing. Intermediate processing data is generated based on various types of characteristic information, and the original image data and intermediate processing image data are subjected to addition and/or subtraction in the final stage.

The "intermediate processing image data" appearing in the above statement refers to the image data processed according to the various types of characteristic information gained from the original image data. It is processing image data immediately before addition and/or subtraction is carried out. In the performance of computation in units of pixels, the intermediate processing pixel data is handled as synonymous with intermediate processing image data. The intermediate processing image data is not actually created. When the composition parameters are determined based on various types of characteristic information, and the original image data or pixel data is to be superimposed by the composition parameters, the determined composition parameters are also handled as synonymous with the intermediate processing image data.

Further, the image data subjected to various types of processing is subjected to addition and/or subtraction from the original image data. Then various types of image processing are further provided, and processed image data 1, 2 and 3 are generated sequentially. In this case, if the rate of processing of processed image data 2 and 3 does not exceed 5% with respect to the image data of the entire region of the processed image data 1, the processed image data 1 is handled as intermediate processed image data. Processing can be performed several times in order to get intermediate processed image data, but frequent processing is likely to cause reduction in S/N ratio. To avoid this, processing should preferably be done twice. So long as the effect of the present invention is not deteriorated various types of image processing can be further provided if the percentage of processing does not exceed 5% in the image data of the entire region. The "image data of the entire region" appearing in the above statement refers to the average signal value of signals B, G and R calculated in all the regions in the case of three-color representation method.

Addition and/or subtraction of the intermediate processed image data and original image data may be performed using the weighting factor that changes depending on the distance from the center or periphery of the photographed subject region. Computation may be done according to the method known in blur masking in such a way that the aforementioned computation is performed in a particular region but not in other regions. It is especially preferred that weight of intermediate processed image data is 0.5 or more, and that of the original image is 0.5 or less.

Various known image processing approaches can be applied as individual image processing procedures constituting the image processing method. Examples is given by the aforementioned image processing methods disclosed in "Fine Imaging and Digital Photographing" edited by Corona Publishing Company and Publication Committee of the Society of Electrophotography in 2001 and "New Wavelet Image Analysis" by K. Niijima issued from Kagaku Gijutsu Publishing Company in 2000. Wavelet transformation is preferred in particular. However, only the aforementioned known techniques are not sufficient to get the effect of the present invention. The effect of the present invention is provided by using the intermediate processed image data where the differences do not exceed 100% in granular noise component, intermediate frequency component, chroma, color turbidity, white balance, contrast and high frequency component that are obtained from the processed regions of the processed image data and original image data in the case of image processing.

The following describes the details of the aforementioned characteristic values:

There is no restriction to the calculation method for the difference of the aforementioned granular noise component. For example, it is preferred that the standard deviation of the image signals R, G and B in the region to be processed should be plotted against the brightness, and the area within a certain range of brightness or the peak value between two points should be used for evaluation, whereby the granular noise component is improved. In the present embodiment, the entire region is divided into 20×20 pixels, and the standard deviations of the signals R, G and B in the divided region are obtained. The granular component is obtained by plotting the standard deviation against the $L^*$ calculated by the method of converting the color difference signal into space $L^*$, $a^*$ and $b^*$. In this manner, the difference of granular noise components is found between the original image and processed image. It is also possible to calculate it by converting the brightness signal into the YIQ coordinate and plotting against the brightness in this space.

There is no restriction to the calculation method for the difference of the chroma. For example, the following calculation method can also be used: The entire region is divided into 20×20 pixels. Based on the average value of the signals R, G and B in the divided region, calculation is performed according to the method of converting the color difference signal into space $L^*$, $a^*$ and $b^*$, whereby chroma and brightness $L^*$ are obtained. Chroma is plotted against brightness $L^*$, and the area in a certain range of brightness or a peak value between two points is used for evaluation. The difference of chroma between the original image and processed image is kept not to exceed 100%. In this way, improvement can be achieved.

In the present embodiment, color difference signals are calculated from the regions obtained by dividing the original image region and processed image region into smaller parts. The chroma and lightness $L^*$ of each color are plotted against the hue angles of B, G, R, Y, M and C represented by the Macbeth color card, using only the data that is regarded as having the same hue group within the range of ±10 degrees. The percentage of reproduction with respect to the chroma of each of Macbeth color cards is calculated for each hue in the final phase, using the median of the histogram of the chroma with respect to $L^*$. The result is compared between the original image and processed image, whereby the difference in chroma is obtained. Alternatively, calculation can also be made according to another relational expression correlated with the functional value. The aforementioned six colors are preferred for the color card used for the comparison of hue. However, if there is at least one color, the effect of the present invention can be achieved.

There is no restriction to the method of calculating the color turbidity. For example, the following calculation method can also be used: The entire region is divided into 20×20 pixels. Based on the average value of the signals R, G and B in the divided region, calculation is performed according to the method of converting the color difference signal into space $L^*$, $a^*$ and $b^*$, whereby chroma and brightness $L^*$ are obtained. Plotting is made against brightness $L^*$, and the area in a certain range of brightness or a peak value between two points is used for evaluation. The difference of color turbidity between the original image and processed image is kept not to exceed 100%. In this way, improvement can be achieved.

In the present embodiment, color difference signals are calculated from the regions obtained by dividing the original image region and processed image region into smaller parts. The chroma and lightness $L^*$ of each color are plotted against the hue angles of the purple (color card number 10), blue sky (color card number 3), light skin (color card number 2), yellow green (color code number 11), dark green (color card number 4) and others represented by the Macbeth color card, except for B, G, R, Y, M, C and gray, using only the data that is regarded as having the same hue group within the range of ±10 degrees. The percentage of reproduction with respect to the chroma of each of Macbeth color cards is calculated for each hue in the final phase, using the median of the histogram of the chroma with respect to $L^*$. The result is compared between the original image and processed image, whereby the difference in color turbidity is obtained. Alternatively, calculation can also be made according to another relational expression correlated with the functional value. The aforementioned five colors are preferred for the color card used for the comparison of hue. However, if there is at least one color, the effect of the present invention can be achieved.

There is no restriction to the method of calculating the white balance. The entire region is divided into 20×20 pixels. Calculation is made to see how many times the standard deviation is the distribution position of the average histogram of the signals R, G and B in the divided region. The percentage (absolute value) of the difference in magnifications between the region to be processed and other regions is calculated, and the result is considered as the difference in the white balance.

There is no restriction to the method of calculating the intermediate frequency component. For example, the difference can be calculated based on the peak between two points of a certain frequency, or the average of the area or weight from another frequency having an NWS frequency plot component. It is preferred to use a 3- to 15-cycle per mm region, for example.

There is no restriction to the method of calculating the difference of the high frequency component. For example, the difference can be calculated based on the peak between two points of a certain frequency, or the average of the area or weight from another frequency having an NWS frequency plot component. It is preferred to use a 25- to 50-cycle per mm region, for example.

The differences in the granular noise component, intermediate frequency component, chroma, color turbidity, white balance, contrast and high frequency component from those of the original image data are preferred to lie between 10 and 50%. More preferably, differences in the granular noise component and/or high frequency component from those of the original data should lie between 30 and 70%, and the differences in chroma, color turbidity, white balance and contrast from those of the original image data should be between 10 and 50%.

The following describes the details of how to get the size of the main photographed subject or selected region:

The size of the main photographed subject or selected region is obtained from user designation or by reference to the additional data (tag data, etc.) attached to the image data. Such additional information can be attached as independent information format or independent information file or data. It is preferred to use the existing tag information that is specified in the general-purpose image format represented by JPEG, TIFF and Exif, or to employ a freely usable region such as a manufacturer's note or user's note.

The size of the main photographed subject need not always be designated in terms of the actual size on the output image. The information that permits calculation of the percentage occupied by the main photographed subject in the image may be added in terms of the aforementioned information. For example, when the size of the main photographed subject is designated in terms of the number of pixels of one side or radius, the percentage of the main photographed subject occupied in the image can be easily obtained by comparison in terms of the number of pixels of the entire image. As described above, the size of the main photographed subject in the output image can be easily calculated by multiplication by the size of the output image acquired or estimated.

It is also possible to estimate the size of the main photographed subject in the output image even when the size of the main photographed subject is not directly specified. To put it more specifically, there is a method of extracting the skin color portion of the image data and the range where the hue and lightness are kept within a certain limit at the center of the image. It is more preferable to get the information on photographing conditions and to estimate the percentage of the main photographed subject from the acquired information. Information on photographing conditions can be specifically exemplified by a photographed subject range, the type of a photographed scene, distance of the subject and detection of the light reflected from a stroboscopic lamp when shooting in flash mode. These pieces of information are preferred to be acquired from additional information, as described above.

The following describes the method for estimating the percentage of the main photographed subject from the information on photographing conditions with reference to some examples:

For example, when information on the photographed range is given, the percentage of the main photographed subject in an image can be easily obtained by comparison with the number of pixels in the entire image, if this information is given in the form that allows calculation of the number of pixels in a region. Then the size of the main photographed subject in the output image can be easily calculated by multiplication by the size of the output image acquired or estimated in the aforementioned method. When information on the photographed range is given by only one point of the central coordinate in the region, the average hue and lightness of several pixels on the periphery of the specified coordinate are calculated, and a search is made from the average to find out the region of the pixels where the hue and lightness on the periphery of the specified coordinate can be kept within a certain scope (for example, the difference in the hue angle does not exceed 10 degrees, and the difference in lightness does not exceed 10% that in the dynamic range).

When the information on a photographed scene is given, and the scene comprises a human subject or portrait, the main photographed subject is estimated to be a human face, the diameter is considered to be about one quarter to one half the short side of the image. In this case, the number of pixels corresponding to the area having a diameter about one third the number of pixels having a predetermined short side of the image can be used as an approximate value to estimate the percentage of the main photographed subject. Precision in estimation can be improved by searching the skin color range about one quarter to one half the short side of the image from the image. For a scenic shot, a main photographed subject occupying 10% of the image area is present in many cases. For the shot of a night view, the region where the lightness is higher than that of the entire image can be estimated as a main photographed subject.

When information on the distance of a subject is given, the main photographed subject is assumed as a human face, the size of the face conforming to the distance of the subject is calculated from the characteristics of the lens of a general compact camera, whereby the percentage of the main photographed subject in the image can be estimated. Further, when information on the light reflected from a stroboscopic lamp for shooting in flash mode is given, an approximate distance of the subject can be estimated depending on the presence/absence and strength of the reflected light. Then the percentage of the main photographed substance in the image can be estimated similarly to the aforementioned method. It goes without saying that, when multiple pieces of the aforementioned photographic information are given, precision in estimation can be improved by the combination thereof.

The present invention is characterized by determining the details of the image processing to be applied to photographed image data based on the estimated main photographed subject region or selected region in the image, thereby providing more favorable impression. The following describes the specific method for determining the details of image processing:

In the present embodiment, the main photographed subject region or selected region in an image, or the image data of the entire region is taken into account in determining image processing conditions. Actually, there is no need for the aforementioned calculation every time the photographed image data is entered.

It is preferred that image processing be carried out by reference to the look-up table where an image processing conditions are applied in advance or a simple approximate calculation formula.

Further, it is preferred to get the information showing the trend of the image processing provided when the photographed image data is generated, and to correct the degree of image processing according to this information. To put it more specifically, information is obtained that shows the trend of image processing such as contrast processing, sharpness processing and chroma processing provided when image data has been created. For example, if a high contrast is set, the contrast enhancement is reduced or discontinued when the main photographed subject is small on the screen, or the degree of low contrast is increased when the main photographed subject is large on the screen, whereby the degree of image processing is corrected based on the acquired information showing the trend of image processing. As described above, it is also possible to incorporate the step of correcting the level with consideration given to duplication and reciprocity. Information on the trend of image processing is preferred to be acquired through additional information, as described above.

It is also preferred to correct the level of image processing by acquiring information on the taste of the user from the entire region of the image data and main photographed subject region, or from the granularity value, sharpness value and color performance value standardized in terms of functional values, or by acquiring such information through contrast of such factors including the overall picture quality value or three-dimensional overall picture quality value. Even if the information on the taste of the user cannot be obtained, it is preferred to estimate the taste and to correct the degree of image processing based on this estimation. Information required to estimate the taste includes the information on the model number of a camera and photographic equipment, number of the pixels, exposure mode and white balance settings. As information on the user taste, "hard", "soft", "gorgeous", "plain", "faithful to entries", etc. can be specified by the user before starting processing. It is preferred to get such information through additional information, as described above.

The following describes the procedures or estimating the user taste more specifically: When a high-grade camera such a single lens reflex camera is used, it is highly probable that photographing conditions and mode are determined by giving consideration to the high level of the photographer's skill and evaluation of the image printed on the medium, and picture composition is determined by giving consideration to the position and size of the main photographed subject in the image. In this case, it is preferred that image processing is not conspicuous. Even when the model of the camera is not clear, consideration is given to the current trend, and use of a high-grade camera is assumed if the number of photographic pixels is very great. In this way, the user's taste can be estimated. If the exposure mode and white balance are manually set, or a picture is taken in the automatic bracket mode, then image processing should be done to a very small extent or should not be performed at all since the photographer has set the photographing conditions and mode with a clear intention in this case.

Figure 6:
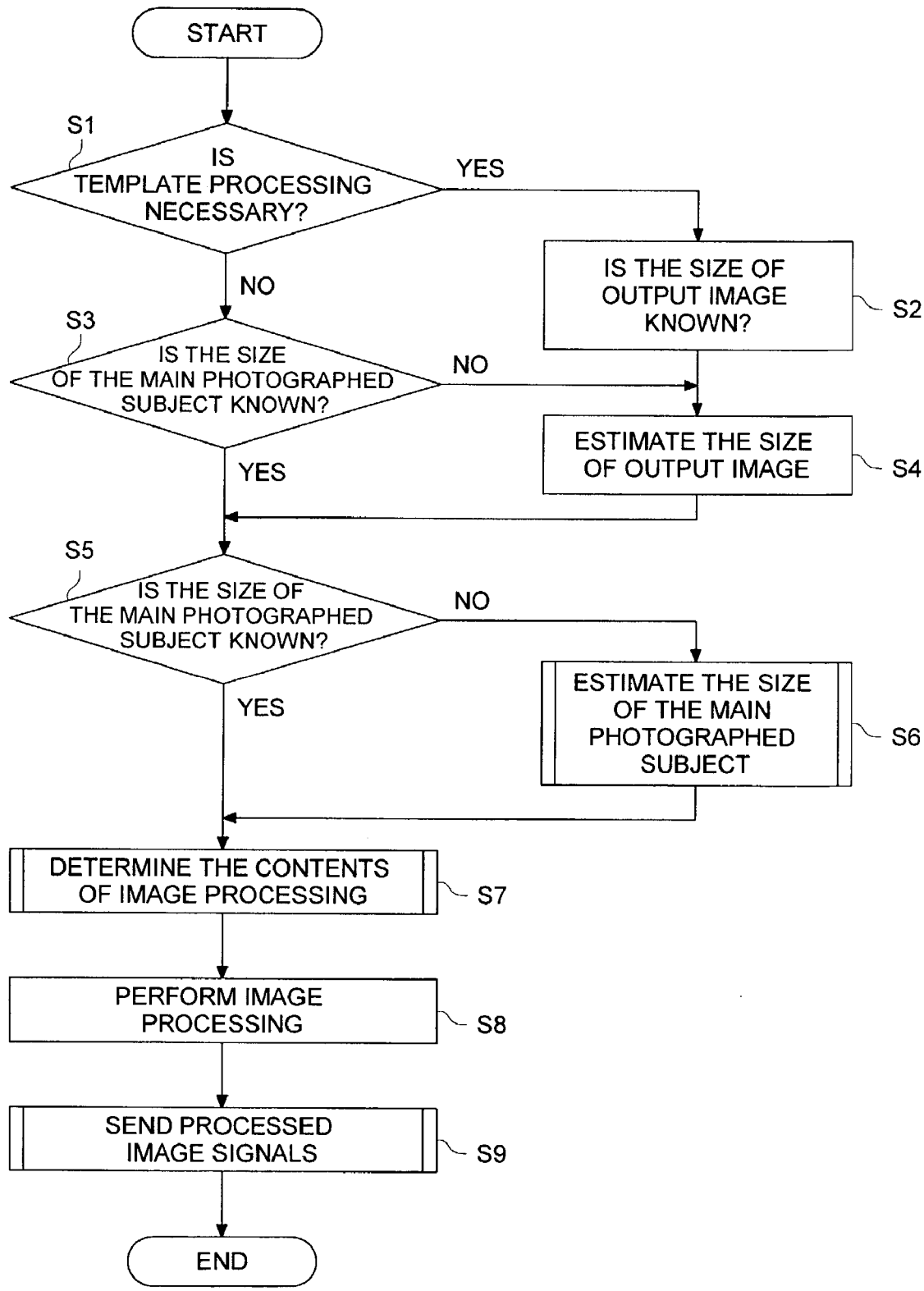
FIG. 6 is a flow chart explaining the step of image processing to be implemented by the image processor 70 given in FIG. 2.
Figure 7:
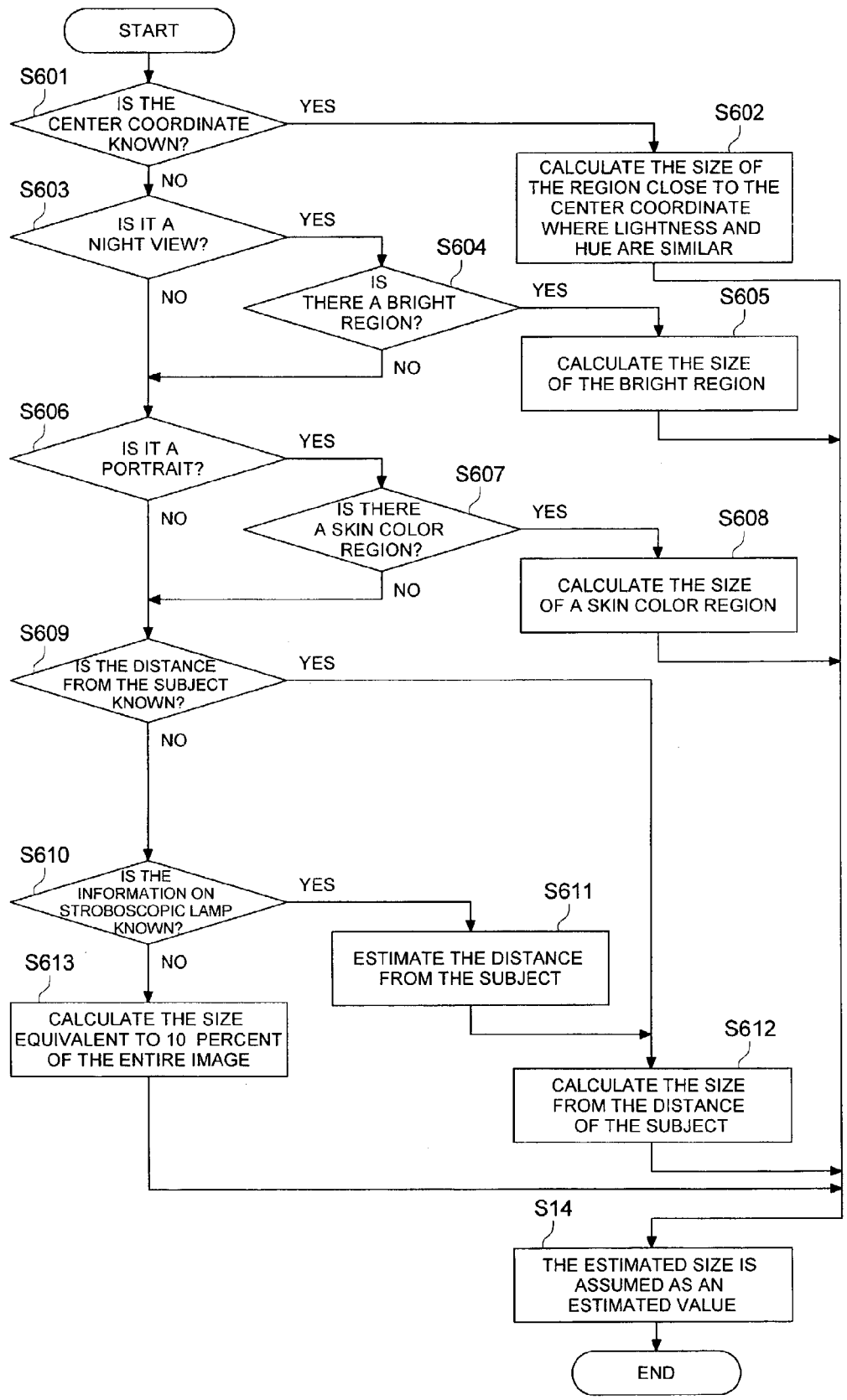
FIG. 7 is a flow chart explaining the step of estimating the size of the main photographed subject to be implemented by the image processor 70 given in FIG. 2.
Figure 8:
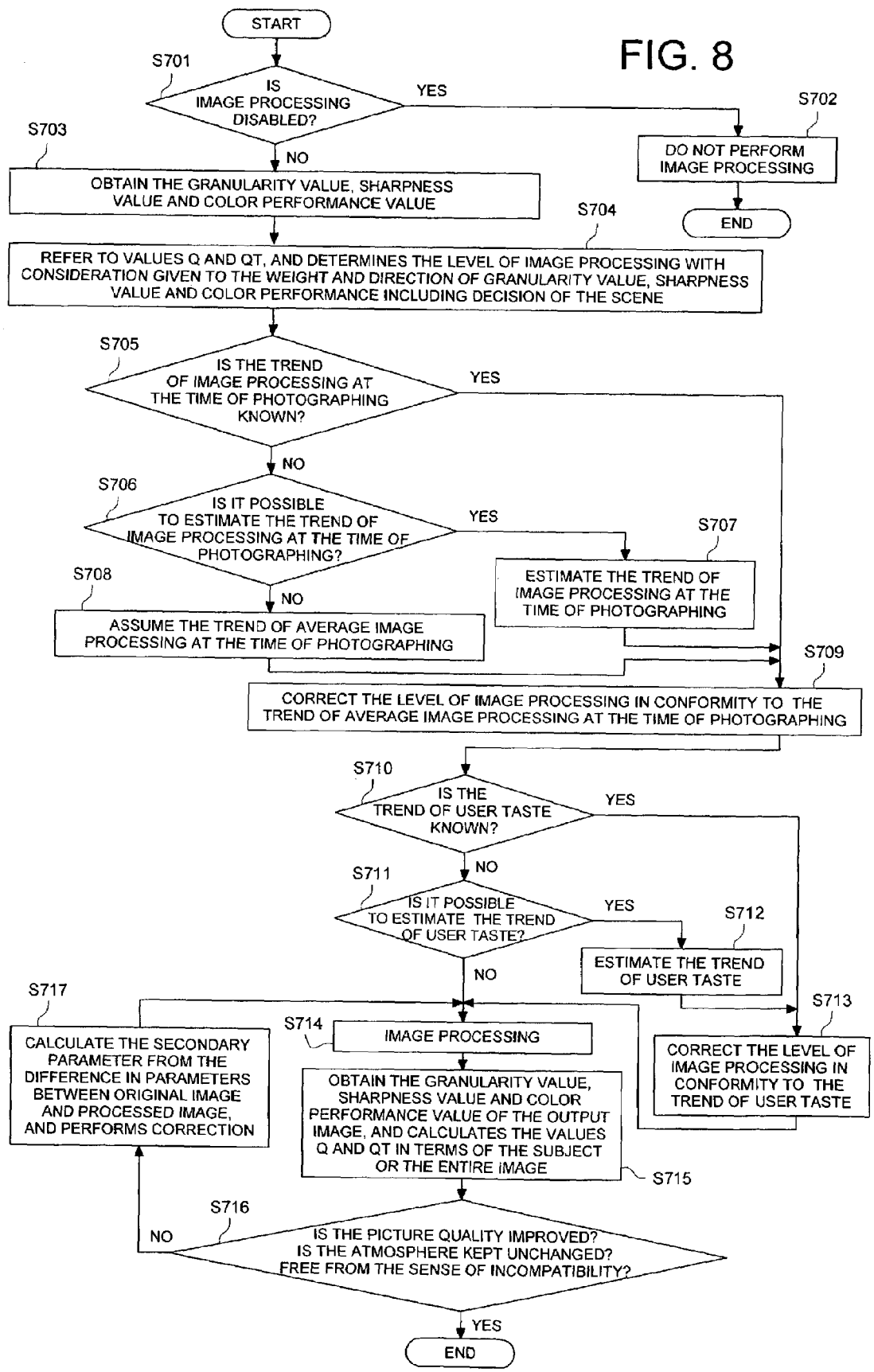
FIG. 8 is a flow chart explaining the step of determining the contents of image processing to be implemented by the image processor 70 given in FIG. 2.

Using the aforementioned image processing method with reference to FIGS. 6 through 8, the following describes the image processing to be performed using the control section 7 and image processor 70 shown in FIG. 3:

FIG. 6 is a flow chart representing image processing performed by the image processor 70 shown in FIG. 3.

In FIG. 6, the control section 7 determines whether or not template processing is required to the image data entered into an image adjustment processor 74 from a film scan data processor 71, a reflective document scan data processor 72 and an image data format decoding processor 73 (Step S1). Template processing is performed by the template processor 79 when necessary. The image data subjected to template processing is picked up (Step 2) and is sent to the Step 4.

If template processing is not necessary, a decision is made to determine if information on the size of the output image has already been acquired or not (Step 3). If the size of the output image is already known, the system will go to Step S5. If the size of the output image is not known, the system will go to Step S5 after estimating the output image size (Step S4). It should be noted that the output image size is estimated by assuming a general color image printing condition (e.g. 300 dpi) and converting the number of the image pixels into the output image size. If template processing has been completed, the entire region of the image data having been input after having been template-processed may be incorporated in part of the output image. So this is checked without fail and the result is converted into the size on the output image where the input image data is actually output.

Then a decision is made to determine if the size of the main photographed subject in the output image is already acquired or not (Step S5). If it is already known, the system goes to Step S7. If it is not, the system goes to Step S7 after estimating the size of the main photographed subject to be discussed later (Step S6).

When the size of the main photographed subject has been acquired, the system determines the contents of image processing to be described later (Step S7). According to the contents of the determined image processing, the input image data is subjected to image processing by the CRT-specific processor 75, printer-specific processors 1 and 2 (76 and 77) and image data format creation processor 78 (Ste S8). The processed image data is output to each of the sections such as CRT and exposure processor (Step S9), whereby image processing is terminated.

The following describes the process of estimating the size of the main photographed subject with reference to the flow chart in FIG. 7:

In FIG. 7, the control section 7 determines if the central coordinate of the main photographed subject is acquired or not (Step S601). When the center coordinate of the main photographed subject is known, the system calculates the average hue and lightness of several pixels on the periphery of the central coordinate, and goes to step (Step 614) after estimating the size of the region of pixels accommodated in a certain range (e.g. the difference in hue angle does not exceed 10 degrees and the difference in lightness does not exceed 10 percent) from the average value of the hue and lightness calculated on the periphery of the central coordinate (Step S602).

When the central coordinate of the main photographed subject is not known, the system determines if the camera is in the night view mode or not. If not, the system goes to Step S606. If the camera is in the night view mode, the system determines whether or not there is any region that is partially light (S603). If there is no region of greater lightness, the system goes to step S606. If there is such a region, the largest area or the region closest to the image center in the light region is adopted and its size is calculated (Step 605). After that, it goes to the Step S614.

If the mode is not a night view mode or there is no light area, a decision is made to see if the camera is in the portrait mode or not (Step S606). If it is not in the portrait mode, the system goes to Step 609. If it is in the portrait mode, the system determines whether or not a region of skin color having an appropriate size (e.g. having a diameter of ⅕ the length of the short side of the pixel) is present at the approximate center of the image. If such a region is not present, the system goes to S609. If it is present, the system goes to S614 after calculating the size of the skin colored region (Step S608).

If the camera is not in the portrait mode and there is no skin colored region, the system determines if the information on the distance of the subject has been acquired or not (S609). If this information is already known, the system calculates the size of the face (Step S6612) in conformity to the lens characteristics of a general compact cameras and distance of the subject on the assumption that the main photographed subject is a human face, and goes to Step S614. When the distance of the subject is unknown, a decision is made to see if information on stroboscope for shooting in flash mode is obtained or not, (Step S610). If information on stroboscope is known, the distance from the subject is calculated from the return detection and guide number (Step S611). As described above, the system calculates the size of the face in conformity to the distance from the subject (Step S612) and proceeds to Step S614. If information on the stroboscope is unknown, the system calculates the size equivalent to 10% of the entire image (Step S613) and proceeds to Step S614.

The size of the region calculated in each step is adopted as an estimated value for the size of the main photographed subject (Step S614), thereby terminating the process of estimating the sizes of the main photographed subject. However, it is to be understood that the aforementioned process of estimation is only an example, and the present invention is not restricted thereto. Any method ensuring high estimation accuracy can be used without being limited to the above example alone.

The following describes the process of determining the contents of image processing with reference to the flow chart in FIG. 8:

In FIG. 8, the image adjustment processor 74 determines if image processing is disabled or not (Step S701). Image data may include the already processed image data or the image data for disabling the processing of image at the time of output based on the specific intention so that favorable impression is given when observing the image by the output media. For such image data, it is preferred that information for disabling image processing at the time of output should be described beforehand in the additional information (header information, tag information, etc.) inside the general-purpose image format represented by JPEG, TIFF, Exif, etc., or the operator should use the operation section 11 to specify the command to disable image processing. In the present embodiment, reference is made to the aforementioned additional information at the beginning of image processing, or detection is made to check that the command has been given through the operation section 11 to disable image processing. The content of image processing is determined to ensure that no image processing is carried out when image processing is disabled (Step S702), thereby terminating the process of determining the content of image processing.

When image processing is not disabled, granularity value N, sharpness value M and color performance value C are calculated according to the aforementioned respective methods in the entire image region, in the main photographed subject region estimated in the process of estimating the size of the main photographed subject region in FIG. 5, or in the region selected by the user. Then the overall picture quality value Q and three-dimensional picture quality value QT are calculated from the calculated characteristics (Step S703). This is followed by the process of determining the level of image processing with consideration given to the weighting and direction of granularity value N, sharpness value M and color performance value C including the evaluation of the scene from the calculated overall picture quality value Q and three-dimensional picture quality value QT (Step S704).

Then the system determines if information on the trend of image processing at the time of photographing is acquired or not (Step S705). If the he trend of image processing is known, the system goes to step S709. If it is not known, the system checks if information for estimating the trend of image processing at the time of photographing is acquired or not, and determines if estimation is possible or not (Step S706). Such information includes the model name of the camera used for photographing and manufacturer's name. The image processing trend for each of the model name and manufacturer's name is formulated into a table in advance. If the trend of image processing can be estimated, the system estimates the trend of image processing by referring to the table (Step S707), and goes to Step S709.

If there is no information that allows the trend of image processing to be estimated, and estimation is impossible, the system assumes that image processing is provided at the time of photographing according to the trend of average image processing in the model name and manufacturer's name (Step S708), and proceeds to Step S709. Then the level of image processing is corrected n conformity to the estimated or assumed trend of image processing in each step (Step S709).

Then the system determines if the trend of user taste is acquired or not (Step S710). When the trend of user taste is known, the system goes to Step S713. If it is not known, the system determines if the trend of user taste can be estimated or not (Step S711) The system estimates the trend of user taste (Step S712) if it can be estimated, and corrects the level of image processing in conformity to the obtained trend of user taste (Step S713).

If the trend of user taste cannot be estimated, the image data entered at the level of image processing corrected in Step S704 is subjected to image processing (Step S714). When the trend of user taste has been acquired or estimated, the image data entered at the level of image processing corrected in Step S713 is subjected to image processing (Step S714).

Granularity value N, sharpness value M and color performance value C are calculated in the entire image region of the image processed in Step S714, in the main photographed subject region estimated in the process of estimating the size of the main photographed subject region in FIG. 5, or in the region selected by the user. Overall picture quality value Q and three-dimensional picture quality value QT are further calculated from the calculated characteristic values (Step S715).

Then from the calculated overall picture quality value Q and three-dimensional picture quality value QT, it is possible to determine whether or not the picture quality can be further improved while maintaining the atmosphere unchanged, and whether or not any difference has occurred (Step S716). If picture quality can be further improved while maintaining the atmosphere unchanged, or any difference has occurred to image processing, a secondary parameter is calculated from the parameter difference between original image data and processed image data, and the level of image processing is corrected (Step S717). Then the system goes back to step S714 to provide image processing again at the corrected level. In the meantime, if picture quality cannot be further improved while maintaining the atmosphere unchanged, or no difference has occurred to image processing, the image processing level in this processed image is determined as processed contents, thereby terminating the process of determining the contents of image processing. However, if it is possible to estimate the image processing parameter of the entire system, changes in picture quality values before and after processing and their values can be estimated, for example, if a data table is provided in Step S709 and the effect of the present invention is not spoilt, the step S716 can be omitted.

As described above, granularity value N, sharpness value M and color performance value C are calculated and calculated characteristics are used as parameters to determine the contents of image processing. This provides stable image processing characterized by well-defined three-dimensional effect with the atmosphere kept unchanged, free from a sense of incompatibility with the background. In the image where a low contrast is preferred as in the case of a child in a portrait, the contents of image processing are determined in such a way that granularity is further increased with the sharpness value kept to 5 through 6. In the image where there is no human subject, and the contents of image processing are determined in such a way that the sharpness value is increased to 6 or more with granularity value kept unchanged. This method provides high-quality images.

Based on the trend of image processing at the time of photographing, the contents of image processing can be corrected, and the direction and weight in image processing can be corrected. For example, in a scenic shot devoid of a human subject, a favorable image can be obtained by increasing the sharpness value with granularity kept unchanged. When the sharpness of the input medium is sufficient but the contrast characteristics are much lower than the standard value, the weight of the main image processing can be changed in such a way that sharpness can be improved by increasing the contrast. Further, when the characteristics and atmosphere of the output medium are specified, the atmosphere can be reproduced by a substantial change of color performance value without changing the overall picture quality value Q and three-dimensional picture quality value QT. As described above, the output image characteristics can be kept within a proper range by correcting the level of image processing with consideration given to duplication and reciprocity with image processing provided at the time of photographing.

When the photographed image data is created by a film scanner or flat head scanner, it is preferred to obtain or estimate the information on the trend of image processing at the time of scanned image generation and to correct the level of image processing.

As described above, the granularity value, sharpness value and color performance value as evaluation criteria standardized in terms of functional value are calculated, and the overall picture quality value Q correlated in two dimension by the calculated granularity and sharpness value and three-dimensional overall picture quality value correlated in three dimensions by the above calculated granularity, sharpness value and color performance value. The direction of image processing is determined by referring to these characteristic values Q and QT. This provides stable image processing characterized by well-defined three-dimensional effect with the atmosphere kept unchanged, free from a sense of incompatibility with the background.

The differences of characteristics (granular noise, intermediate frequency component, chroma, color turbidity, white balance, contrast and high frequency component) between the original image and intermediate processed image composed on the original image are kept not to exceed 100%. This provides an output image characterized by well-defined three-dimensional effect with the atmosphere kept unchanged, free from a sense of incompatibility with the background.

When it is possible to get or estimate information on the trend of image processing at the time of photographing provided by input media and the trend of user taste, the level of image processing is corrected in conformity to these pieces of information. This permits more flexible image processing and provides an output image characterized by well-defined three-dimensional effect with the atmosphere kept unchanged, free from a sense of incompatibility with the background.

The present invention provides the following effects:

According to the invention described in Items 1, 54, 107, 160, the granularity value and sharpness value standardized in functional values are calculated, and image processing is performed by reference to these calculated values. This provides image processing with consideration given to granularity and sharpness and allows a high-quality output image to be generated with the original atmosphere kept unchanged.

According to the invention described in Items 2, 55, 108, 161, the granularity value and sharpness value standardized in functional values are calculated, and the overall picture quality value correlated in two dimensions by the granularity value and sharpness value is further calculated. Image processing is performed by reference to the calculated overall picture quality value. This provides image processing with consideration given to granularity and sharpness and allows a high-quality output image to be generated with the original atmosphere kept unchanged.

According to the invention described in Items 3, 56, 109, 162, the granularity value, sharpness value and color performance value standardized in functional values are calculated, and image processing is performed by reference to the calculated values. This provides image processing with consideration given to granularity, sharpness and color performance value, and allows a high-quality output image to be generated with the original atmosphere kept unchanged.

According to the invention described in Items 4, 57, 110, 163, the granularity value, sharpness value and color performance value standardized in functional values are calculated, and the three-dimensional picture quality value correlated in three dimensions by granularity value, sharpness value and color performance value is calculated. Image processing is performed by reference to the calculated three-dimensional picture quality value. This provides image processing with consideration given to granularity, sharpness and color performance value, and allows a high-quality output image to be generated with the original atmosphere kept unchanged.

According to the invention described in Items 5, 6, 58, 59, 111, 112, 164, 165, calculation is made so that the difference between the ratio of granularity values in the original image and output image and the ratio of sharpness values does not to exceed 100%. This allows the setting to be made so that granularity value and sharpness value comes closer to the same value, thereby improving the effect of keeping the atmosphere unchanged.

According to the invention described in Items 7, 8, 60, 61, 113, 114, 166, 167, when the main image region or selected region is to be processed, calculation is made so that the absolute values of $\Delta N$ and $\Delta M$ do not exceed 1.0. When the entire image region is to be processed, calculation is made so that the absolute values of $\Delta BN$ and $\Delta BM$ do not exceed 1.0. This ensures image processing of higher accuracy without sacrificing the intention of the photographer.

According to the invention described in Items 9, 10, 62, 63, 115, 116, 168, 169, value Qta and value BQta are calculated in conformity to sharpness value when the granularity value is greater than sharpness value, and in conformity to sharpness value when the granularity value is smaller than sharpness value. Image processing is carried out so that the values Q1 and BQ1 will be closer to values Qta and BQta calculated respectively. This image processing ensures a high-quality image, with the atmosphere of the original image kept intact.

According to the invention described in Items 11, 12, 64, 65, 117, 118, 170, 171, when the main image region or selected region is to be processed, image processing is performed by correcting sharpness value if $N0 \geqq A0$ is met, and by correcting granularity value if it is not met. When the entire image region is to be processed, image processing is performed by correcting the sharpness value if $BN0 \geqq B0$ is met, and by correcting the granularity value if it is not met. This image processing method improves granularity value and sharpness value and ensures a high-quality image, with the atmosphere of the original image kept intact.

According to the invention described in Items 13, 14, 66, 67, 119, 120, 172, 173, calculation is made so that the difference between the ratio of color performance values in the original image and output image and the ratio of granularity values or the difference between the ratio of color performance values in the original image and output image and the ratio of sharpness values does not to exceed 100%. This allows the setting to be made so that color performance value and granularity value or color performance value and sharpness value come closer to the same value, thereby improving the effect of keeping the atmosphere unchanged.

According to the invention described in Items 15, 16, 68, 69, 121, 122, 174, 175, in the region to be processed, comparison is made between color information of red and that of green. If the color is red, weight is assigned to red to perform image processing. If the color is green, weight is assigned to green. Then image is processed to provide a high-quality output image intended by the photographer in conformity to the scene of the photographed image.

According to the invention-described in Items 17, 18, 70, 71, 123, 124, 176, 177, in the region to be processed, skin color and background regions are calculated, and image processing is performed in conformity to each of the skin color region, background region and boundary region between the skin color and background regions. This ensures the connection between the subject of the photographed image and background to be reproduced without a sense of incompatibility, thereby more flexible image processing is provided.

According to the invention described in Items 19 to 31, 72 to 84, 125 to 137, 178 to 190, in the region to be processed, intermediate processed image data is generated. Output image data is generated by calculation of the original image data and this intermediate processed image data. The intermediate processed image data is generated so that the difference of characteristic values in the intermediate processed image data and original image data will not exceed 100% in any one of the values of characteristics including granular noise component, intermediate frequency component, chroma, color turbidity, white balance, contrast and high frequency component. This provides an image processing method that ensures a high-quality output image wherein the connection between the subject of the photographed image and background is free of a sense of incompatibility, and the atmosphere is kept unchanged.

According to the invention described in Items 32, 85, 138, 191, the present invention obtains information on one of the photographing conditions of subject region, photographed scene type, distance of a subject and detection of light reflected from a stroboscopic lamp, specifies the size of the main photographed subject in the original image data based on that information, and performs image processing based on the size of the estimated main photographed subject. This method allows more flexible and high precision image processing in conformity to the photographed image scene.

According to the invention described in Items 34, 87, 140, 193, the present invention obtains or estimates information on the size of the main photographed subject in the output image data of the photographed image, and changes the contents of image processing in conformity to the size of the main photographed subject in the output image data. This method ensures more flexible and high-precision image processing in conformity to the photographed image scene.

According to the invention described in Items 35, 88, 141, 194, the present invention obtains the information on the size of the output image data and the size of the main photographed subject in the output image data, or estimates the size of the main photographed subject in the original image data and size of the output image data based on the photographing conditions, and changes the contents of image processing in conformity to the size. This method ensures more flexible and high-precision image processing in conformity to the photographed image scene.

According to the invention described in Items 33, 39, 45, 86, 92, 98, 139, 145, 151, 192, 198, 204, various types of information are obtained from the tag information on the original image data, with the result that convenience is improved.

According to the invention described in Items 36 to 38, 89 to 91, 142 to 144, 195 to 197, the present invention obtains the information on the trend of image processing regarding at least one of contrast processing, sharpness processing, granularity processing and chroma processing provided at the time of photographing. The level of image processing is corrected with consideration given to the duplication and reciprocity with the trend of image processing. This method ensures more flexible and high-precision image processing.

According to the invention described in Items 40 to 44, 93 to 97, 146 to 150, 199 to 203, the present invention obtains information on the user, or acquire one of the pieces of information on camera model, the number of photographing pixels, exposure mode and white balance setting, thereby estimating the trend of the user and setting or correcting the level of image processing in response to this user trend. This method ensures more flexible and high-precision image processing.

According to the invention described in Items 46, 99, 152, 205, the present invention estimates the angle of field where the main photographed subject is accommodated. This method ensures more flexible and high-precision image processing.

According to the invention described in Items 47 to 49, 100 to 102, 153 to 155, 206 to 208, the aforementioned difference is set not to exceed 50%, the range from 5 to 20% or the range from 5 to 10%, thereby ensuring more high-precision image processing.

According to the invention described in Items 50 to 53, 103 to 106, 156 to 159, 209 to 212, calculation is made so that the aforementioned absolute values of $\Delta N$ and $\Delta M$ do not exceed 0.7 or 0.4, or the aforementioned absolute values of $\Delta BN$ and $\Delta BM$ do not exceed 0.7 or 0.4, with the result that more high-precision image processing is provided.

According to the invention described in Items 213 to 219, printed output is produced according to any one of the ink jetting method, electrophotographic method, sublimation method and thermal method, wherein output image data is printed on silver halide printing paper. This allows the imaged processed output image data to be printed out, with the result that convenience is much improved.

According to the invention described in Items 220 to 221, The output image data is recorded in at least one of a compact disk, mini-disk, floppy disk (registered trademark), memory card, IC card and magneto-optical disk. This allows image processed output image data to be stored, with the result that convenience is much improved.

What is claimed is:

1. An image processing method for applying an image processing to two dimensionally-arranged original image data corresponding to an entire image region of a photographed image including a main photographed-subject and for producing output image data, said method comprising:
    determining at least one of a main photographed-subject region of the main photographed-subject and a selected region of the two dimensionally-arranged original image data;
    setting the entire image region and one of the main photographed-subject region and the selected region as target regions;
    obtaining image characteristics from each of the target regions;
    calculating a granularity value and a sharpness value for each of the target regions from the respective image characteristics of the target regions, wherein each of the granularity value and the sharpness value is an evaluation criterion standardized with a functional value; and
    conducting an image processing for the two dimensionally-arranged original image data with reference to the granularity value and the sharpness value.

2. The image processing method of claim 1, wherein the main photographed-subject region is determined by obtaining photographing condition information including at least one of a subject area, a type of a photographed scene, a subject distance and a detection of reflected strobe light with regard to the photographed image, estimating a size of the main photographed-subject in the original image data from the obtained photographing condition information, and determining the main photographed-subject region based on the estimated size of the main photographed-subject.

3. The image processing method of claim 2, wherein the original image data is provided with additional data the photographing condition information is obtained from the additional data.

4. The image processing method of claim 1, wherein the main photographed-subject region is determined by obtaining information regarding a size of the main photographed-subject in the original image data and determining the main photographed-subject region based on the obtained size of the main photographed-subject.

5. The image processing method of claim 4, wherein the original image data is provided with additional data including main photographed-subject information and the size of the main photographed-subject is obtained from the main photographed-subject information.

6. The image processing method of claim 1, further comprising calculating a total image quality value correlated two dimensionally with the granularity value and the sharpness value, wherein the image processing is conducted with reference to the total image quality value.

7. The image processing method of claim 1, wherein further comprising calculating a color performance value for each of the target regions, wherein the image processing is conducted with reference to the color performance value, the granularity value and the sharpness value.

8. The image processing method of claim 7, further comprising calculating a total image quality value correlated three dimensionally with the granularity value, the sharpness value and the color performance value, wherein the image processing is conducted with reference to the total image quality value.

9. The image processing method of claim 1, wherein the granularity value and the sharpness value are calculated such that a difference between N1/N0 and M1/M0 is not more than 100%, where N0 and M0 are the granularity value and the sharpness value calculated from original image data of said one of the main photographed-subject region and the selected region, and N1 and M1 are the granularity value and the sharpness value calculated from output image data of said one of the main photographed-subject region and the selected region.

10. The image processing method of claim 9, wherein the difference is not more than 50%.

11. The image processing method of claim 10, wherein the difference is 5 to 20%.

12. The image processing method of claim 11, wherein the difference is 5 to 10%.

13. The image processing method of claim 1, wherein the granularity value and the sharpness value are calculated such that a difference between BN1/BN0 and BM1/BM0 is not more than 100%, where BN0 and BM0 are the granularity value and the sharpness value calculated from original image data of the entire image region, and BN1 and BM1 are the granularity value and the sharpness value calculated from output image data of the entire image region.

14. The image processing method of claim 13, wherein the difference is not more than 50%.

15. The image processing method of claim 14, wherein the difference is 5 to 20%.

16. The image processing method of claim 15, wherein the difference is 5 to 10%.

17. The image processing method of claim 6, wherein when Q0 is the total image quality value calculated from original image data of said one of the main photographed-subject region and the selected region, Q1 is the total image quality value calculated from output image data of said one of the main photographed-subject region and the selected region, N and M are normalized granularity and sharpness values, respectively, and the total image quality value Q is a functional value obtained by a formula of Q=f (N, M), and wherein calculating the image quality comprises calculating $\Delta N$ and $\Delta M$ by formulas of $\Delta N=(Q1-N1)-(Q0-N0)$ and $\Delta M=(Q1-M1)-(Q0-M0)$ such that $Q0 \leq Q1$ and an absolute value of each of $\Delta N$ and $\Delta M$ is not more than 1.0.

18. The image processing method of claim 6, wherein when BQ0 is the total image quality value calculated from original image data of the entire image region, BQ1 is the total image quality value calculated from output image data of the entire image region, BN and BM are normalized granularity and sharpness values, respectively, and the total image quality value BQ is a functional value obtained by a formula of BQ=f (BN,BM), and wherein calculating the image quality comprises calculating $\Delta BN$ and $\Delta BM$ by formulas of ABN =(BQ1-BN1)-(BQ0-BN0) and $\Delta BM=$(BQ1-BM1)-(BQ0-BM0) such that $Q0 \leq Q1$ and an absolute value of each of ABN and $\Delta BM$ is not more than 1.0.

19. The image processing method of claim 17, wherein when N0 and M0 satisfy $N0 \geq M0$, Ata=N0, and when N0 and M0 do not satisfy $N0 \geq M0$, Ata=M0, calculating the image quality value comprises calculating Qta by a formula of Qta=f (Ata,Ata), and the image processing is conducted such that Q1 becomes closer to Qta, where N0 and M0 are the granularity value and the sharpness value calculated from original image data of said one of the main photographed-subject region and the selected region.

20. The image processing method of claim 18, wherein when BN0 and BM0 satisfy BN0≧BM0, Bta=BN0, and when BN0 and BM0 do not satisfy BN0≧BM0, Bta=BM0, calculating the image quality value comprises calculating BQta by a formula of Bqta=f (Bta,Bta), and the image processing is conducted such that BQ1 becomes closer to Bqta, where BN0 and BM0 are the granularity value and the sharpness value calculated from original image data of the entire image region.

21. The image processing method of claim 6, wherein when the total image quality value Q is a functional value obtained by a formula of Q=f (N, M) and A0 is a value satisfying a formula of Q0=f (A0,A0), the image processing is conducted to correct the sharpness when N0 and A0 satisfy N0≧A0, and the image processing is conducted to correct the granularity when N0 and AC do not satisfy N0≧A0, where Q0 is the total image quality value calculated from original image data of said one of the main photographed-subject region and the selected region, N and M are normalized granularity and sharpness values, respectively, and N0 is the granularity value calculated from the original image data of said one of the main photographed-subject region and the selected region.

22. The image processing method of claim 6, wherein when the total image quality value BQ is a functional value obtained by a formula of BQ=f (BN,BM) and B0 is a value satisfying a formula of BQC=f (BC,BC), the image processing is conducted to correct the sharpness when that BN0 and B0 satisfy BN≧B0, and the image processing is conducted to correct the granularity when BN0 and B0 do not satisfy BN0≦B0, where BQ0 is the total image quality value calculated from original image data of the entire image region, BN and BM are normalized granularity and sharpness values, respectively, and BN0 is the granularity value calculated from the original image data of the entire image region.

23. The image processing method of claim 7, wherein the color performance value is calculated such that a difference between N1/N0 and C1/CO is not more than 100%, where C0 is the color performance value calculated from original image data of said one of the main photographed-subject region and the selected region, and C1 is the color performance value calculated from output image data of said one of the main photographed-subject region and the selected region.

24. The image processing method of claim 23, wherein the difference is not more than 50%.

25. The image processing method of claim 24, wherein the difference is 5 to 20%.

26. The image processing method of claim 25, wherein the difference is 5 to 10%.

27. The image processing method of claim 7, wherein the color performance value is calculated such that a difference between M1/M0 and C1/C0 is not more than 100%, where C0 is the color performance value calculated from original image data of said one of the main photographed-subject region and the selected region, and C1 is the color performance value calculated from output image data of said one of the main photographed-subject region and the selected region.

28. The image processing method of claim 27, wherein the difference is not more than 50%.

29. The image processing method of claim 28, wherein the difference is 5 to 20%.

30. The image processing method of claim 29, wherein the difference is 5 to 10%.

31. The image processing method of claim 1, further comprising comparing red information and green information in the target regions, such that when a target region is judged to be a red system, the red information is weighted, and when a target region is judged to be a green system, the green information is weighted.

32. The image processing method of claim 1, wherein the image processing comprises calculating a skin color region and a background region in the target regions and conducting an image processing in accordance with the skin color region, the background region and a boundary region between the skin color region and the background region.

33. The image processing method of claim 1, wherein the image processing comprises producing intermediate processing image data from the image characteristics obtained from the target regions such that a difference in a granular noise component between the original image data and the intermediate processing image data is not more than 100% and producing the output image data by calculating the original image data and the intermediate processing image data with one of an adding calculation and a subtracting calculation.

34. The image processing method of claim 33, wherein the difference is not more than 50%.

35. The image processing method of claim 34, wherein the difference is 5 to 20%.

36. The image processing method of claim 35, wherein the difference is 5 to 10%.

37. The image processing method of claim 1, wherein the image processing step comprises producing intermediate processing image data from the image characteristics obtained from the target regions such that a difference in an intermediate frequency component between the original image data and the intermediate processing image data is not more than 100% and producing the output image data by calculating the original image data and the intermediate processing image data with one of an adding calculation and a subtracting calculation.

38. The image processing method of claim 37, wherein the difference is not more than 50%.

39. The image processing method of claim 38, wherein the difference is 5 to 20%.

40. The image processing method of claim 39, wherein the difference is 5 to 10%.

41. The image processing method of claim 1, wherein the image processing step comprises producing intermediate processing image data from the image characteristics obtained from the target regions such that a difference in at least one of chroma, color contamination, white balance, contrast, and high frequency component between the original image data and the intermediate processing image data is not more than 100% and producing the output image data by calculating the original image data and the intermediate processing image data with one of an adding calculation and a subtracting calculation.

42. The image processing method of claim 41, wherein the difference is not more than 50% or less.

43. The image processing method of claim 42, wherein the difference is 5 to 20%.

44. The image processing method of claim 43, wherein the difference is 5 to 10%.

45. The image processing method of claim 1, further comprising: obtaining a tendency of an image processing applied when the image is photographed; and correcting an extent of the image processing based on the tendency of the image processing applied when the image is photographed.

46. The image processing method of claim 45, wherein the obtained tendency includes at least one of a contrast processing, a sharpness processing, a granularity processing, and a chroma processing which is applied when the image is photographed.

47. The image processing method of claim 45, wherein the extent of the extent of the image processing is corrected in consideration of duplication or reciprocity with respect to image processing applied when image signals representing the photographed image are produced.

48. The image processing method of claim 45, wherein the original image data is provided with additional data and the tendency of the image processing from the additional data.

49. The image processing method of claim 45, further comprising:
   obtaining a preference tendency of a user photographing an image; and
   the extent of the image processing on the preference tendency of the user.

50. The image processing method of claim 49, wherein the preference tendency is obtained by obtaining information regarding at least one of a type of a photographing device, a number of photographing pixels, an exposing mode and a white balance, and the preference tendency of the user is obtained from the obtained information.

51. The image processing method of claim 50, wherein the original image data is provided with additional data and preference tendency of the user is obtained from the additional data.

52. The image processing method of claim 45, further comprising estimating an angle of field for the main photographed-subject from a viewing distance to observe the photographed image, wherein a content of the image processing is changed in accordance with the estimated angle of field.

53. The image processing method of claim 17, wherein the absolute value of each of $\Delta N$ and $\Delta M$ is not more than 0.7.

54. The image processing method of claim 53, wherein the absolute value of each of $\Delta N$ and $\Delta M$ is not more than 0.4.

55. The image processing method of claim 17, wherein the absolute value of each of $\Delta BN$ and $\Delta BM$ is not more than 0.7.

56. The image processing method of claim 55, wherein the absolute value of each of $\Delta BN$ and $\Delta BM$ is not more than 0.4.

57. A computer-readable recording medium having a program stored thereon that is executable by a computer to cause the computer to perform an image processing method for applying an image processing to two dimensionally-arranged original image data corresponding to an entire image region of a photographed image including a main photographed-subject and for producing output image data, said image processing method comprising:
   determining at least one of a main photographed-subject region of the main photographed-subject and a selected region of the two dimensionally-arranged original image data;
   the entire image region and one of the main photographed-subject region and the selected region as target regions;
   obtaining image characteristics from each of the target regions;
   calculating a granularity value and a sharpness value for each of the target regions from the respective image characteristics of the target regions, wherein each of the granularity value and the sharpness value is an evaluation criterion standardized with a functional value; and
   conducting the image processing for the two dimensionally-arranged original image data with reference to the granularity value and the sharpness value.

58. The computer-readable recording medium of claim 57, wherein the main photographed-subject region is determined by obtaining photographing condition information including at least one of a subject area, a type of a photographed scene, a subject distance and a detection of reflected strobe light with regard to the photographed image, estimating a size of the main photographed-subject in the original image data from the obtained photographing condition information, and determining the main photographed-subject region based on an estimated size of the main photographed-subject.

59. The computer-readable recording medium of claim 58, wherein the original image data is provided with additional data and the the photographing condition information is obtained from the additional data.

60. The computer-readable recording medium of claim 57, wherein the main photographed-subject region is determined by obtaining information regarding a size of the main photographed-subject in the original image data and determining the main photographed-subject region based on the obtained size of the main photographed-subject.

61. The computer-readable recording medium of claim 60, wherein the original image data is provided with additional data including main photographed-subject information, and the size of the main photographed-subject is obtained from the main photographed-subject information.

62. The computer-readable recording medium of claim 57, further comprising calculating a total image quality value correlated two dimensionally with the granularity value and the sharpness value, wherein the image processing is conducted with reference to the total image quality value.

63. The computer-readable recording medium of claim 57, further comprising calculating a color performance value for each of the target regions, wherein the image processing is conducted with reference to the color performance value, the granularity value and the sharpness value.

64. The computer-readable recording medium of claim 63, further comprising calculating a total image quality value correlated three dimensionally with the granularity value, the sharpness value and the color performance value, wherein the image processing is conducted with reference to the total image quality value.

65. An image processing apparatus for applying an image processing to two dimensionally-arranged original image data corresponding to an entire image region of a photographed image including a main photographed-subject and for producing output image data, said image processing apparatus comprising:
   a region determining section for determining at least one of a main photographed-subject region of the main photographed-subject and a selected region of the two dimensionally-arranged original image data;
   a target region setting section for setting the entire image region and one of the main photographed-subject region and the selected region as target regions;
   an image characteristic obtaining section for obtaining image characteristics from each of the target regions;

an evaluation criterion calculating section for calculating a granularity value and a sharpness value for each of the target regions from the respective image characteristics of the target regions, wherein each of the granularity value and the sharpness value is an evaluation criterion standardized with a functional value; and an image processing section for conducting the image processing for the two dimensionally-arranged original image data with reference to the granularity value and the sharpness value.

66. The image processing apparatus of claim 65, wherein the region determining section obtains photographing condition information including at least one of a subject area, a type of a photographed scene, a subject distance and a detection of reflected strobe light with regard to the photographed image, estimates a size of the main photographed-subject in the original image data from the obtained photographing condition information, and determines the main photographed-subject region based on the estimated size of the main photographed-subject.

67. The image processing apparatus of claim 66, wherein the original image data is provided with additional data and the region determining section obtains the photographing condition information from the additional data.

68. The image processing apparatus of claim 65, wherein the region determining section obtains information regarding a size of the main photographed-subject in the original image data and determines the main photographed-subject region based on the obtained size of the main photographed-subject.

69. The image processing apparatus of claim 68, wherein the original image data is provided with additional data including main photographed-subject information, and the region determining section obtains the size of the main photographed-subject from the main photographed-subject information.

70. The image processing apparatus of claim 65, further comprising an image quality calculating section for calculating a total image quality value correlated two dimensionally with the granularity value and the sharpness value, wherein the image processing section conducts the image processing with reference to the total image quality value.

71. The image processing apparatus of claim 65, wherein the evaluation criterion calculating section further calculates a color performance value, and the image processing section conducts the image processing with reference to the color performance value, the granularity value and the sharpness value.

72. The image processing apparatus of claim 71, further comprising an image quality calculating section for calculating a total image quality value correlated three dimensionally with the granularity value, the sharpness value and the color performance value, wherein the image processing section conducts the image processing with reference to the total image quality value.

* * * * *